US012718743B2

(12) United States Patent
Ko et al.

(10) Patent No.: US 12,718,743 B2
(45) Date of Patent: Aug. 25, 2026

(54) PIXEL CIRCUIT AND DISPLAY DEVICE INCLUDING THE SAME

(71) Applicant: LG DISPLAY CO., LTD., Seoul (KR)

(72) Inventors: Nam Kon Ko, Paju-si (KR); Young Ho Kim, Paju-si (KR); Mi So Kim, Paju-si (KR); Nan Yi Lee, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 18/962,571

(22) Filed: Nov. 27, 2024

(65) Prior Publication Data

US 2025/0232709 A1 Jul. 17, 2025

(30) Foreign Application Priority Data

Jan. 17, 2024 (KR) ........................ 10-2024-0007312

(51) Int. Cl.
*G09G 3/32* (2016.01)
*G09G 3/20* (2006.01)

(52) U.S. Cl.
CPC ............. *G09G 3/32* (2013.01); *G09G 3/2018* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/0242* (2013.01)

(58) Field of Classification Search
CPC ................... G09G 3/32; G09G 3/2018; G09G 2300/0819; G09G 2300/0852; G09G 2300/0861; G09G 2310/08; G09G 2320/0233; G09G 2320/0242
See application file for complete search history.

(56) References Cited

U.S. PATENT DOCUMENTS 10,713,996 B2 * 7/2020 Kim ...................... H01L 25/167
2023/0104084 A1 * 4/2023 Yang ........................ G09G 3/32
345/691

FOREIGN PATENT DOCUMENTS

KR 10-2020-0114868 A 10/2020
KR 10-2023-0023482 A 2/2023
KR 10-2023-0056081 A 4/2023
KR 10-2538484 B1 6/2023

* cited by examiner

*Primary Examiner* — Kenneth B Lee, Jr.
(74) *Attorney, Agent, or Firm* — Birch, Stewart, Kolasch & Birch, LLP

(57) ABSTRACT

A pixel circuit can include a light-emitting element configured to emit light, a driving transistor configured to supply a current to the light-emitting element, a first circuit including a first capacitor charged with a first data voltage, and a second circuit including a second capacitor charged with a second data voltage and configured to adjust the current supplied by the driving transistor to the light-emitting element, Also, the first circuit is configured to output a discharge control signal that instructs the second capacitor to discharge in response to a voltage change in the first capacitor for turning the light-emitting element off.

19 Claims, 35 Drawing Sheets

PIXEL CIRCUIT AND DISPLAY DEVICE INCLUDING THE SAME

CROSS-REFERENCE TO RELATED APPLICATION

This application claims priority to Korean Patent Application No. 10-2024-0007312, filed in the Republic of Korea, on Jan. 17, 2024, the entirety of which is incorporated by reference into the present application.

BACKGROUND

1) Field

The present disclosure relates to a pixel circuit and a display device including the same.

2) Description of the Related Art

Various flat panel display devices, such as a liquid crystal display device and an electroluminescent display device, can be used to display information. The electroluminescent display device can use light emitting elements arranged in each pixel to emit light by itself without a backlight, thereby displaying an input image. The light emitting elements of the electroluminescent display device can be categorized as an organic light emitting element and an inorganic light emitting element depending on the material of a light emitting layer.

Recently, a display device that uses a light emitting diode (LED), which is an inorganic light emitting element, as a light emitting element of a pixel has attracted attention as a next-generation display device. Since the LED is made of an inorganic material, it does not require a separate encapsulation layer to protect an organic material from moisture, and it has superior reliability and long lifespan compared to an organic light emitting diode (OLED). In addition, the LED has a fast light-up speed, good response time, excellent luminous efficiency, and impact resistance. However, when the current flowing through the LED is increased, the LED may experience a color shift which can degrade the color reproduction and impair image quality.

For example, in a pixel circuit driving a micro LED, the wavelength of light can be shifted depending on the amount of current flowing through the micro LED or the current density, causing a color deterioration. To solve this problem, a pulse width modulation (PWM) method is proposed to express the grayscale of pixel data by keeping the current density of the micro LED constant and regulating the emission time of the micro LED. However, a PWM pixel circuit uses a separate sweep voltage generation circuit to provide the pixel circuit with a sweep voltage that rises at a predetermined slope to control the PWM, and it is difficult for the pixel circuit to increase grayscale expressiveness.

The PWM pixel circuit can cause the micro LED of the pixels to emit light in a global shutter method in which light is emitted from all of the pixel lines at the same time. In this situation, because the pixel data is written to all of the pixel lines within one frame period and then the pixels emit light for the rest of the time, it is difficult to improve the contrast ratio.

Also, different colored sub-pixels have different needs and can experience different rates of impairment, particularly with regards to the brightness level and the amount of time the sub-pixel emits light (e.g., amount of driving current, and ON duration timing). Thus, a need exists for being able to individually and independently control the brightness level and ON emission time of each sub-pixel.

SUMMARY OF THE DISCLOSURE

The present disclosure aims to solve the above-described necessity and/or problems.

The present disclosure provides a pixel circuit capable of enhancing grayscale expressiveness and improving a contrast ratio without color deviation, and a display device including the same.

The problem to be solved by the present disclosure is not limited to those mentioned above, and other problems not mentioned will be clearly understood by those skilled in the art from the following description.

A pixel circuit according to an embodiment of the present disclosure includes a light-emitting element, a driving transistor configured to supply a current to the light-emitting element, a first circuit including a first capacitor charged with a first data voltage, and a second circuit including a second capacitor charged with a second data voltage and configured to regulate a current generated from the driving transistor. The first circuit is configured to output a discharge control signal that instructs the second capacitor to discharge according to a voltage change in the first capacitor.

The first circuit can include a first charging circuit connected to a data line to which the first data voltage and the second data voltage are applied and configured to charge the first capacitor with the first data voltage supplied through the data line, a first discharging circuit configured to discharge a voltage of the first capacitor, and an inverting circuit configured to output the discharge control signal according to the voltage change in the first capacitor. The second data voltage can be applied to the data line, followed by the first data voltage.

The first capacitor can be connected between a first node and a second power line to which a ground voltage is applied. The first charging circuit can include a first PWM transistor configured to electrically connect the first node to the data line in response to a gate-on voltage of a second gate signal. The first discharging circuit can include a second PWM transistor including a gate electrode and a first electrode connected to the first node, and a second electrode connected to the second power line. The inverting circuit can invert the voltage of the discharge control signal from an off-level (or an off-level voltage) to an on-level (or an on-level voltage) at an interval in which a voltage of the first node becomes lower.

The inverting circuit can include a third PWM transistor including a first electrode and a gate electrode to which a pixel driving voltage is applied, and a second electrode connected to a second node, and a fourth PWM transistor connected between the second node and the second power line and configured to turn off when the voltage of the first node is lowered to an off-level at an interval in which the voltage of the first node becomes lower.

The second circuit can include a second charging circuit configured to charge the second capacitor with the second data voltage supplied through the data line, and a second discharging circuit configured to discharge the second capacitor when the voltage of the discharge control signal is at an on-level.

The second capacitor can be connected between a third node and a fourth node. The second charging circuit can include a first PAM transistor configured to turn on in response to a gate-on voltage of a first gate signal to connect the data line to the third node. The second discharging circuit can include a second PAM transistor connected between the third node and a fifth node and configured to turn on in response to a gate-on voltage of a fourth gate signal, and a third PAM transistor connected between the fifth node and the second power line and configured to turn on in response to an on-level of the voltage of the discharge control signal.

The pixel circuit can further include an initialization circuit configured to supply an initialization voltage to the first node and the fourth node in response to a gate-on voltage of a third gate signal.

The initialization circuit can include a first initialization transistor configured to turn on in response to the gate-on voltage of the third gate signal to supply a reference voltage to the first node, and a second initialization transistor configured to turn on in response to the gate-on voltage of the third gate signal to supply the reference voltage to the fourth node.

The first circuit can include a first charging circuit connected to a first data line to which the first data voltage is applied and configured to charge the first capacitor with the first data voltage, a first discharging circuit configured to discharge a voltage of the first capacitor, and an inverting circuit configured to output the discharge control signal according to the voltage change in the first capacitor. The second circuit can include a second charging circuit connected to a second data line to which the second data voltage is applied and configured to charge the second capacitor with the second data voltage, and a second discharging circuit configured to discharge the second capacitor when the voltage of the discharge control signal is at an on-level. The first charging circuit can charge the first data voltage in the first capacitor and at the same time, the second charging circuit can charge the second data voltage in the second capacitor.

The first capacitor can be connected between a first node and a second power line to which a ground voltage is applied. The second capacitor can be connected between a third node and a fourth node. The first charging circuit can include a first PWM transistor configured to electrically connect the first node to the first data line in response to a gate-on voltage of a first gate signal. The first discharging circuit can include a second PWM transistor including a gate electrode and a first electrode connected to the first node, and a second electrode connected to the second power line. The inverting circuit can include a third PWM transistor including a first electrode and a gate electrode to which a pixel driving voltage is applied, and a second electrode connected to a second node, and a fourth PWM transistor connected between the second node and the second power line and configured to turn off when the voltage of the first node is lowered to an off-level at an interval in which the voltage of the first node becomes lower. The voltage of the discharge control signal can be inverted from an off-level to an on-level when the fourth PWM transistor is turned off.

The second charging circuit can include a first PAM transistor configured to turn on in response to the gate-on voltage of the first gate signal to electrically connect the second data line to the third node. The second discharging circuit can include a second PAM transistor connected between the third node and a fifth node and configured to turn on in response to a gate-on voltage of a fourth gate signal, and a third PAM transistor connected between the fifth node and the second power line and configured to turn on in response to an on-level of the voltage of the discharge control signal.

The pixel circuit can further include a fifth PWM transistor configured to electrically connect the first node to a sixth node in response to a gate-on voltage of a second gate signal, a first initialization transistor configured to turn on in response to a gate-on voltage of a third gate signal to electrically connect a third power line, to which a reference voltage is applied, to the sixth node, and a second initialization transistor configured to turn on in response to the gate-on voltage of the third gate signal to supply the reference voltage to the fourth node.

The second gate signal can be a signal of an opposite phase with respect to the first gate signal.

The first capacitor can be connected between a first node and a second power line to which a ground voltage is applied. The second capacitor can be connected between a second node and a third node. The first circuit can include a first PWM transistor configured to electrically connect the first node to a first data line to which the first data voltage is supplied in response to a gate-on voltage of a first gate signal, and a second PWM transistor including a first electrode and a gate electrode connected to a first power line to which a pixel driving voltage is applied, and a second electrode connected to the first node. The discharge control signal can be output as a voltage of the first node. The second circuit can include a first PAM transistor configured to turn on in response to the gate-on voltage of the first gate signal to connect a second data line, to which the second data voltage is applied, to the third node, a second PAM transistor connected between the second node and a fourth node and configured to turn on in response to a gate-on voltage of a fourth gate signal, and a third PAM transistor connected between the fourth node and the third node and configured to turn on when the voltage of the first node is an on-level voltage. The second capacitor can be discharged when the second PAM transistor and the third PAM transistor are turned on.

The pixel circuit can further include a fifth PWM transistor configured to electrically connect the first node to a fifth node in response to a gate-on voltage of a second gate signal, a first initialization transistor configured to turn on in response to a gate-on voltage of a third gate signal to electrically connect a third power line, to which a reference voltage is applied, to the fifth node, and a second initialization transistor configured to turn on in response to the gate-on voltage of the third gate signal to supply the reference voltage to the fourth node.

The second gate signal can be a signal of an opposite phase with respect to the first gate signal.

The first circuit and the second circuit can be connected to a data line to which the second data voltage is supplied followed by the first data voltage. The first capacitor can be connected between a first node and a second power line to which a ground voltage is applied. The second capacitor can be connected between a first power line to which a pixel driving voltage is applied and a second node. The first circuit can include a first PWM transistor configured to electrically connect the first node to the data line in response to a gate-on voltage of a second gate signal, and a second PWM transistor including a first electrode connected to the first node, a gate electrode and a second electrode connected to the second power line. The discharge control signal can be output as a voltage of the first node. The second circuit can include a first PAM transistor configured to turn on in response to a gate-on voltage of a first gate signal to electrically connect the data line to the second node, a second PAM transistor connected between the first power line and a fourth node and configured to turn on in response to a gate-on voltage of a fourth gate signal, and a third PAM transistor connected between the fourth node and the second power line and configured to turn on when the voltage of the first node is an on-level voltage. The second capacitor can be discharged when the second PAM transistor and the third PAM transistor are turned on.

A display device according to one embodiment of the present disclosure includes a display panel in which a plurality of data lines, a plurality of gate lines, a plurality of power lines, and a plurality of sub-pixels are arranged, a data driver configured to output a first data voltage corresponding to pulse width modulation (PWM) data and a second data voltage corresponding to pulse amplitude modulation (PAM) data, and a gate driver configured to output a gate signal to the gate lines. Each of the sub-pixels includes a light-emitting element, a driving transistor configured to supply a current to the light-emitting element, a first circuit including a first capacitor charged with the first data voltage, and a second circuit including a second capacitor charged with the second data voltage and configured to regulate a current generated from the driving transistor. The first circuit is configured to output a discharge control signal that instructs the second capacitor to discharge according to a voltage change in the first capacitor.

The second data voltage can be applied to each of the data lines, followed by the first data voltage.

A first data line to which the first data voltage is supplied can be connected to the first circuit. A second data line to which the second data voltage is supplied can be connected to the second circuit. The first circuit can charge the first data voltage in the first capacitor and at the same time, the second circuit can charge the second data voltage in the second capacitor.

According to embodiments of the present disclosure, the pixel circuit can enable improved lifetime and low power driving by driving the light-emitting element with high efficiency and high luminance, and can minimize color deviation and improve low grayscale expressiveness performance.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, in which.

DETAILED DESCRIPTION OF THE EMBODIMENTS

Figure 1:
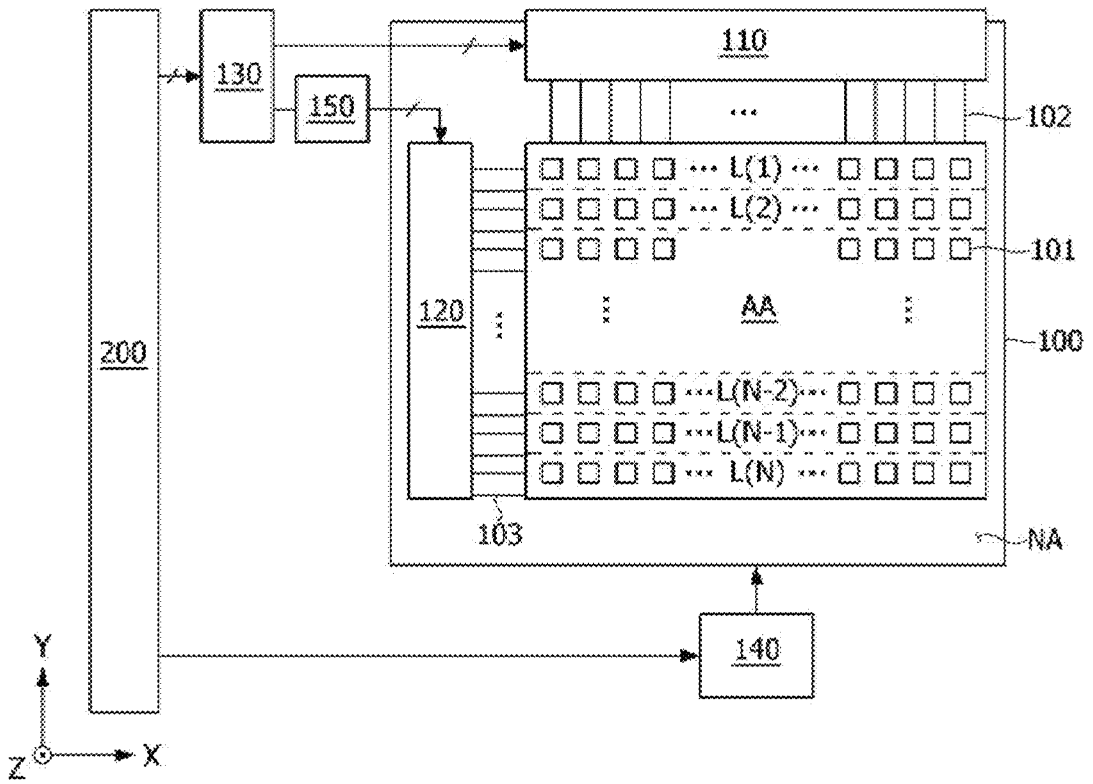
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as “comprising,” “including,” “having,” and “comprising” used herein are generally intended to allow other components to be added unless the terms are used with the term “only.” Any references to singular can include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components can be interposed between them, unless “immediately” or “directly” is used.

When a temporal antecedent relationship is described, such as “after,” “following,” “next to,” “before,” or the like, it may not be continuous on a time base unless “immediately” or “directly” is used.

The terms “first,” “second,” and the like can be used to distinguish elements from each other, but the functions or structures of the components are not limited by ordinal numbers or component names in front of the components. Also, the term “can” includes all meanings and definitions of the term “may.”

The following embodiments can be partially or entirely bonded to or combined with each other and can be linked and operated in technically various ways. The embodiments can be carried out independently of or in association with each other.

The pixel circuit of the display device can include a plurality of transistors. A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor (p-channel metal-oxide semiconductor (PMOS)), since carriers are holes, a source voltage is higher than a drain voltage such that holes can flow from a source to a drain. In the p-channel transistor, since holes flow from the source to the drain, current flows from the source to the drain. It should be noted that a source and a drain of a transistor are not fixed. For example, a source and a drain can be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the situation of an n-channel transistor, the gate-on voltage can be a gate high voltage VGH, and the gate-off voltage can be a gate low voltage VGL. In the situation of a p-channel transistor, the gate-on voltage can be the gate low voltage VGL, and the gate-off voltage can be the gate high voltage VGH.

Hereinafter, various embodiments of the present disclosure will be described in detail with reference to the accompanying drawings.

Referring to FIG. 1, a display device according to one embodiment of the present disclosure includes a display panel 100, a display panel driving circuit for writing pixel data to pixels 101 of the display panel 100, and a power supply 140 that generates power to drive the pixels 101 and the display panel driving circuit.

A substrate of the display panel 100 can be a plastic substrate, a thin glass substrate, or a metal substrate, but is not limited thereto. The display panel 100 can be a rectangular panel having a length in an X-axis direction (or a first direction), a width in a Y-axis direction (or a second direction), and a thickness in a Z-axis direction (or a third direction), but is not limited thereto. For example, at least a portion of the display panel 100 can have a curved perimeter.

The display panel 100 can be implemented as a non-transmissive display panel or a transmissive display panel. The transmissive display panel can be applied to a transparent display device in which an image is displayed on a screen and a real object is visible beyond the display panel. The display panel 100 can be manufactured as a flexible display panel. In addition, the display panel 100 can be manufactured as a stretchable panel that can extend.

A display area AA of the display panel 100 includes a pixel array that displays an input image. The pixel array includes a plurality of data lines 102, a plurality of gate lines 103 intersecting the data lines 102, and the pixels 101 arranged in a matrix form. The display panel 100 can further include power lines connected in common to the pixels 101. The power lines are connected in common to the pixels 101 to supply the pixels with a constant voltage required to drive the pixels 101. The power lines can be implemented as long stripe wires along the first direction or the second direction, or as mesh wires in which wires in the first direction and wires in the second direction are electrically connected.

Each of the pixels 101 can be divided into a red sub-pixel, a green sub-pixel, and a blue sub-pixel for color implementation. Each of the pixels can further include a white sub-pixel. Each sub-pixel includes a pixel circuit for driving a light-emitting element. Hereinafter, a “pixel” can be interpreted as having the same meaning as a “sub-pixel.”

The pixel array includes a plurality of pixel lines L(1) to L(N). Where N is a natural number greater than or equal to 2. Each of the pixel lines L(1) to L(N) includes one line of pixels arranged along the gate line direction (X-axis direction) in the pixel array of the display panel 100. The pixels arranged in one-pixel line can share the gate lines 103. The sub-pixels arranged in the column direction (Y-axis direction) along a data line direction can share the same data line 102. One horizontal period is a time obtained by dividing one frame period by the total number of pixel lines L(1) to L(N).

The power supply 140 generates the constant voltages (or direct current (DC) voltages) for driving the pixel array and the display panel driving circuit of the display panel 100 using a DC-DC converter. The DC-DC converter can include a charge pump, a regulator, a buck converter, a boost converter, and the like. The power supply 140 can adjust the level of the input voltage from a host system 200 to output constant voltages, such as a gamma reference voltage, a gate-low voltage, a gate-high voltage, a pixel driving voltage, a pixel ground voltage (hereinafter referred to as “ground voltage”), and the like. The gamma reference voltage is supplied to the data driver 110. A dynamic range of the data voltage output from the data driver 110 is determined by a voltage range of the gamma reference voltage. The dynamic range of the data voltage is the range of voltages between the maximum voltage and the minimum voltage of a data voltage.

The gate-high voltage and the gate-low voltage are supplied to a level shifter 150 and the gate driver 120. The constant voltages such as the pixel driving voltage and the ground voltage are supplied to the pixels 101 through the power lines commonly connected to the pixels 101. The pixel driving voltage can be supplied from a main power source of the host system 200 to the display panel 100. In this situation, the power supply 140 does not need to output the pixel driving voltage.

The display panel driving circuit writes the pixel data of the input image to the pixels of the display panel 100 under the control of the timing controller 130. The display panel driving circuit includes the data driver 110 and the gate driver 120.

The display panel driving circuit can further include a touch sensor driver for driving touch sensors. The touch sensor driver is omitted from FIG. 1. The data driver 110 and the touch sensor driver can be integrated into one drive IC (Integrated Circuit). The timing controller 130, the power supply 140, the level shifter 150, the data driver 110, and the touch sensor driver can be further integrated into the drive IC.

The data driver 110 receives the pixel data of the input image received as a digital signal from the timing controller 130 and outputs the data voltage. The data driver 110 converts the pixel data of an input image into a gamma compensation voltage using a digital-to-analog converter (DAC) to output the data voltage. The gamma reference voltage is divided into a grayscale-specific gamma compensation voltage by a voltage divider circuit in the data driver 110 and is supplied to the DAC. The DAC generates the data voltage as the gamma compensation voltage corresponding to the grayscale value of the pixel data. The data voltages output from the DAC are output to the data lines 102 through output buffers in the respective data output channels of the data driver 110.

Figure 2:
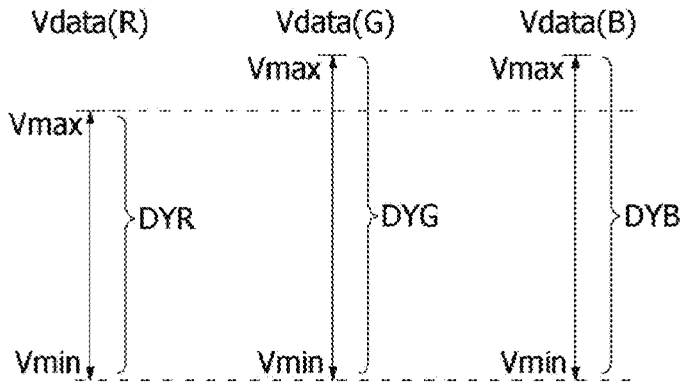
FIG. 2 is a diagram illustrating an example of a data voltage according to an embodiment of the present disclosure.

Each of the red light-emitting elements, the green light-emitting element, and the blue light-emitting element can have a different maximum luminous efficiency region. The data voltage can be set independently for each color of the sub-pixels so that each of the red light-emitting elements, the green light-emitting element, and the blue light-emitting element operates in the maximum efficiency region. The minimum voltage level of the data voltage can be determined as a voltage in which no color shift occurs. Taking this into consideration, the data voltage range for each color of the sub-pixels can be set as shown in FIG. 2, but is not limited thereto.

The gate driver 120 can be formed on the display panel 100 together with a TFT array of the pixel array and the wires. The gate driver 120 can be disposed in the non-display area NA outside the display area AA in the display panel 100, or at least a portion thereof can be disposed in the display area AA.

The gate driver 120 can be disposed in either a left non-display area NA or a right non-display area NA outside the display area AA in the display panel 100 to supply the gate signal to the gate lines 103 in a single feeding method. In the single feeding method, the gate signal is applied to one end of the gate lines. The gate driver 120 can be disposed in the left non-display area NA and the right non-display area NA in the display panel 100 to apply the gate signal to the gate lines 103 in a double feeding method. In the double feeding method, the gate signal is applied simultaneously to both ends of the gate lines 103. At least some circuits of the gate driver 120 can be disposed within the display area AA.

Figure 5:
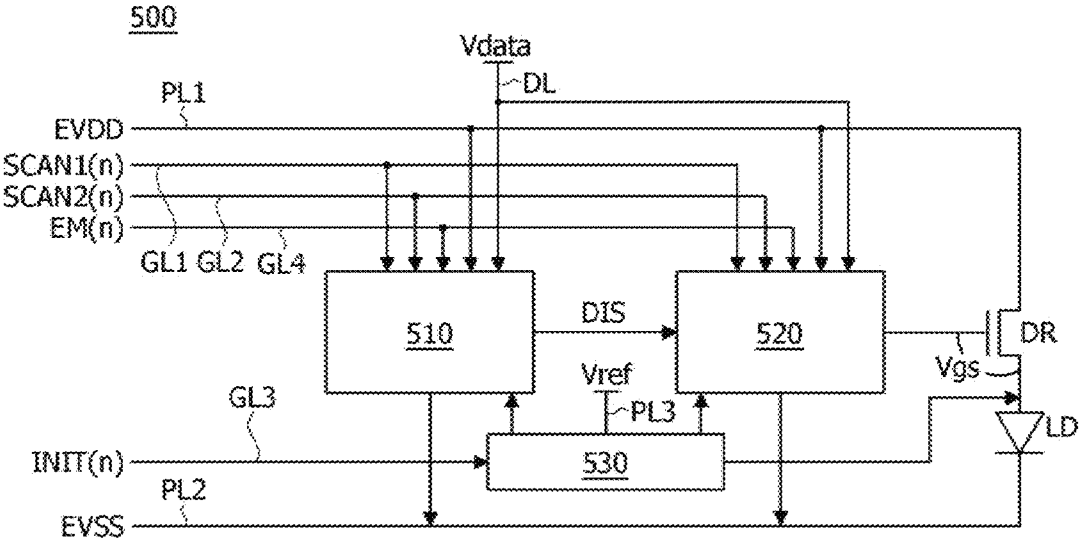
FIG. 5 is a block diagram schematically illustrating a pixel circuit according to an embodiment of the present disclosure.

The gate driver 120 can include a shift register and/or an edge trigger to output and shift pulses of the gate signal under the control of the timing controller 130. The gate signal can include a first gate signal, a second gate signal, a third gate signal, and a fourth gate signal. In this situation, the gate driver 120 can include a plurality of shift registers and/or edge triggers that output different gate signals. In FIG. 5, SCAN1(*n*), SCAN2(*n*), INIT(n), and EM(n) denote the first through fourth gate signals applied to sub-pixels in an (n)th pixel line (where n is a natural number).

The timing controller 130 receives the pixel data of the input image and a timing signal synchronized with the pixel data from the host system 200. The timing signal can include a vertical synchronization signal Vsync, a horizontal synchronization signal Hsync, and a data enable signal DE. A vertical period and a horizontal period can be identified by a method of counting the data enable signal DE and thus the vertical synchronization signal Vsync and the horizontal synchronization signal Hsync can be omitted. The data enable signal DE has an interval of one horizontal period (1H).

The timing controller 130 can control the operation timings of the data driver 110 and the gate driver 120 based on the timing signals Vsync, Hsync, and DE received from the host system 200. The gate timing control signal output from the timing controller 130 can be input to the shift register of the gate driver 120 through the level shifter 150. The level shifter 150 can receive the gate timing control signal and generate a clock to provide it to the gate driver 120. The input signal to the level shifter 150 is a signal of a digital signal voltage level. The clock output from the level shifter 150 can swing between the gate-high voltage and the gate-low voltage. A data timing control signal generated from the timing controller 130 is transmitted to the data driver 110.

The host system 200 can scale an image signal from a video source to match the resolution of the display panel 100, and can transmit the scaled image signal to the timing controller 130 together with the timing control signal.

FIG. 2 is a diagram illustrating an example of data voltage ranges according to one embodiment of the present disclosure.

Referring to FIG. 2, the data voltage output from the data driver 110 can include at least a red data voltage Vdata(R), a green data voltage Vdata(G), and a blue data voltage Vdata(B). The red data voltage Vdata(R) can be applied to a red sub-pixel. The green data voltage Vdata(G) can be applied to a green sub-pixel. The blue data voltage Vdata(B) can be applied to a blue sub-pixel.

The maximum voltage Vmax of the red data voltage Vdata(R) can be lower than the maximum voltage Vmax of each of the green and blue data voltages Vdata(G) and Vdata(B). The minimum voltage Vmin of the red data voltage Vdata(R) can be equal to or different than the minimum voltage Vmin of each of the green and blue data voltages Vdata(G) and Vdata(B). The dynamic range DYR of the red data voltage Vdata(R), that is, the voltage range between the minimum voltage Vmin and the maximum voltage Vmax, can be smaller than the dynamic ranges DYG and DYB of the green and blue data voltages Vdata(G), Vdata(B) (e.g., DYR<DYG, and DYR<DYB).

Figure 3:
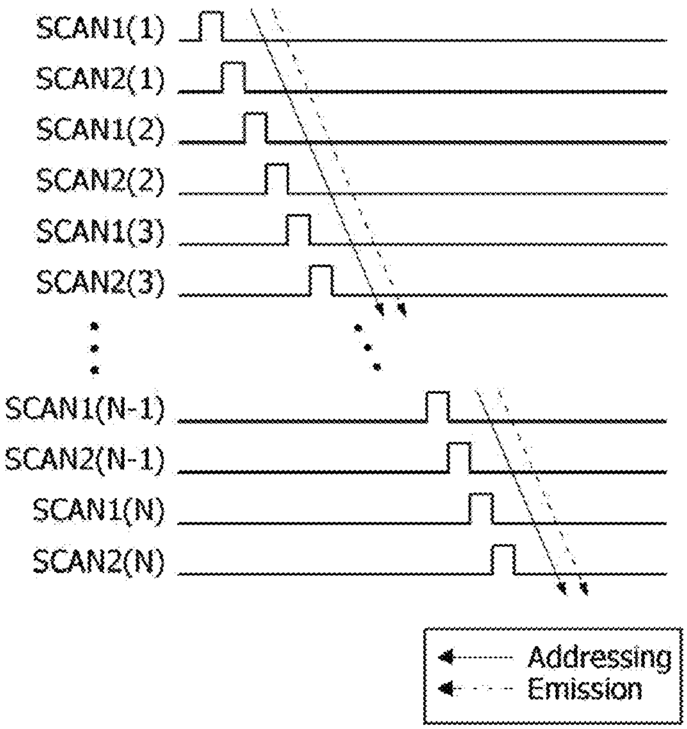
FIG. 3 is a diagram illustrating an example in which first and second gate signals are sequentially shifted in units of a pixel line according to an embodiment of the present disclosure.
Figure 4:
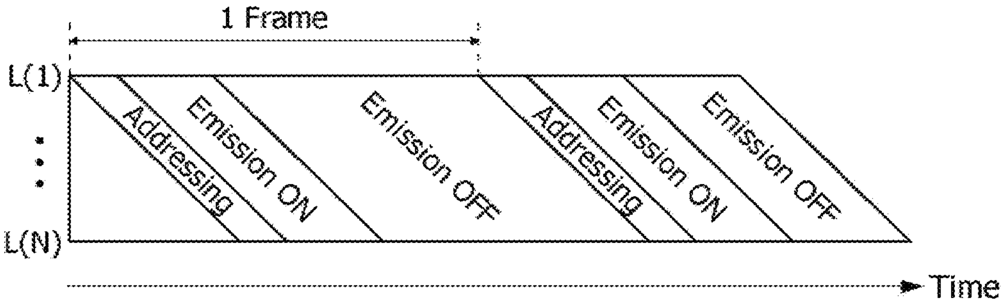
FIG. 4 is a diagram schematically illustrating an example in which pixels are emitted by a rolling shutter method according to an embodiment of the present disclosure.

FIG. 3 is a diagram illustrating an example in which first and second gate signals are shifted sequentially in units of a pixel line. FIG. 4 is a diagram schematically illustrating an example in which pixels are emitted by a rolling shutter method.

Referring to FIGS. 3 and 4, a first gate signal SCAN1(1 to N) and a second gate signal SCAN2(1 to N) are synchronized with the data voltage of the pixel data. In FIG. 3, a SCAN1(1) and a SCAN2(1) are the first and second gate signals applied to the sub-pixels arranged in a first pixel line L(1). SCAN1(2) and SCAN2(2) are the first and second gate signals applied to the sub-pixels arranged in a second pixel line L(2). SCAN1(N) and SCAN2(N) are the first and second gate signals applied to the sub-pixels arranged in an (N)th pixel line L(N).

The first gate signals SCAN1(1 to N) and the second gate signals SCAN2(1 to N) are applied to the sub-pixels by sequentially shifting in units of the pixel line to write the pixel data to the sub-pixels. Accordingly, when the first gate signals SCAN1(1 to N) and the second gate signals SCAN2(1 to N) are applied to the sub-pixels, the pixel data is written to the sub-pixels and the data is addressed to the sub-pixels.

For each frame, a data addressing step and a light emission step are sequentially shifted from the first pixel line to the (N)th pixel line in the display panel 100. Consequently, the sub-pixels of the display panel 100 emitted by the rolling shutter method can have a longer light emission time than the global shutter method, which can improve the contrast of the image reproduced on the display panel 100. In an example of the rolling shutter method, the sub-pixels of the first pixel line L(1) can be emitted, and at the same time, the pixel data can be written to the sub-pixels of the second pixel line L(2); and then the sub-pixels of the second pixel line L(2) are emitted, and at the same time, the pixel data can be written to the sub-pixels of the third pixel line L(3).

The data voltage output from the data driver 110 can include a pulse amplitude modulation (PAM) data voltage (hereinafter referred to as a "data voltage") synchronized with the first gate signal SCAN1(1 to N) and a pulse width modulation (PWM) data voltage (hereinafter referred to as a "data voltage") synchronized with the second gate signal SCAN2(1 to N), as shown in FIGS. 7 to 10.

The pixel circuit according to embodiments of the present disclosure can connect a discharge path to a capacitor that stores a gate-source voltage of a driving transistor that supplies a current to the light-emitting element, and can adjust the voltage of the capacitor through the discharge path according to the voltage of another capacitor that stores a pulse width modulation (PWM) data voltage. Such a pixel circuit can minimize color deviation and improve low grayscale expressiveness performance by controlling the luminance and light-on interval of the light-emitting element with pulse amplitude modulation (PAM) and pulse width modulation (PWM).

FIG. 5 is a block diagram schematically illustrating a pixel circuit according to a first embodiment of the present disclosure. The pixel circuit shown in FIG. 5 is a pixel circuit 500 of a sub-pixel disposed in an (n)th pixel line.

Referring to FIG. 5, the pixel circuit 500 includes a PWM circuit 510, a PAM circuit 520, an initialization circuit 530, a driving transistor DR, and a light-emitting element LD.

The PWM circuit 510 and the PAM circuit 520 can include a plurality of switch transistors and at least a capacitor. The transistors of the PWM circuit 510 and the PAM circuit 520, as well as the driving transistor DR can be implemented as, but are not limited to, n-channel transistors.

The pixel circuit 500 can be connected to a data line DL to which a data voltage Vdata is applied, a first gate line GL1 to which a first gate signal SCAN1(*n*) is applied, a second gate line GL2 to which a second gate signal SCAN2(*n*) is applied, a third gate line GL3 to which a third gate signal INIT(n) is applied, a fourth gate line GL4 to which a fourth gate signal EM(n) is applied, a first power line PL1 to which a pixel driving voltage EVDD (e.g., a high voltage) is applied, a second power line PL2 to which a ground voltage EVSS (e.g., a low voltage) is applied, and a third power line PL3 to which a reference voltage Vref is applied. The power lines PL1, PL2, and PL3 can be commonly connected to the pixel circuits of all of the pixels.

The data voltage Vdata can include a PAM data voltage and a PWM data voltage that are temporally separated from each other. The PWM data voltage can be interpreted as the first data voltage, and the PAM data voltage as the second data voltage. For example, the data driver 110 can supply the PWM data voltage to the data line DL after supplying the PAM data voltage to the data line DL as shown in FIGS. 7 to 14. During one horizontal period (1H), the PAM data voltage and the PWM data voltage can be supplied sequentially to the data line DL. For example, the PWM data voltage and PAM data voltage can be supplied to the pixel circuit 500 as a series of voltage pulses.

The data voltage Vdata can be generated as a dynamic range voltage between 0V and 8V, but is not limited thereto. The data voltage Vdata can be set as an independent voltage for each color, as shown in FIG. 2. The pixel driving voltage EVDD can be 22V, and the ground voltage EVSS and the reference voltage can be 0V, but are not limited thereto. A gate-high voltage VGH of the gate signals SCAN1(*n*), SCAN2(*n*), INIT(n), and EM(n) can be 15V, and a gate-low voltage VGL can be −15V, but are not limited thereto. In the following first to third embodiments, the gate-high voltage VGH will be referred to as a gate-on voltage and the gate-low voltage VGL will be referred to as a gate-off voltage.

The PWM circuit 510 receives the PWM data voltage and, after a light-on interval determined by the PWM data voltage, supplies a discharge control signal DIS to the PAM circuit 520, causing the PAM circuit 520 to turn off.

The PAM circuit 520 receives the PAM data voltage and regulates the current generated by the driving transistor DR by setting the gate-source voltage Vgs of the driving transistor DR according to the amplitude of the PAM data voltage. The driving element DR generates a current to drive the light-emitting element LD according to the gate-source voltage Vgs. As the gate-source voltage Vgs of the driving transistor DR increases, the amount of current flowing to the light-emitting element LD or current density increases.

The initialization circuit 530 initializes the PWM circuit 510, the PAM circuit 520, the driving transistor DR, and the light-emitting element LD by initializing the capacitors of the PWM circuit 510 and the PAM circuit 520 and the anode voltage of the light-emitting element LD to the reference voltage Vref.

The driving transistor DR can generate a current to drive the light-emitting element LD according to the gate-source voltage Vgs set by the PAM data voltage input to the PAM circuit 520. The driving transistor DR can include a first electrode to which the pixel driving voltage EVDD is applied, a gate electrode connected to the capacitor of the PAM circuit 520, and a second electrode connected to an anode electrode of the light-emitting element LD.

The light-emitting element LD can include the anode electrode, a cathode electrode, and a light-emitting layer. The anode electrode of the light-emitting element LD can be connected to the second electrode of the driving transistor DR. The cathode electrode of the light-emitting element LD can be connected to the second power line PL2 to which the ground voltage EVSS is applied. The light-emitting element LD can be, but is not limited to, a light-emitting element such as an OLED, mini LED, micro LED, or the like. The mini LED or micro LED can have a vertical structure in which electrodes are arranged above and below a semiconductor chip on which the light-emitting element LD is integrated. The semiconductor chip in which the light-emitting element LD is integrated can be implemented in a lateral structure or a flip-chip structure.

The luminance of the light-emitting element LD is determined in proportion to the drain-source current flowing through a semiconductor channel of the driving transistor DR. After a time determined by the PWM data voltage, the PAM circuit turns off, causing the driving transistor DR to turn off. Although the light-emitting element LD can be emit light according to the PAM data voltage, the light-emitting element LD is turned off after the light-on interval determined by the PWM data voltage because no current is supplied to the light-emitting element LD after the light-on interval. Thus, the light-on interval of the light-emitting element LD can be controlled by the PWM data voltage, and the amount of current flowing through the light-emitting element LD can be controlled by the PAM data voltage.

The luminance of each sub-pixel is determined according to the light-on interval of the light-emitting element LD and the luminance of the light-emitting element LD. Since the PWM data voltage and the PAM data voltage are applied to each of the sub-pixels, the light-on and the light-off intervals of the light-emitting element LD and the amount of current supplied to the light-emitting element LD are controlled independently for each sub-pixel. Thus, the luminance and the light-on interval of each of the sub-pixels can be controlled independently according to the PWM data voltage and the PAM data voltage. In other words, the PAM data voltage can determine how bright the pixel circuit is to be driven (e.g., brightness level control), and the PWM data voltage can determine how long the pixel circuit should maintain that brightness level (e.g., ON duration control), and these two different parameters can be individually and independently set, in order to provide a finer granularity of control for each of the different colored sub-pixels.

Figure 6:
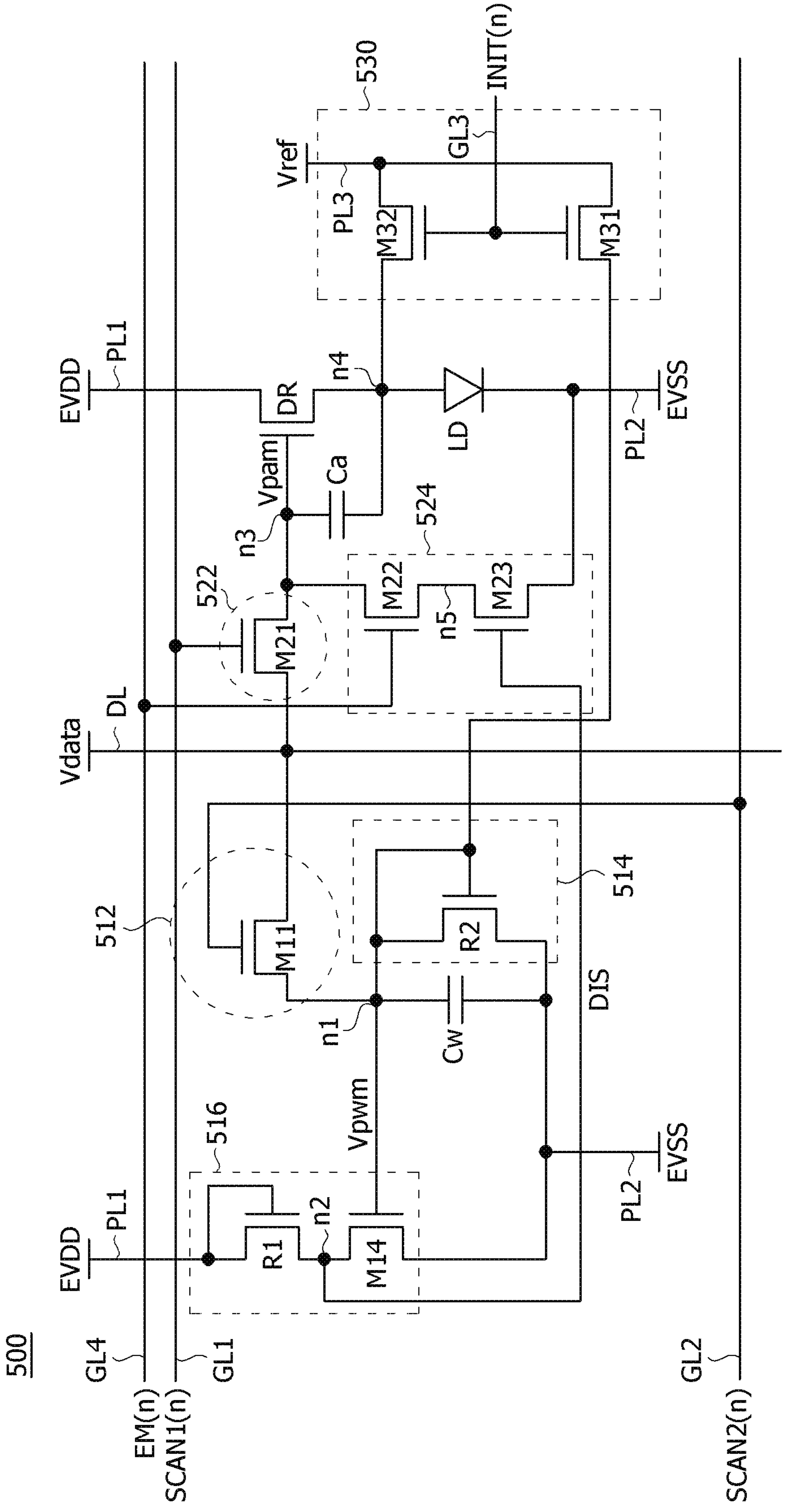
FIG. 6 is a circuit diagram illustrating the pixel circuit shown in FIG. 5 in detail according to an embodiment of the present disclosure.

FIG. 6 is a circuit diagram illustrating the pixel circuit shown in FIG. 5 in detail according to an embodiment of the present disclosure.

Referring to FIG. 6, the driving transistor DR can include a first electrode to which the pixel driving voltage EVDD is applied, a gate electrode connected to a third node n3, and a second electrode connected to a fourth node n4. The light-emitting element LD can include an anode electrode connected to the fourth node n4 and a cathode electrode to which the ground voltage EVSS is applied.

The PWM circuit 510 outputs the discharge control signal DIS, which instructs a second capacitor Ca to discharge according to a voltage change in a first capacitor Cw. The PWM circuit 510 can include the first capacitor Cw, a first charging circuit 512, a first discharging circuit 514, and an inverting circuit 516. The first capacitor Cw is connected between a first node n1 and the second power line PL2 to which the ground voltage EVSS is applied.

The first charging circuit 512 charges the first capacitor Cw with the PWM data voltage. The first charging circuit 512 can include a first PWM transistor M11. The first PWM transistor M11 is connected between the data line DL and the first node n1 and is turned on/off in response to the second gate signal SCAN2(*n*). When the first PWM transistor M11 is turned on in response to the gate-on voltage VGH of the second gate signal SCAN2(*n*), the data line DL is electrically connected to the first node n1 to which the data voltage Vdata is applied. The first PWM transistor M11 includes a first electrode connected to the first node n1, a gate electrode to which the second gate signal SCAN2(*n*) is applied, and a second electrode connected to the data line DL.

The first discharging circuit 514 discharges the voltage of the first capacitor Cw. The first discharging circuit 514 can include a second PWM transistor R2 having a channel resistance across the first capacitor Cw. The second PWM transistor R2 serves as a resistance to discharge a voltage of the first capacitor Cw, (e.g., a voltage Vpwm of the first node n1), during the light-on interval of the light-emitting element LD, which is determined by the PWM data voltage. The voltage of the first capacitor Cw can be slowly discharged by the time constant of the RC circuit. The second PWM transistor R2 includes a first electrode and a gate electrode connected to the first node n1, and a second electrode to which the ground voltage EVSS is applied.

Figure 12:
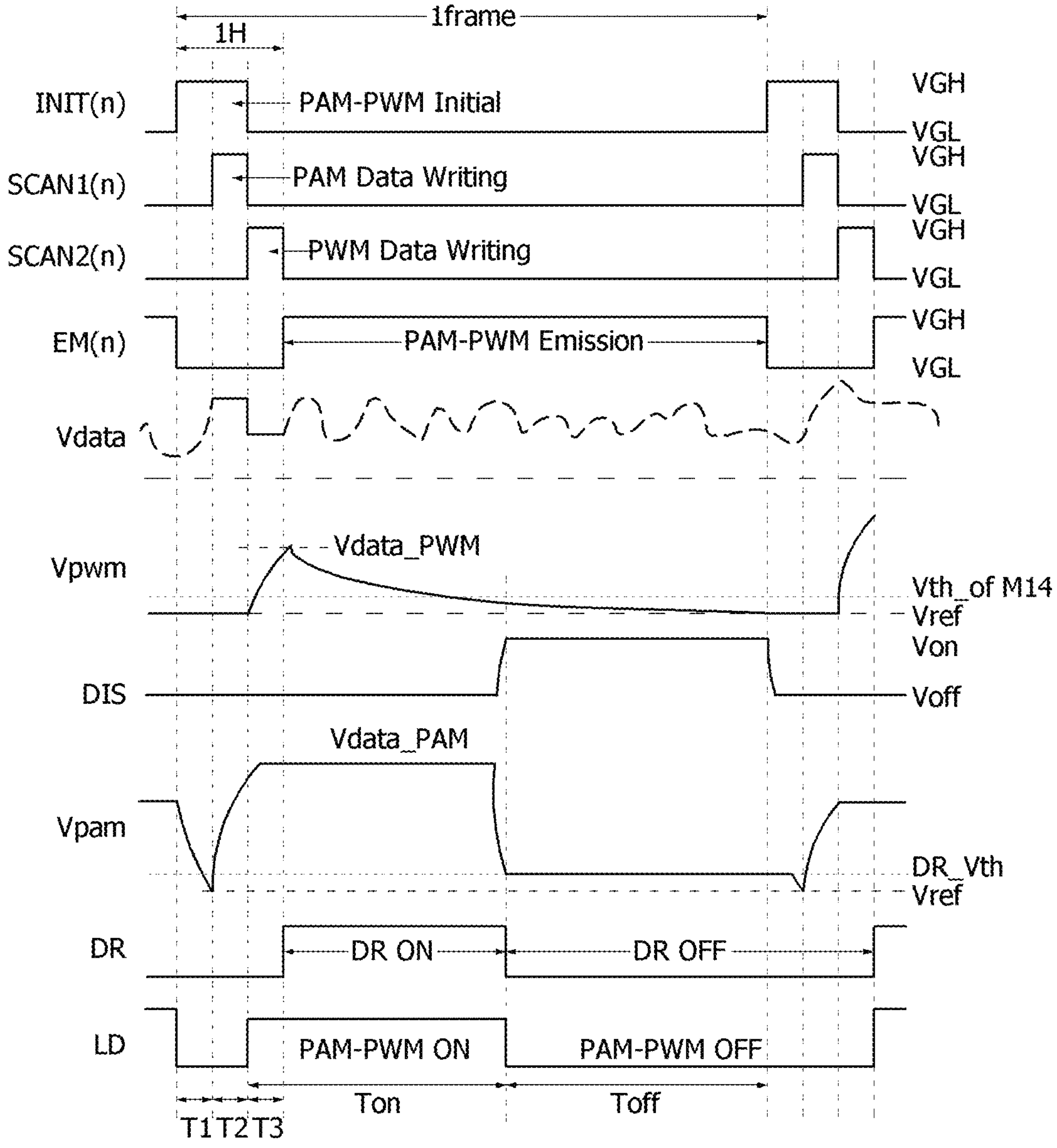
FIG. 12 is a waveform diagram illustrating an example of signals applied to the pixel circuit shown in FIG. 6 at an intermediate grayscale and the luminance and light-on interval of the light-emitting element according to an embodiment of the present disclosure.
Figure 14:
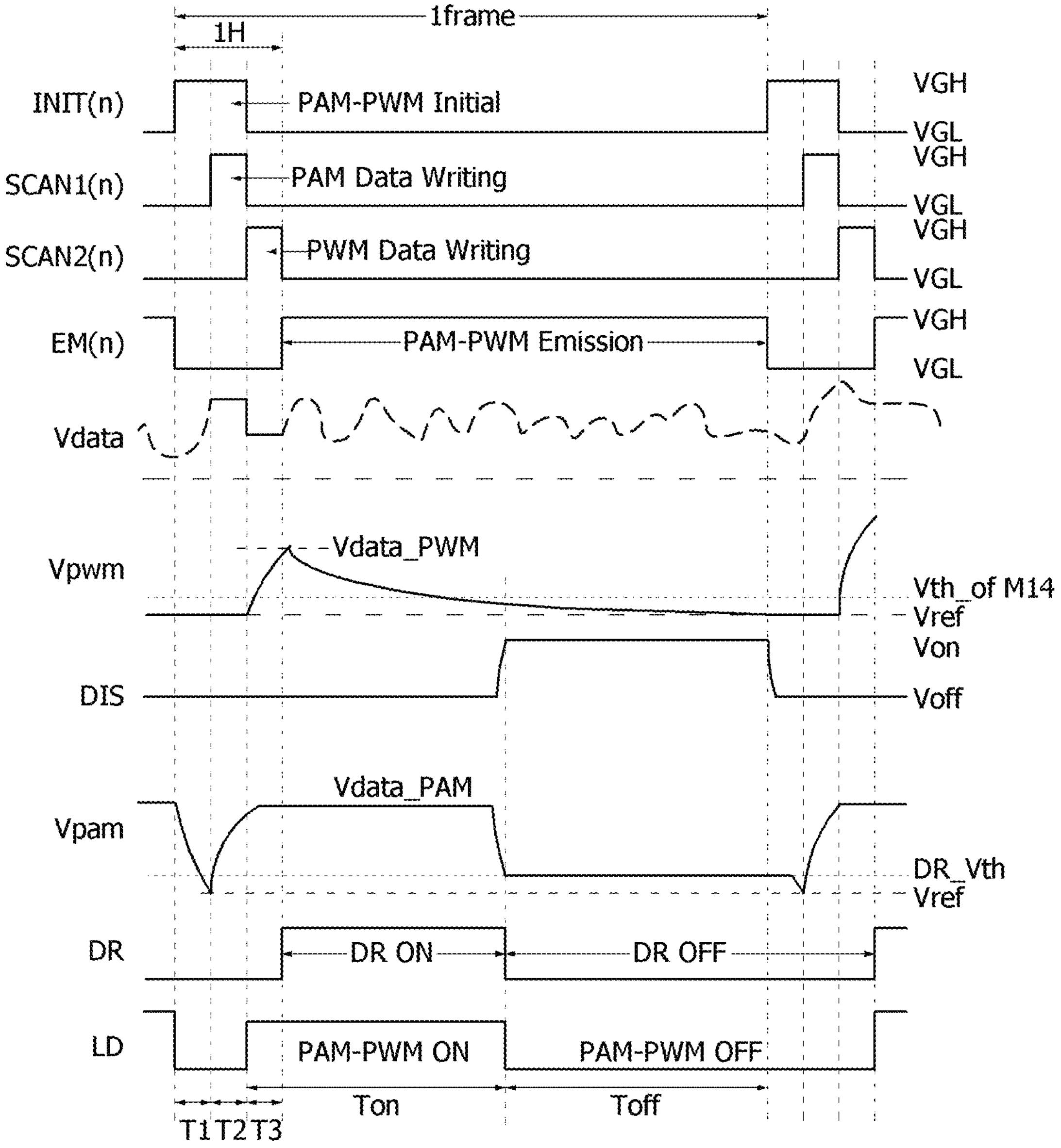
FIG. 14 is a waveform diagram illustrating another example of signals applied to the pixel circuit shown in FIG. 6 at a low grayscale and the luminance and light-on interval of the light-emitting element according to an embodiment of the present disclosure.

The inverting circuit 516 can invert the voltage of the discharge control signal DIS from an off-level to an on-level at an interval in which the voltage of the first node n1 is lowered as shown in FIGS. 12 and 14. When the voltage of the first node n1 is an on-level voltage, the discharge control signal DIS can be output as an off-level voltage, for example, a ground voltage EVSS. When the voltage of the first node n1 is an off-level voltage, the discharge control signal DIS can be output as an on-level voltage, for example, the pixel driving voltage EVDD. When the voltage of the discharge control signal DIS is an on-level voltage, the second capacitor Ca of the PAM circuit 520 can be discharged.

The inverting circuit 516 can include a third PWM transistor R1 and a fourth PWM transistor M14 connected in series between the pixel driving voltage EVDD and the ground voltage EVSS. The third PWM transistor R1 serves as a resistance to supply the pixel driving voltage EVDD to a second node n2 from which the discharge control signal DIS is output. The third PWM transistor R1 includes a first electrode and a gate electrode to which the pixel driving voltage EVDD is applied, and a second electrode connected to the second node n2.

The fourth PWM transistor M14 is connected between the second node n2 and the second power line PL2 and is turned on when the voltage of the first node n1 is the on-level voltage. When the fourth PWM transistor M14 is turned on, the second node n2 is electrically connected to the second power line PL2 to lower the voltage of the second node n2 to the ground voltage EVSS. The on-level voltage of the first node n1 can be a voltage equal to or higher than the threshold voltage of the fourth PWM transistor M14. When the first capacitor Cw is fully discharged, the voltage of the first node n1 is lowered to the off-level voltage. The off-level voltage can be a voltage lower than the threshold voltage of the fourth PWM transistor M14. The fourth PWM transistor M14 is turned off when the voltage of the first node n1 is the off-level voltage to invert the voltage of the discharge control signal DIS to the on-level voltage. The fourth PWM transistor M14 includes a first electrode connected to the second node n2, a gate electrode connected to the first node n1, and a second electrode to which the ground voltage EVSS is applied.

The PAM circuit 520 can include the second capacitor Ca, a second charging circuit 522, and a second discharging circuit 524. The second capacitor Ca is connected between the third node n3 and the fourth node n4.

The second charging circuit 522 charges the second capacitor Ca with the PAM data voltage. The second charging circuit 522 can include a first PAM transistor M21. The first PAM transistor M21 is turned on in response to the gate-on voltage VGH of the first gate signal SCAN1(*n*) to electrically connect the data line DL to which the data voltage Vdata is applied to the third node n3. The first PAM transistor M21 includes a first electrode connected to the third node n3, a gate electrode to which the first gate signal SCAN1(*n*) is applied, and a second electrode connected to the data line DL.

The second discharging circuit 524 discharges the second capacitor Ca in response to the on-level voltage of the discharge control signal DIS. The second discharging circuit 524 can include a second PAM transistor M22 and a third PAM transistor M23 connected in series between the third node n3 and the second power line PL2. When both the second and third PAM transistors M22 and M23 are in the on-state, the voltage of the second capacitor Ca, e.g., the voltage Vpam of the third node n3, can be discharged to the ground voltage EVSS.

The second PAM transistor M22 is connected between the third node n3 and a fifth node n5 and is turned on in response to the gate-on voltage VGH of the fourth gate signal EM(n). When the second PAM transistor M22 is turned on, the third node n3 is electrically connected to the fifth node n5. The second PAM transistor M22 includes a first electrode connected to the third node n3, a gate electrode to which the fourth gate signal EM(n) is applied, and a second electrode connected to the fifth node n5.

The third PAM transistor M23 is connected between the fifth node n5 and the second power line PL2 and is turned on in response to the on-level voltage of the discharge control signal DIS, while it is turned off in response to the off-level voltage of the discharge control signal DIS. When the third PAM transistor M23 is turned on, the fifth node n5 can be electrically connected to the second power line PL2. The third PAM transistor M23 includes a first electrode connected to the fifth node n5, a gate electrode connected to the second node n2 from which the discharge control signal DIS is output, and a second electrode to which the ground voltage EVSS is applied.

The initialization circuit 530 supplies the reference voltage Vref to the first node n1 and the fourth node n4 in response to the gate-on voltage VGH of the third gate signal INIT(n). The initialization circuit 530 can include a first initialization transistor M31 and a second initialization transistor M32. In other words, the initialization circuit 530 supplies the reference voltage Vref to both of the PWM circuit 510 and the PAM circuit 520.

The first initialization transistor M31 is turned on in response to the gate-on voltage VGH of the third gate signal INIT(n) to supply the reference voltage Vref to the first node n1. When the first initialization transistor M31 is turned on, the first node n1 can be electrically connected to the third power line PL3 to which the reference voltage Vref is applied so that the first capacitor Cw is initialized. The first initialization transistor M31 includes a first electrode connected to the first node n1, a gate electrode to which the third gate signal INIT(n) is applied, and a second electrode to which the reference voltage Vref is applied.

The second initialization transistor M32 is turned on in response to the gate-on voltage VGH of the third gate signal INIT(n) to supply the reference voltage Vref to the fourth node n4. When the second initialization transistor M32 is turned on, the fourth node n4 can be electrically connected to the third power line PL3 to which the reference voltage Vref is applied, so that the second capacitor Ca, the driving transistor DR, and the anode voltage of the light-emitting element LD are initialized. The second initialization transistor M32 includes a first electrode connected to the fourth node n4, a gate electrode to which the third gate signal INIT(n) is applied, and a second electrode to which the reference voltage Vref is applied.

The luminance of each of the sub-pixels is determined by the luminance (or current amount) of the light-emitting element LD, which is determined by the PAM data voltage, and the light-on interval of the light-emitting element LD, which is determined by the PWM data voltage. The luminance of each of the sub-pixels can be determined according to the grayscale value of the pixel data. 8-bit pixel data has 256 grayscale, ranging from 0 to 255. In this situation, the low grayscale can be a grayscale having a grayscale value of 80 or less, and the high grayscale can be a grayscale having a grayscale value of 180 or more, but are not limited thereto. The intermediate grayscale can be, but is not limited to, a grayscale ranging from 81 to 179 between the low grayscale and the high grayscale. In other words, the PAM data voltage can determine the brightness level of the sub-pixel and the PWM data voltage can determine how long the sub-pixel should emit light at that brightness level. In this way, the brightness level and the on duration of each individual sub-pixel can be independently controlled to improve image quality and prevent color shifts.

Figure 7:
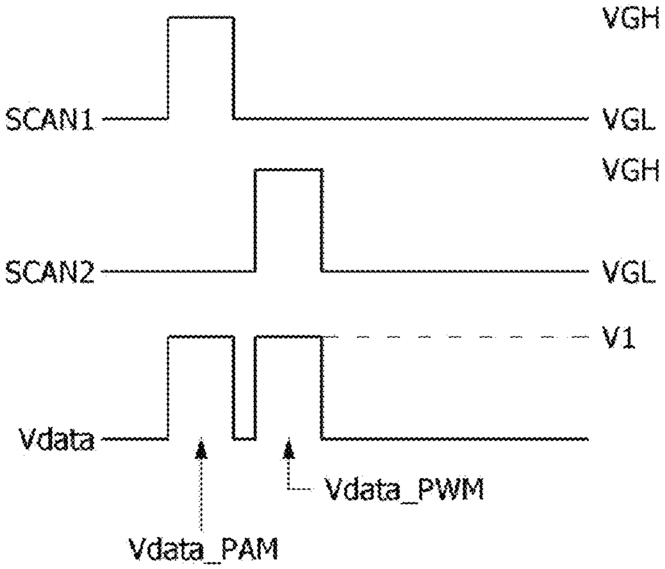
FIG. 7 is a waveform diagram illustrating an example of a data voltage of a high grayscale according to an embodiment of the present disclosure.

FIG. 7 is a waveform diagram illustrating an example of a data voltage of the high grayscale.

Figure 11:
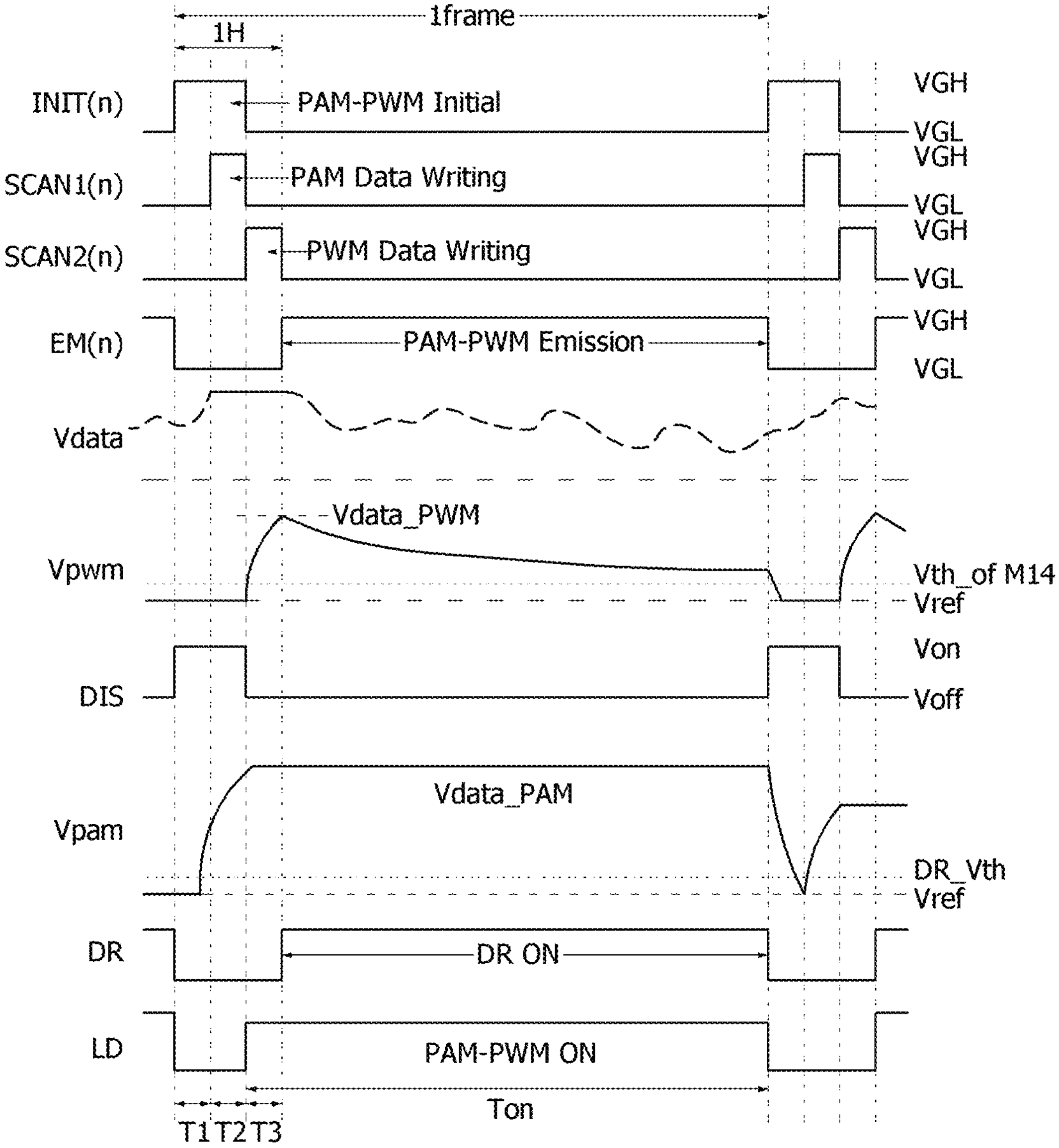
FIG. 11 is a waveform diagram illustrating an example of signals applied to the pixel circuit shown in FIG. 6 at a high grayscale and the luminance and light-on interval of the light-emitting element according to an embodiment of the present disclosure.

Referring to FIG. 7, when both the PAM data voltage Vdata_PAM and the PWM data voltage Vdata_PWM are at a high voltage, for example, the first voltage V1, the luminance of the high grayscale can be implemented (e.g., such as for providing a white image). The higher the PAM data voltage Vdata_PAM, the higher the amount of current flowing through the light-emitting element LD, which can increase the luminance of the light-emitting element LD. The higher the PWM data voltage Vdata_PWM, the longer the light-on interval of the light-emitting element LD, which is emitted at a high luminance within a one-frame period, as shown in FIG. 11. In other words, the amplitude of the PAM data voltage Vdata_PAM determines how bright the sub-pixel should be during the emission period, and the amplitude of the PWM data voltage Vdata_PWM determines how long the emission should period last. For example, if amplitude of the PAM data voltage Vdata_PAM is high, then provide high brightness level, and if amplitude of the PAM data voltage Vdata_PAM is low, then provide low brightness level. Also, if amplitude of the PWM data voltage Vdata_PWM is high, then provide a long emission period, and if amplitude of the PWM data voltage Vdata_PWM is low, then provide a short emission period. In this way, the brightness level and the on duration can be independently controlled for each sub-pixel, and different colored sub-pixels can be controlled differently, which can improve image quality.

Figure 8:
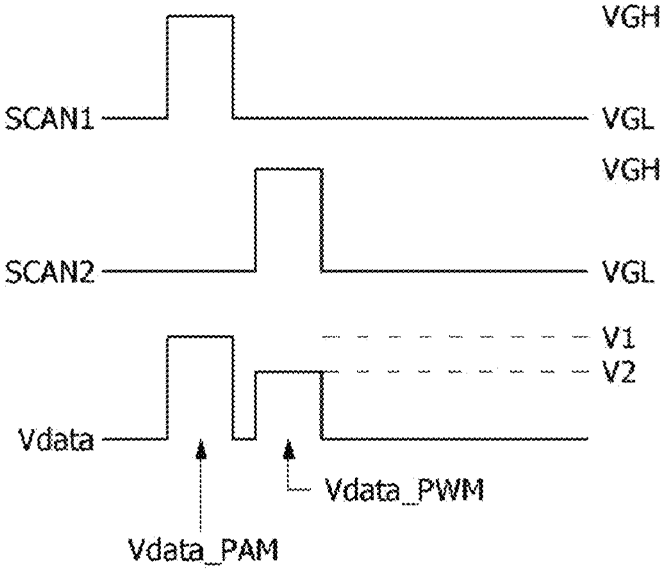
FIG. 8 is a waveform diagram illustrating an example of a data voltage of an intermediate grayscale according to an embodiment of the present disclosure.

FIG. 8 is a waveform diagram illustrating an example of a data voltage of the intermediate grayscale.

Referring to FIG. 8, the luminance of the intermediate grayscale can be realized when the PAM data voltage Vdata_PAM is at a high voltage V1 and the PWM data voltage Vdata_PWM is at a relatively low voltage V2. Although the luminance of the light-emitting element LD is high due to the high PAM data voltage Vdata_PAM, the light-on interval is shortened within one frame period as shown in FIG. 12, so that the luminance of the sub-pixel can be realized at the luminance of the intermediate grayscale. In other words, the brightness level is high but the emission period (e.g., ON duration) is set to a shorter amount of time, thus providing the luminance of the intermediate grayscale.

Figure 9:
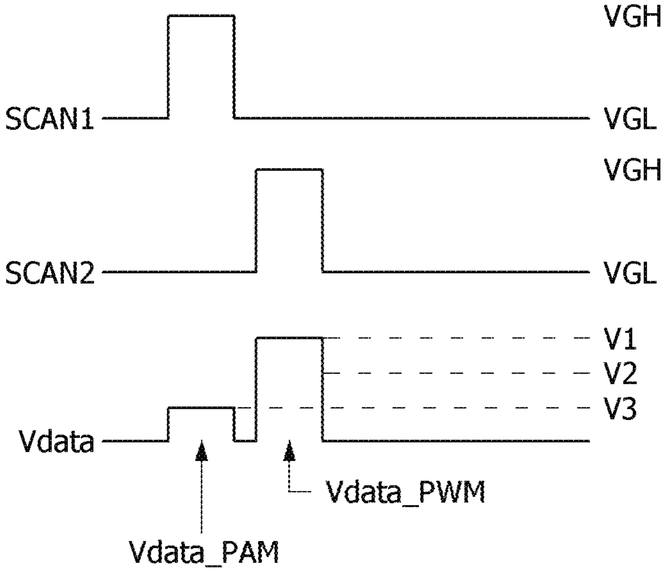
FIG. 9 is a waveform diagram illustrating an example of a data voltage of a low grayscale according to an embodiment of the present disclosure.

FIG. 9 is a waveform diagram illustrating an example of a data voltage of the low grayscale.

Figure 13:
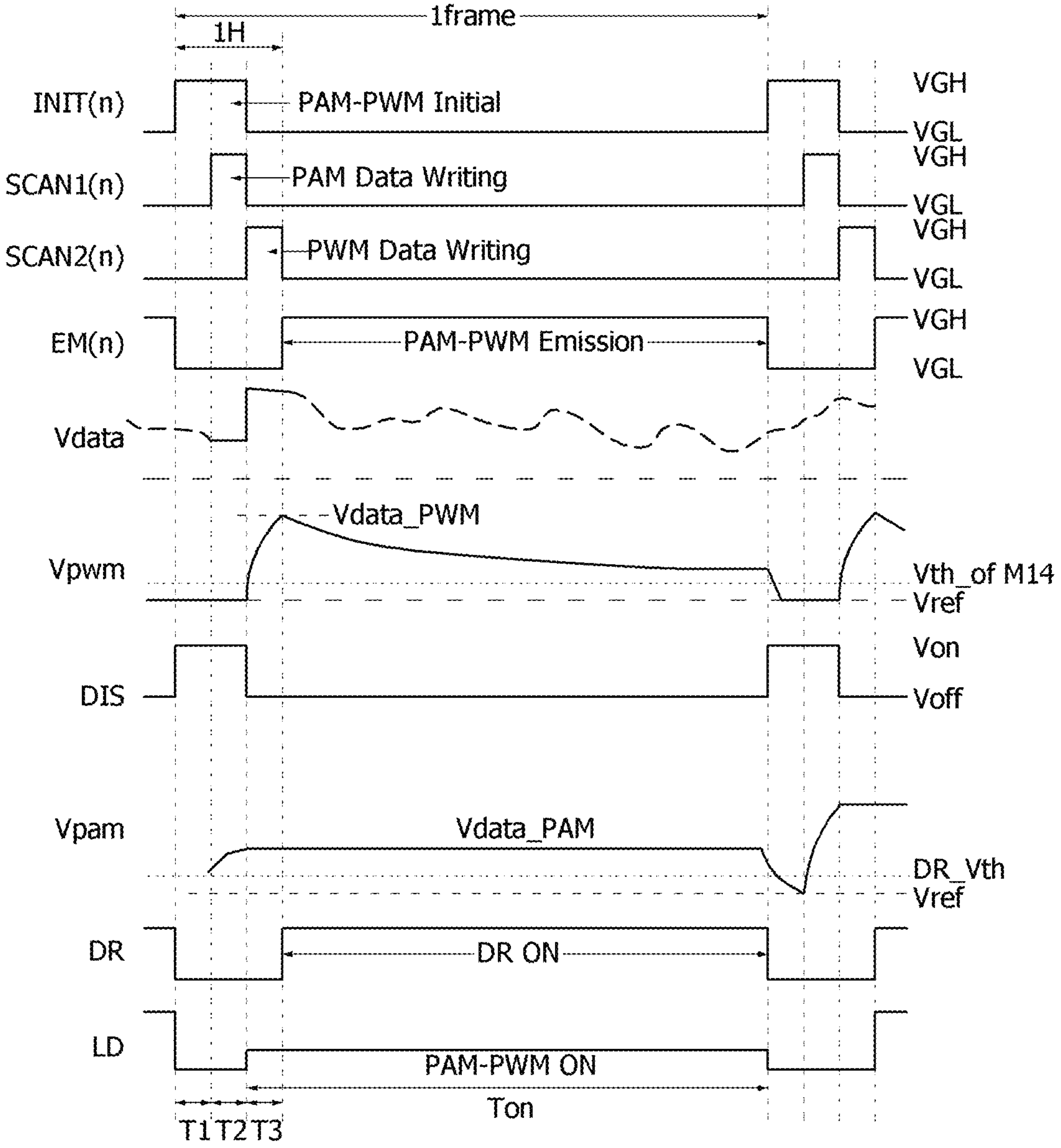
FIG. 13 is a waveform diagram illustrating an example of signals applied to the pixel circuit shown in FIG. 6 at a low grayscale and the luminance and light-on interval of the light-emitting element according to an embodiment of the present disclosure.

Referring to FIG. 9, the luminance of the low grayscale can be realized when the PAM data voltage Vdata_PAM is a low voltage V3 and the PWM data voltage Vdata_PWM is a high voltage V1. The luminance of the light-emitting element LD becomes lower when the PAM data voltage Vdata_PAM is low, and the light-on interval within one frame period becomes longer when the PWM data voltage Vdata_PWM is high, so that the sub-pixel can emit light at a luminance of the low grayscale, as shown in FIG. 13. This can also improve image quality even at low grayscale, e.g., even though the sub-pixel is dimly lit, it can be maintained for a long emission period.

Figure 10:
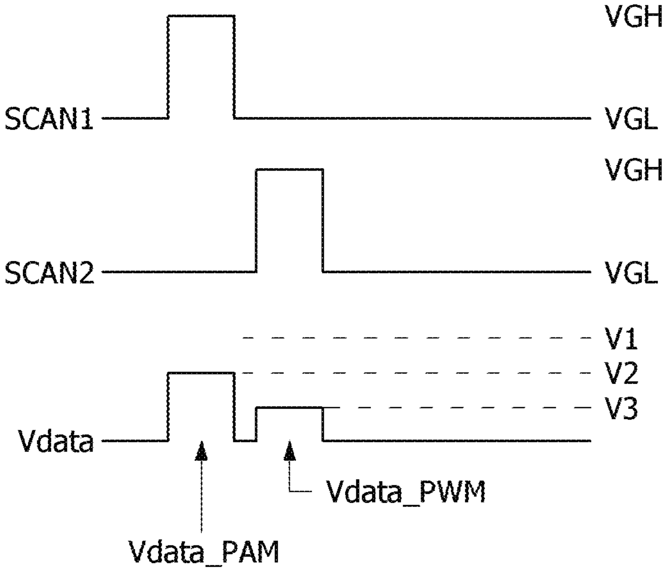
FIG. 10 is a waveform diagram illustrating another example of a data voltage of a low grayscale according to an embodiment of the present disclosure.

FIG. 10 is a waveform diagram illustrating another example of a data voltage of the low grayscale.

Referring to FIG. 10, the luminance of the low grayscale can be realized when the PAM data voltage Vdata_PAM is at a low voltage V2 or a V3 and the PWM data voltage Vdata_PWM is at a low voltage V3. The luminance of the light-emitting element LD becomes lower when the PAM data voltage Vdata_PAM is low, and the light-on interval within one frame period becomes shorter when the PWM data voltage Vdata_PWM is low, so that the sub-pixel can emit light at a luminance of the low grayscale, as shown in FIG. 14. For example, the sub-pixel can be dimly lit, and it can be maintained for a short emission period, which can provide a finer granularity of control in order to improve image quality even at low grayscale. For example, this can be particularly useful to a user in certain situations, such as when using the display device in a low power mode or a nighttime/bedtime viewing mode, in which good color reproduction can still be maintained even at low brightness levels.

FIG. 11 is a waveform diagram illustrating an example of signals applied to the pixel circuit shown in FIG. 6 at a high grayscale and the luminance and light-on interval of the light-emitting element (e.g., bright level and long ON duration). FIG. 12 is a waveform diagram illustrating an example of signals applied to the pixel circuit shown in FIG. 6 at an intermediate grayscale and the luminance and light-on interval of the light-emitting element (e.g., bright level and short ON duration). FIG. 13 is a waveform diagram illustrating an example of signals applied to the pixel circuit shown in FIG. 6 at a low grayscale and the luminance and light-on interval of the light-emitting element (e.g., dim level and long ON duration). FIG. 14 is a waveform diagram showing another example of signals applied to the pixel circuit shown in FIG. 6 at a low grayscale and the luminance and light-on interval of the light-emitting element (e.g., dim level and short ON duration).

In FIGS. 11 to 14, "DR_Vth" denotes the threshold voltage of the driving transistor DR, and "Vth_of M14" denotes the threshold voltage of the fourth PWM transistor M14. The dashed-line section of the data voltage Vdata represents the data voltage applied to a preceding pixel line and a following pixel line.

Referring to FIGS. 11 to 14, the pixel circuit 500 can be operated in an initialization step, a PAM data writing step, a PWM data writing step, and a light-on step every frame period. In the intermediate grayscale and the low grayscale, the pixel circuit 500 can be driven in the light-off step after the light-on step.

The initialization step, the PAM data writing step, and the PWM data writing step can be performed sequentially within one horizontal period (1H). The initialization step can be performed during a first period T1. During the first period T1, the PWM circuit 510, the PAM circuit 520, the light-emitting element LD, and the driving transistor DR in each of the sub-pixels are initialized. The PAM data writing step can be performed during a second period T2. During the second period T2, the second capacitor Ca of the PAM circuit 520 is charged with the PAM data voltage supplied through the data line DL, causing the PAM data to be written to the sub-pixels. The PWM data writing step can be performed during a third period T3. During the third period T3, the first capacitor Cw of the PWM circuit 510 is charged with the PWM data voltage, causing the PWM data to be written to the sub-pixels. The light-emitting element LD can begin to emit light from the third period T3 (e.g., DR ON period).

The light-on step and the light-off step can be divided into two time periods determined by the PWM data voltage Vdata_PWM within the remaining time, which is one frame period minus one horizontal period 1H. The light-on step is performed during a light-on interval Ton of the light-emitting element LD that becomes longer as the PWM data voltage Vdata_PWM increases (e.g., the higher the amplitude of Vdata_PWM, then the longer the ON emission period is). The light-off step is performed during a light-off interval Toff, which starts from when the voltage of the discharge control signal DIS is inverted from the off-level voltage Voff to the on-level voltage Von. When the voltage of the discharge control signal DIS is inverted from the off-level voltage Voff to the on-level voltage Von, the voltage of the second capacitor Ca is discharged to turn off the driving transistor DR, which causes the light-emitting element LD to turn off.

Figure 15:
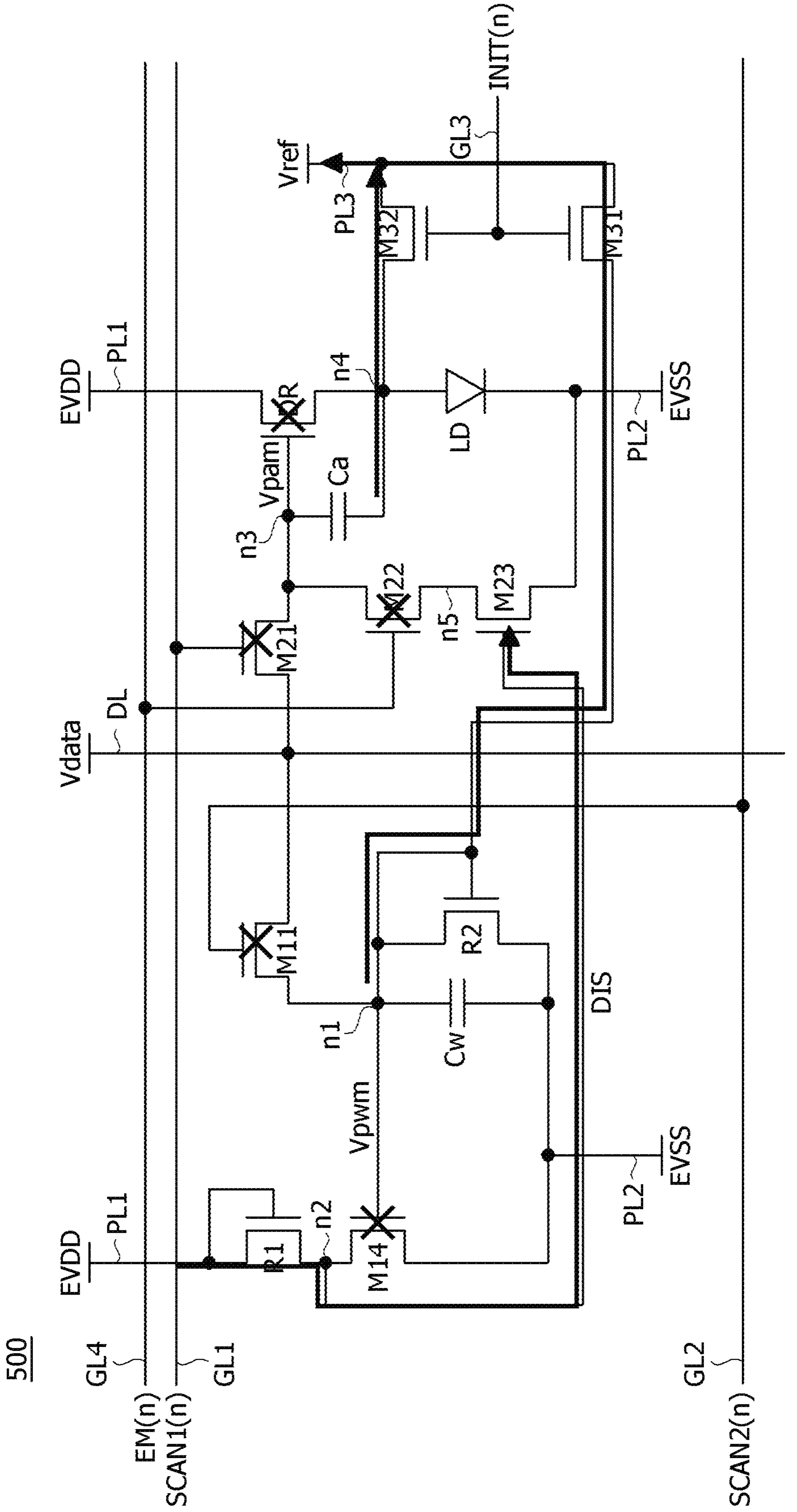
FIG. 15 is a circuit diagram illustrating the operation of the pixel circuit shown in FIG. 6 in an initialization step according to an embodiment of the present disclosure.

FIG. 15 is a circuit diagram illustrating the operation of the pixel circuit shown in FIG. 6 in the initialization step.

Referring to FIGS. 11 to 15, the voltage of the third gate signal INIT(n) is the gate-on voltage VGH during the first period T1. During the first period T1, the voltage of the first gate signal SCAN1(*n*), the second gate signal SCAN2(*n*), and the fourth gate signal EM(n) is the gate-off voltage VGL. Accordingly, during the first period T1, the initialization transistors M31 and M32 are turned on.

During the first period T1, the pixel driving voltage EVDD is applied to the gate electrode of the third PAM transistor M23 through the third PWM transistor R1 and the second node n2, causing the third PAM transistor M23 to turn on. During the first period T1, the first PWM transistor M11, the fourth PWM transistor M14, the first PAM transistor M21, and the second PAM transistor M22, among the transistors serving as switch elements, are in the off-state, and the driving transistor DR is in the off-state. During the first period T1, the light-emitting element LD is in the off-state.

The data voltage Vdata and the reference voltage Vref can be 0V in the first period T1. In this situation, during the first period T1, the voltages of the first node n1 and the fourth node n4 are initialized to 0V. The voltage of the second node n2 can be the pixel driving voltage EVDD, for example, 22V, in the first period T1. In the first period T1, the voltage of the third node n3 can be the PAM data voltage Vdata_PAM, which was charged in a previous frame period.

Figure 16:
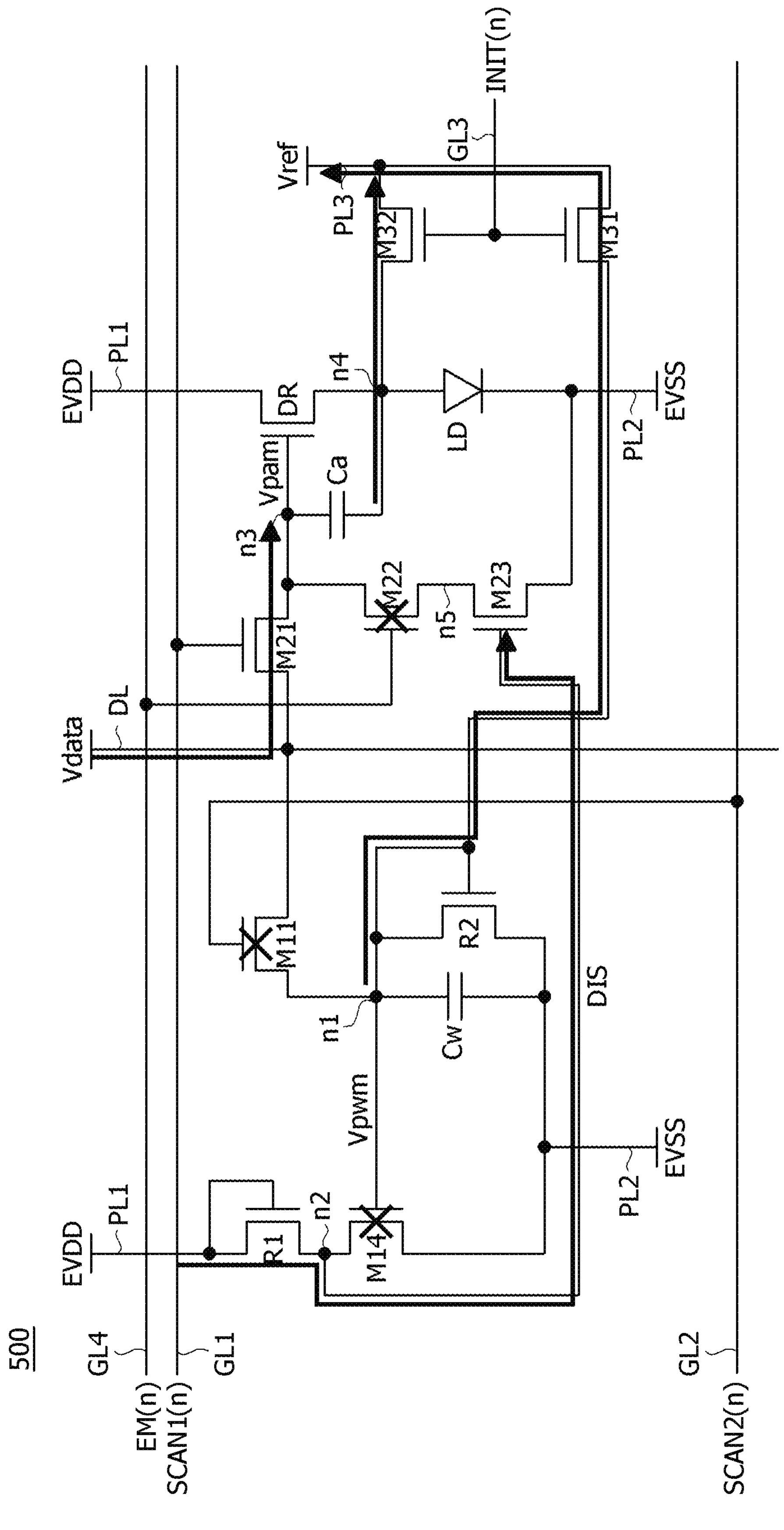
FIG. 16 is a circuit diagram illustrating the operation of the pixel circuit shown in FIG. 6 in a PAM data writing step according to an embodiment of the present disclosure.

FIG. 16 is a circuit diagram illustrating the operation of the pixel circuit shown in FIG. 6 during the PAM data writing step.

Referring to FIGS. 11 to 14, and FIG. 16, during the second period T2, the voltage of the first gate signal SCAN1(*n*) and the third gate signal INIT(n) is the gate-on voltage VGH. During the second period T2, the voltage of the second gate signal SCAN2(*n*) and the fourth gate signal EM(n) is the gate-off voltage VGL. Accordingly, during the second period T2, the first PAM transistor M21 and the initialization transistors M31 and M32 are turned on.

During the second period T2, the pixel driving voltage EVDD is applied to the gate electrode of the third PAM transistor M23 through the third PWM transistor R1 and the second node n2, causing the third PAM transistor M23 to turn on. During the second period T2, the first PWM transistor M11, the fourth PWM transistor M14, and the second PAM transistor M22, among transistors serving as the switch element, are in the off-state.

During the second period T2, the data voltage Vdata changes to the PAM data voltage Vdata_PAM, and the reference voltage Vref is 0V. When the PAM data voltage Vdata_PAM is 7V, the second capacitor Ca can be charged, causing the voltage of the third node n3 to rise to 7V. During the second period T2, the voltage of the first node n1 and the fourth node n4 is 0V. The voltage of the second node n2 is the pixel driving voltage EVDD. During the second period T2, the driving transistor DR can be turned on so that current is generated by the gate-source voltage Vgs. In this situation, the gate-source voltage Vgs of the driving transistor DR can be 7V. The current generated from the driving transistor DR flows through the initialization transistors M31 and M32 to the ground voltage EVSS, and thus the light-emitting element LD is in the off-state, not emitting light.

Figure 17:
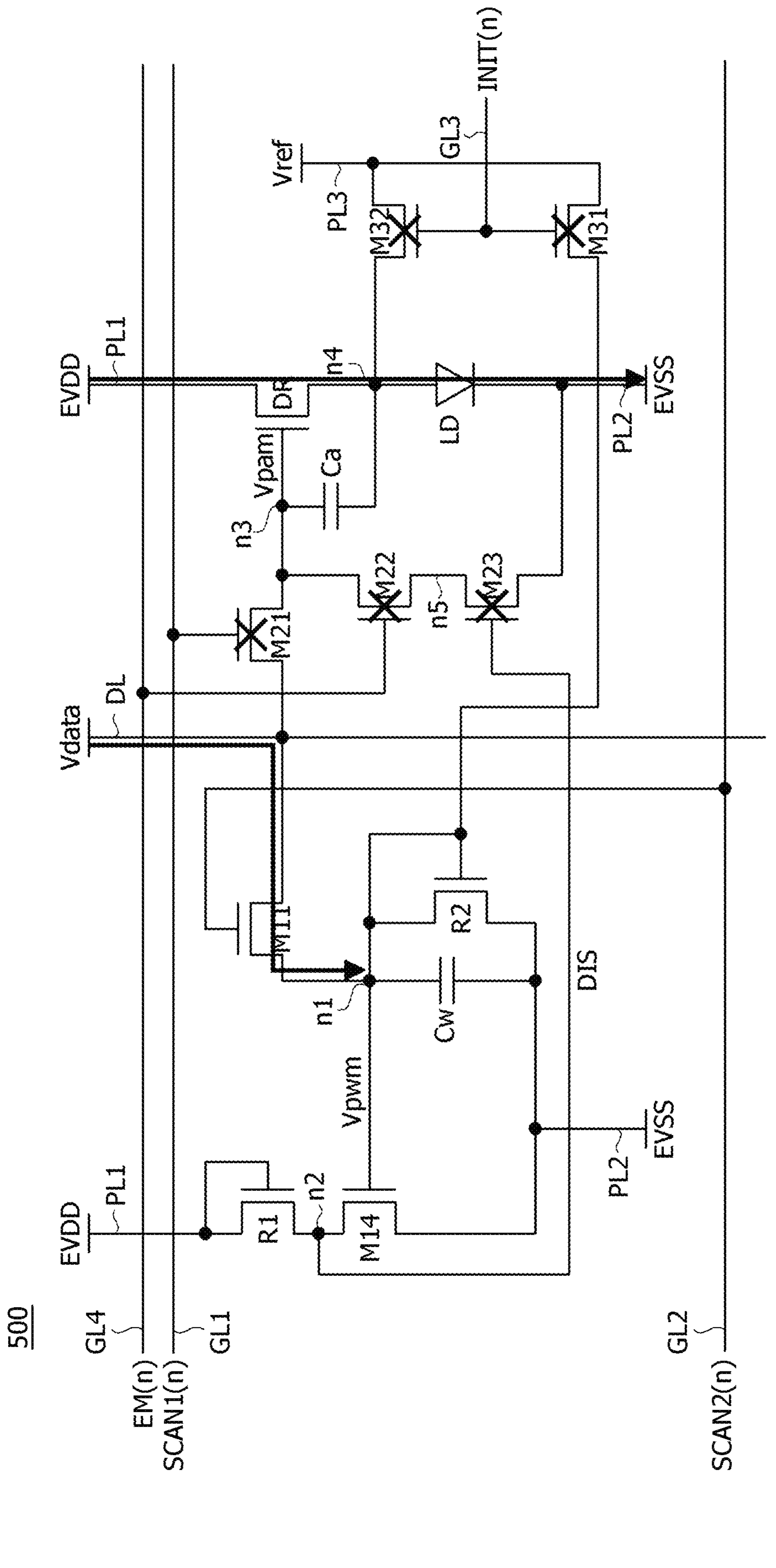
FIG. 17 is a circuit diagram illustrating the operation of the pixel circuit shown in FIG. 6 in a PWM data writing step according to an embodiment of the present disclosure.

FIG. 17 is a circuit diagram illustrating the operation of the pixel circuit shown in FIG. 6 during the PWM data writing step.

Referring to FIGS. 11 to 14, and FIG. 17, during the third period T3, the voltage of the second gate signal SCAN2(*n*) is the gate-on voltage VGH. During the third period T3, the voltage of the first gate signal SCAN1(*n*), the third gate signal INIT(n), and the fourth gate signal EM(n) is the gate-off voltage VGL. Accordingly, during the third period T3, the first PWM transistor M11 is turned on.

During the third period T3, the data voltage Vdata changes to the PWM data voltage Vdata_PWM. When the PWM data voltage Vdata_PWM is 6V, the first capacitor Cw is charged, causing the voltage of the first node n1 to rise to 6 V, which allows the fourth PWM transistor M14 to turn on, which in turn reduces the voltage of the second node n2 to 0 V, which in turn allows the third PAM transistor M23 to turn off. During the third period T3, the third node n3 is floated because the first and second PAM transistors M21 and M22 are in the off-state. Thus, when the voltage of the fourth node n4 rises to the anode voltage of the light-emitting element LD, for example, 3V, the voltage of the third node n3 can rise to 10 V by means of a capacitor coupling while the gate-source voltage Vgs of the driving transistor DR remains at 7V During the third period T3, the current generated according to the gate-source voltage Vgs of the driving transistor DR can flow to the light-emitting element LD, causing the light-emitting element LD to emit light.

During the third period T3, the first PAM transistor M21, the second PAM transistor M22, the third PAM transistor M23, and the initialization transistors M31 and M32, among transistors serving as switch elements, are in the off-state.

Figure 18:
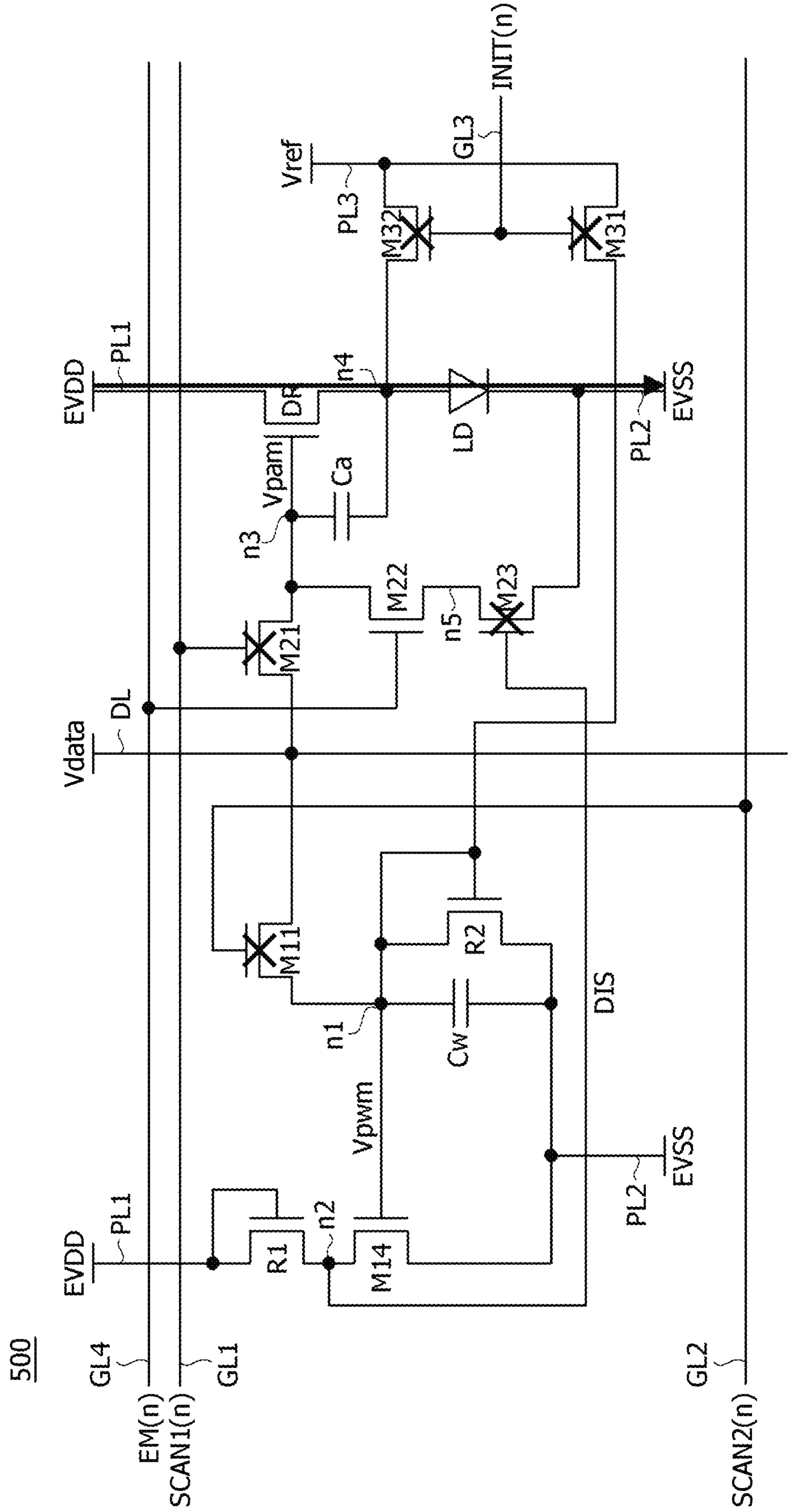
FIG. 18 is a circuit diagram illustrating the operation of the pixel circuit shown in FIG. 6 in a light-on step according to an embodiment of the present disclosure.

FIG. 18 is a circuit diagram illustrating the operation of the pixel circuit shown in FIG. 6 during the light-on step (e.g., when LD emits light).

Referring to FIGS. 11 to 14, and FIG. 18, during the light-on interval Ton, the voltage of the fourth gate signal EM(n) is the gate-on voltage VGH, and the voltage of the first gate signal SCAN1(*n*), the second gate signal SCAN2(*n*), and the third gate signal INIT(n) is the gate-off voltage VGL. Accordingly, the second PAM transistor M22 is turned on during the light-on interval Ton.

During the light-on interval Ton, the first PWM transistor M11, the first PAM transistor M21, the third PAM transistor M23, and the initialization transistors M31 and M32 are in the off-state.

During the light-on interval Ton, the data voltage Vdata can maintain the PWM data voltage Vdata_PWM, but it does not affect the PWM circuit 510 and the PAM circuit 520 because the first PWM transistor M11 and the first PAM transistor M21 are in the off-state during the light-on interval Ton.

During the light-on interval Ton, the light-emitting element LD can emit light by the current generated according to the gate-source voltage Vgs of the driving transistor DR, which is determined by the PAM data voltage Vdata_PAM charged in the second capacitor Ca. During the light-on interval Ton, the voltage of the first capacitor Cw is discharged by means of the resistance of the second PWM transistor R2, which lowers the voltage Vpwm of the first node n1. When the voltage Vpwm of the first node n1 becomes lower than the threshold voltage Vth of the fourth PWM transistor M14, the sub-pixel enters the light-off step. The light-on interval Ton can be extended in proportion to the PWM data voltage Vdata_PWM. For example, when the PWM data voltage Vdata_PWM is at the maximum voltage, as shown in FIG. 11 and FIG. 13, the remaining frame period, which is one frame period minus one horizontal period 1H, can be the light-on interval without the light-off interval Toff. As the PWM data voltage Vdata_PWM decreases, for example, as the voltage decreases as shown in FIGS. 12 and 14, the light-on interval Ton can decrease. In other words, once the PWM data voltage Vdata_PWM discharged from the first capacitor Cw decreases below a certain amount, then the light-emitting element LD is turned off. Thus, a greater charge stored in the first capacitor Cw can result in a longer ON duration for controlling emission of the light-emitting element LD.

When the voltage of the first capacitor Cw is discharged during the light-on interval Ton so that the voltage Vpwm of the first node n1 is lower than the threshold voltage Vth of the fourth PWM transistor M14, the fourth PWM transistor M14 is turned off so that the voltage of the second node n2 rises to the pixel driving voltage EVDD. At this time, the voltage of the discharge control signal DIS, which is determined by the voltage of the second node n2, is inverted to the on-level voltage Von to start the light-off step. During an interval in which the voltage Vpwm of the first node n1 decreases, the third PAM transistor MP23 is turned on to discharge the second capacitor Ca.

Figure 19:
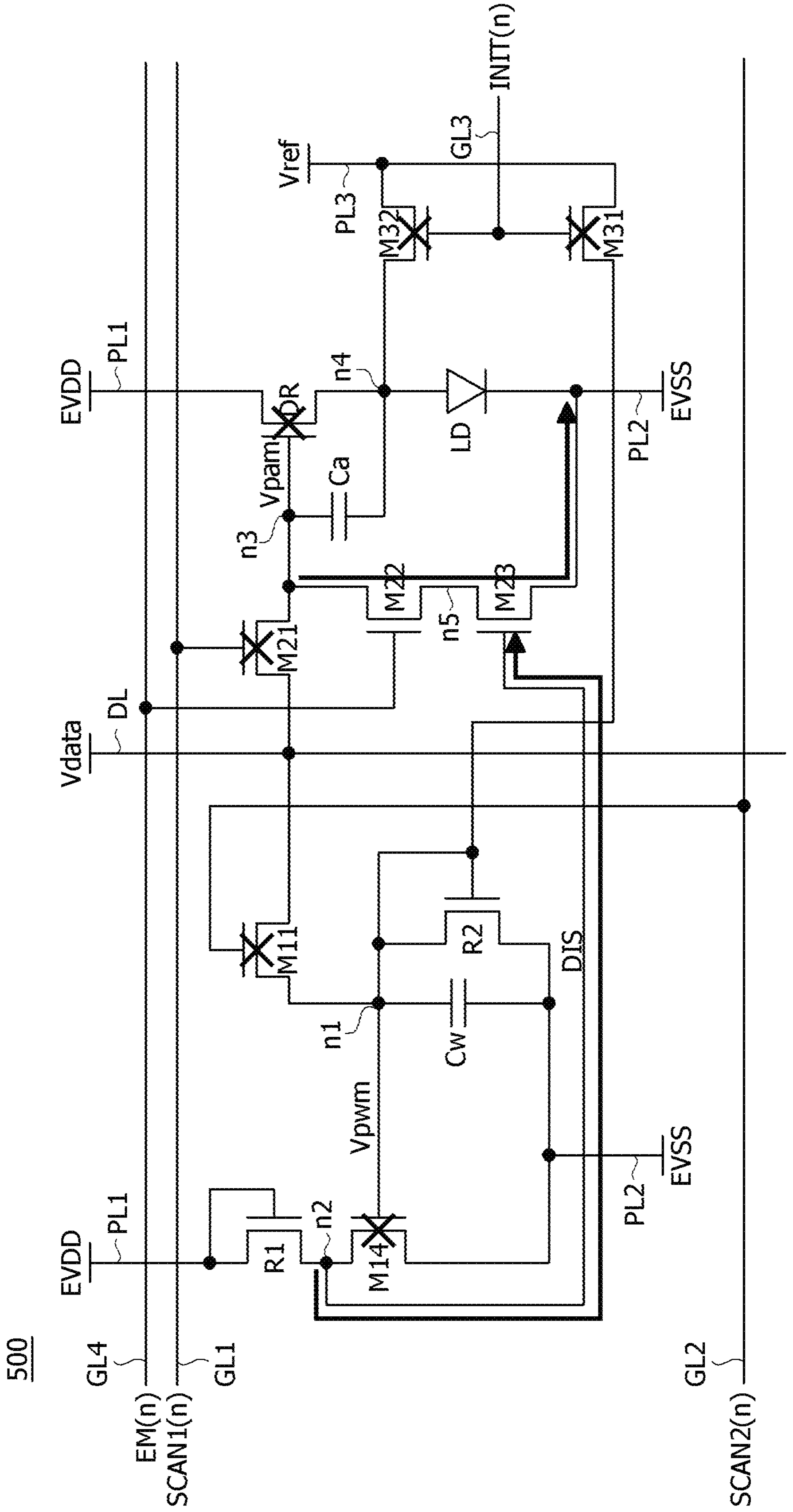
FIG. 19 is a circuit diagram illustrating the operation of the pixel circuit shown in FIG. 6 in a light-off step according to an embodiment of the present disclosure.

FIG. 19 is a circuit diagram illustrating the operation of the pixel circuit shown in FIG. 6 in the light-off step.

Referring to FIGS. 11 to 14, and FIG. 19, during the light-off interval Toff, the voltage of the fourth gate signal EM(n) is the gate-on voltage VGH, and the voltage of the first gate signal SCAN1(*n*), the second gate signal SCAN2(*n*), and the third gate signal INIT(n) is the gate-off voltage VGL. Accordingly, the second PAM transistor M22 remains in the on-state during the light-off interval Toff.

When the discharge control signal DIS is inverted to the on-level voltage Von, the third PAM transistor M23 is turned on. In this situation, when the voltage of the second capacitor Ca is rapidly discharged through the second and third PAM transistors M22 and M23 and the voltage Vpam of the third node n3 becomes lower than the threshold voltage Vth of the driving transistor DR, the driving transistor DR is turned off and the light-emitting element LD is turned off.

During the light-off interval Toff, the first PWM transistor M11, the fourth PWM transistor M14, the first PAM transistor M21, the initialization transistors M31 and M32, and the driving transistor DR are in the off-state. During the light-off interval Toff, the data voltage Vdata can maintain the PWM data voltage Vdata_PWM, but it does not affect the PWM circuit 510 and PAM circuit 520 because the first PWM transistor M11 and the first PAM transistor M21 are in the off-state during the light-off interval Toff.

Figure 20:
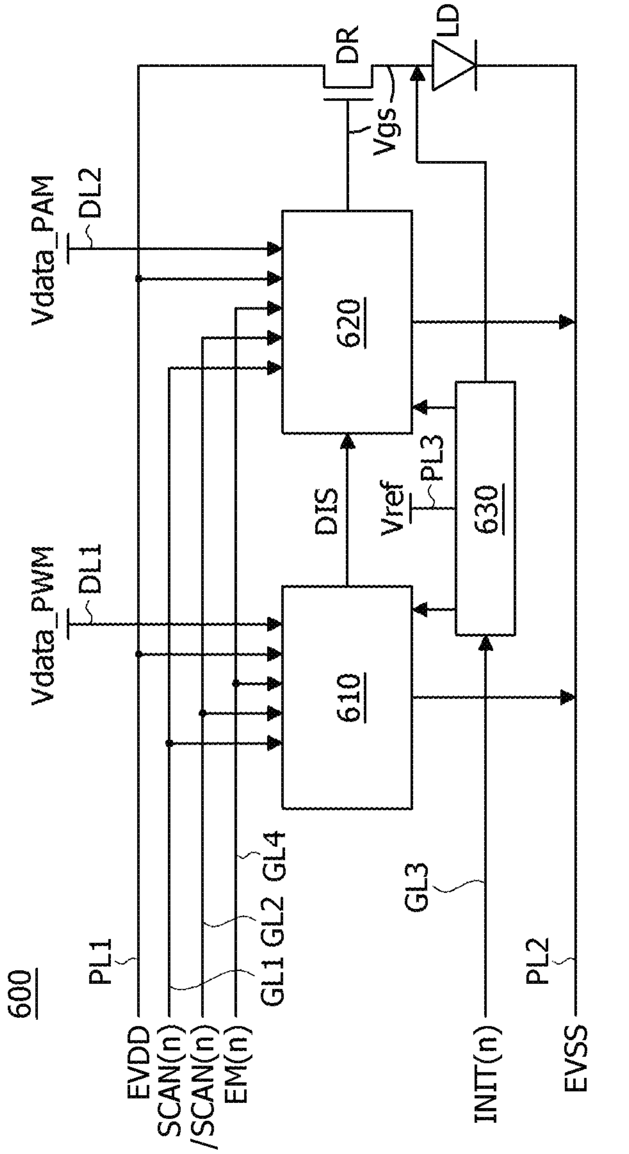
FIG. 20 is a block diagram schematically illustrating a pixel circuit according to another embodiment of the present disclosure.

FIG. 20 is a block diagram schematically illustrating a pixel circuit according to a second embodiment of the present disclosure. The pixel circuit shown in FIG. 20 is a pixel circuit 600 of a sub-pixel disposed in an (n)th pixel line. The pixel circuit shown in FIG. 20 is similar to the pixel circuit shown in FIG. 5, except that rather than connecting both the PWM circuit and the PAM circuit to the same data line DL and generating Vdata_PWM and Vdata_PAM internally as in FIG. 5, in FIG. 20 the PWM circuit and the PAM circuit are connected to different data lines, e.g., DL1 and DL2, and Vdata_PWM and Vdata_PAM can be provided externally. Also, the pixel circuit shown in FIG. 20 has some different elements so that it can be driven based on a scan signal SCAN(n) and its inverted signal/SCAN(n).

Referring to FIG. 20, the pixel circuit 600 includes a PWM circuit 610, a PAM circuit 620, an initialization circuit 630, a driving transistor DR, and a light-emitting element LD.

The PWM circuit 610 and the PAM circuit 620 can include a plurality of switch transistors and a capacitor. The transistors of the PWM circuit 610 and the PAM circuit 620, as well as the driving transistor DR can be implemented as, but are not limited to, n-channel transistors.

The pixel circuit 600 can be connected to a first data line DL1 to which the PWM data voltage Vdata_PWM is applied, a second data line DL2 to which the PAM data voltage Vdata_PAM is applied, a first gate line GL1 to which the first gate signal SCAN(n) is applied, a second gate line GL2 to which the second gate signal/SCAN(n) is applied, a third gate line GL3 to which the third gate signal INIT(n) is applied, a fourth gate line GL4 to which the fourth gate signal EM(n) is applied, a first power line PL1 to which the pixel driving voltage EVDD is applied, a second power line PL2 to which the ground voltage EVSS is applied, and a third power line PL3 to which the reference voltage Vref is applied. The power lines PL1, PL2, and PL3 can be commonly connected to the pixel circuits of all of the pixels.

Figure 22:
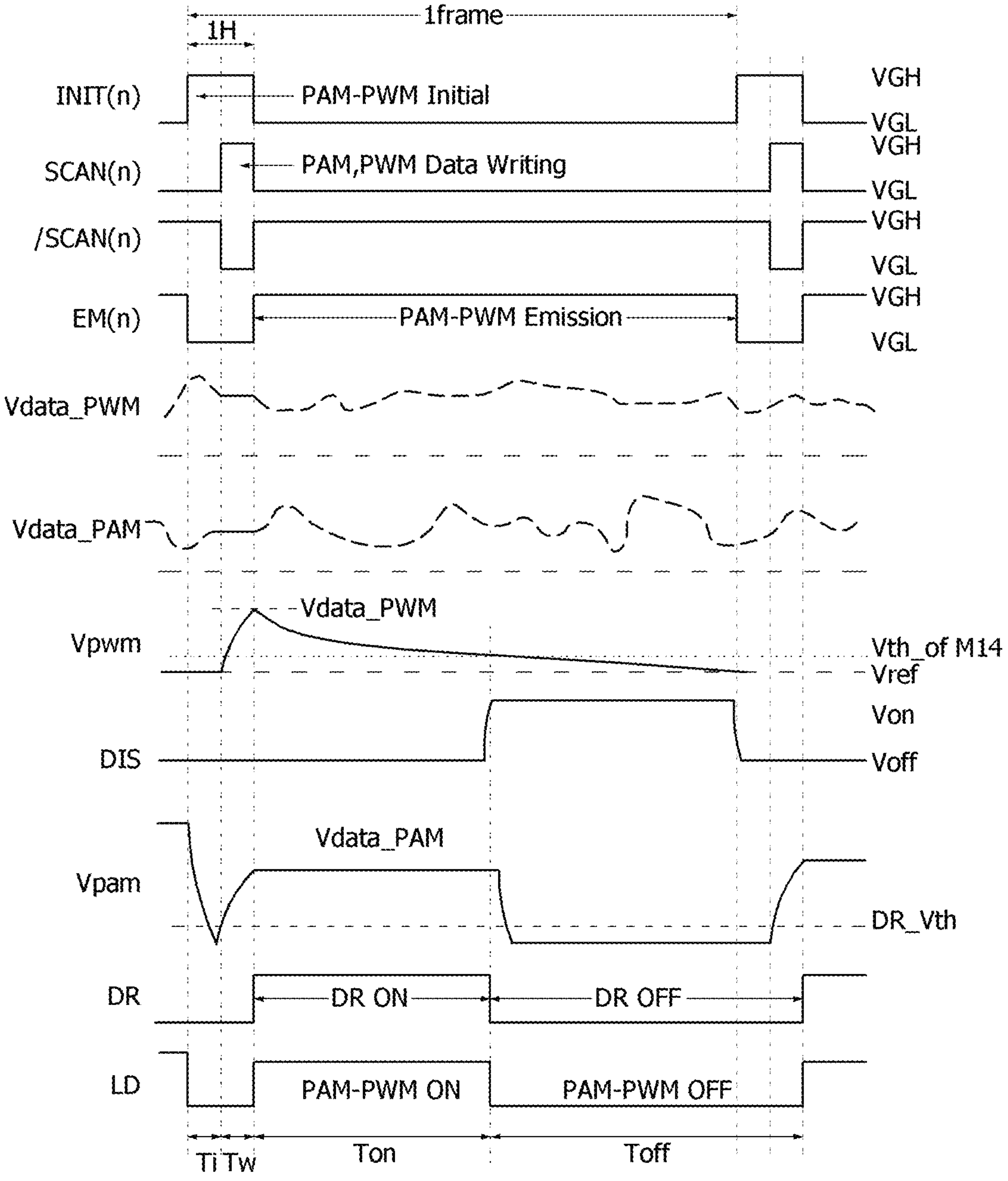
FIG. 22 is a waveform diagram illustrating signals applied to the pixel circuit shown in FIG. 21 and a light-on interval and a light-off interval of the light-emitting element according to an embodiment of the present disclosure.

A parallel data connection structure can allow the PWM data to be written to the PWM circuit 610 and the PAM data to be written to the PAM circuit 620 simultaneously. The second gate signal/SCAN(n) can be generated as a signal of an opposite phase with respect to the first gate signal SCAN(n), as shown in FIG. 22.

The PWM circuit 610 receives the PWM data voltage Vdata_PWM through the first data line DL1 and supplies the discharge control signal DIS to the PAM circuit 620, causing the PAM circuit 620 to turn off after the light-on interval determined by the PWM data voltage Vdata_PWM.

The PAM circuit 620 receives the PAM data voltage Vdata_PAM through the second data line DL2 and sets the gate-source voltage Vgs of the driving transistor DR according to the amplitude of the PAM data voltage. The driving element DR generates a current to drive the light-emitting element LD according to the gate-source voltage Vgs.

The initialization circuit 630 initializes the PWM circuit 610, the PAM circuit 620, the driving transistor DR, and the light-emitting element LD by initializing the capacitors of the PWM circuit 610 and the PAM circuit 620 and the anode voltage of the light-emitting element LD to the reference voltage Vref.

The light-on interval of the light-emitting element LD can be controlled by the PWM data voltage Vdata_PWM, and the amount of current flowing through the light-emitting element LD can be controlled by the PAM data voltage Vdata_PAM. The luminance and the light-on interval of each of the sub-pixels can be controlled independently based on the PWM data voltage Vdata_PWM and the PAM data voltage Vdata_PAM.

Figure 21:
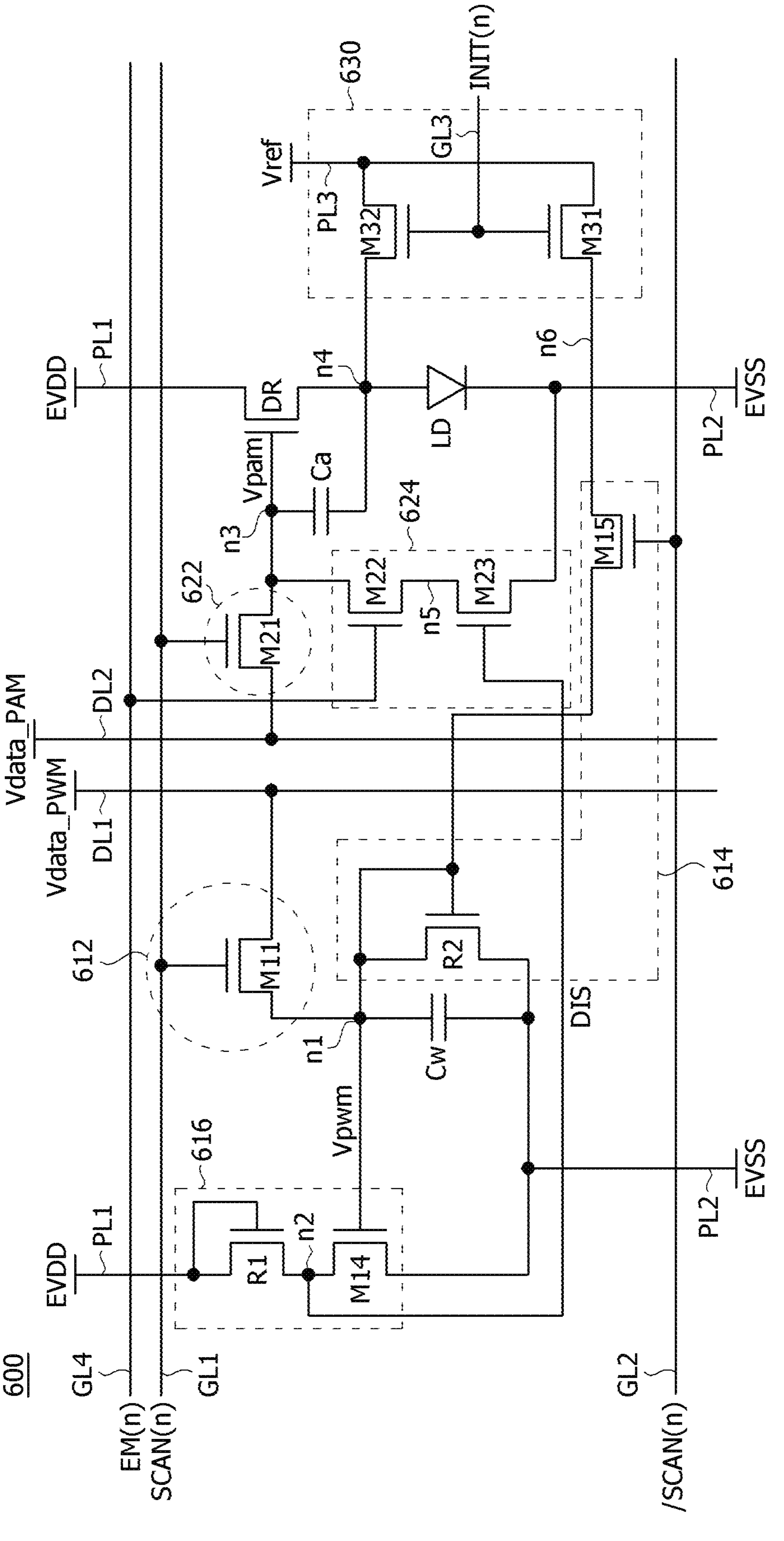
FIG. 21 is a circuit diagram illustrating the pixel circuit shown in FIG. 20 in detail according to an embodiment of the present disclosure.

FIG. 21 is a circuit diagram illustrating the pixel circuit shown in FIG. 20 in detail.

Referring to FIG. 21, the driving transistor DR can include a first electrode to which the pixel driving voltage EVDD is applied, a gate electrode connected to a third node n3, and a second electrode connected to a fourth node n4. The light-emitting element LD can include an anode electrode connected to the fourth node n4 and a cathode electrode to which the ground voltage EVSS is applied.

The PWM circuit 610 can include a first capacitor Cw, a first charging circuit 612, a first discharging circuit 614, and an inverting circuit 616. The first capacitor Cw is connected between a first node n1 and the second power line PL2 to which the ground voltage EVSS is applied.

The PWM circuit 610 outputs the discharge control signal DIS, which instructs a second capacitor Ca to discharge according to a voltage change in the first capacitor.

The first charging circuit 612 charges the first capacitor Cw with the PWM data voltage Vdata_PWM. The first charging circuit 612 can include a first PWM transistor M11. The first PWM transistor M11 is turned on in response to the gate-on voltage VGH of the first gate signal SCAN(n) to electrically connect the first data line DL1, to which the PWM data voltage Vdata_PWM is applied, to the first node n1. The first PWM transistor M11 includes a first electrode connected to the first node n1, a gate electrode to which the first gate signal SCAN(n) is applied, and a second electrode connected to the first data line DL1.

The first discharging circuit 614 discharges the voltage of the first capacitor Cw. The first discharging circuit 614 can include a second PWM transistor R2 having a channel resistance across the first capacitor Cw, and a fifth PWM transistor M15 that is turned on/off in response to the second gate signal/SCAN(n). The second PWM transistor R2 serves as a resistance to discharge a voltage of the first capacitor Cw, e.g., a voltage Vpwm of the first node n1, during the light-on interval of the light-emitting element LD, which is determined by the PWM data voltage Vdata_PWM. The second PWM transistor R2 includes a first electrode and a gate electrode connected to the first node n1, and a second electrode to which the ground voltage EVSS is applied.

The fifth PWM transistor M15 is turned on in response to the gate-on voltage VGH of the second gate signal/SCAN(n). When the fifth PWM transistor M15 is turned on, the first node n1 is electrically connected to a sixth node n6. The fifth PWM transistor M15 includes a first electrode connected to the first node n1, a gate electrode to which the second gate signal/SCAN(n) is applied, and a second electrode connected to the sixth node n6.

The inverting circuit 616 inverts the voltage of the discharge control signal DIS from the off-level Voff to the on-level Von at an interval in which the voltage Vpwm of the first node n1 is lowered, as shown in FIG. 22. When the voltage of the first node n1 is the on-level voltage, the discharge control signal DIS can be output as the off-level voltage Voff, for example, the ground voltage EVSS. When the voltage of the first node n1 is the off-level voltage, the discharge control signal DIS can be output as an on-level voltage Von, for example, the pixel driving voltage EVDD. The inverting circuit 616 can include a third PWM transistor R1 and a fourth PWM transistor M14 connected in series between the pixel driving voltage EVDD and the ground voltage EVSS. The third PWM transistor R1 serves as a resistance to supply the pixel driving voltage EVDD to a second node n2 from which the discharge control signal DIS is output. The third PWM transistor R1 includes a first electrode and a gate electrode to which the pixel driving voltage EVDD is applied, and a second electrode connected to the second node n2.

The fourth PWM transistor M14 is turned on when the voltage of the first node n1 is the on-level voltage. When the fourth PWM transistor M14 is turned on, the second node n2 is electrically connected to the second power line PL2 to lower the voltage of the second node n2 to the ground voltage EVSS. The on-level voltage of the first node n1 can be a voltage equal to or higher than the threshold voltage of the fourth PWM transistor M14. At an interval in which the first capacitor Cw is discharged, the voltage of the first node n1 can be lowered to the off-level voltage. The off-level voltage can be a voltage lower than the threshold voltage of the fourth PWM transistor M14. When the fourth PWM transistor M14 is turned off, the discharge control signal DIS can be inverted from the off-level voltage Voff to the on-level voltage Von so that the second capacitor Ca is discharged. The fourth PWM transistor M14 includes a first electrode connected to the second node n2, a gate electrode connected to the first node n1, and a second electrode to which the ground voltage EVSS is applied.

The PAM circuit 620 can include the second capacitor Ca, a second charging circuit 622, and a second discharging circuit 624. The second capacitor Ca is connected between the third node n3 and the fourth node n4.

The second charging circuit 622 charges the second capacitor Ca with the PAM data voltage Vdata_PAM. The second charging circuit 622 can include a first PAM transistor M21. The first PAM transistor M21 is turned on in response to the gate-on voltage VGH of the first gate signal SCAN(n) to electrically connect the second data line DL2, to which the PAM data voltage Vdata_PAM is applied, to the third node n3. The first PAM transistor M21 includes a first electrode connected to the third node n3, a gate electrode to which the first gate signal SCAN(n) is applied, and a second electrode connected to the second data line DL2.

The second discharging circuit 624 discharges the voltage of the second capacitor Ca in response to the on-level voltage Von of the discharge control signal DIS. The second discharging circuit 624 can include a second PAM transistor M22 and a third PAM transistor M23 connected in series between the third node n3 and the second power line PL2.

The second PAM transistor M22 is connected between the third node n3 and a fifth node n5 and is turned on in response to the gate-on voltage VGH of the fourth gate signal EM(n). When the second PAM transistor M22 is turned on, the third node n3 is electrically connected to the fifth node n5. The second PAM transistor M22 includes a first electrode connected to the third node n3, a gate electrode to which the fourth gate signal EM(n) is applied, and a second electrode connected to the fifth node n5.

The third PAM transistor M23 is connected between the fifth node n5 and the second power line PL2 and is turned on in response to the on-level voltage of the discharge control signal DIS. When the third PAM transistor M23 is turned on, the fifth node n5 can be electrically connected to the second power line PL2, causing the second capacitor Ca to discharge. The third PAM transistor M23 includes a first electrode connected to the fifth node n5, a gate electrode to which the discharge control signal DIS is applied, and a second electrode to which the ground voltage EVSS is applied.

The initialization circuit 630 can include a first initialization transistor M31 and a second initialization transistor M32. The first initialization transistor M31 includes a first electrode connected to the first node n1, a gate electrode to which the third gate signal INIT(n) is applied, and a second electrode to which the reference voltage Vref is applied. The second initialization transistor M32 includes a first electrode connected to the fourth node n4, a gate electrode to which the third gate signal INIT(n) is applied, and a second electrode to which the reference voltage Vref is applied.

FIG. 22 is a waveform diagram illustrating signals applied to the pixel circuit shown in FIG. 21 and the light-on interval and light-off interval of the light-emitting element according to an embodiment of the present disclosure.

Referring to FIG. 22, the pixel circuit 600 can be driven in an initialization step, a data writing step, and a light-on step every frame period. In the intermediate grayscale and the low grayscale, the pixel circuit 600 can be driven in the light-off step after the light-on step.

The initialization step and the data writing step can be performed sequentially within one horizontal period (1H). The initialization step can be performed during a first period Ti. During the first period Ti, the PWM circuit 610, the PAM circuit 620, the light-emitting element LD, and the driving transistor DR in each of the sub-pixels are initialized. The data writing step can be performed during a second period Tw. During the second period Tw, the PWM data voltage Vdata_PWM can be charged in the first capacitor Cw of the PWM circuit 610, and at the same time, the PAM data voltage Vdata_PAM can be charged in the second capacitor Ca of the PAM circuit 620. In other words, rather than performing the writing of the PAM data voltage Vdata_PAM and the writing of the PWM data voltage Vdata_PWM sequentially as in the pixel circuit of FIG. 5, the writing of the PAM data voltage Vdata_PAM and the PWM data voltage Vdata_PWM can be performed simultaneously at the same time in the pixel circuit of FIG. 20. The light-on step and the light-off step can be divided into two time periods determined by the PWM data voltage Vdata_PWM within the remaining time, which is one frame period minus one horizontal period 1H. The light-on step is performed during a light-on interval Ton of the light-emitting element LD that becomes longer as the PWM data voltage Vdata_PWM increases. The light-off step is performed during a light-off interval Toff, which starts from when the discharge control signal DIS is inverted from the off-level voltage Voff to the on-level voltage Von.

Figure 23:
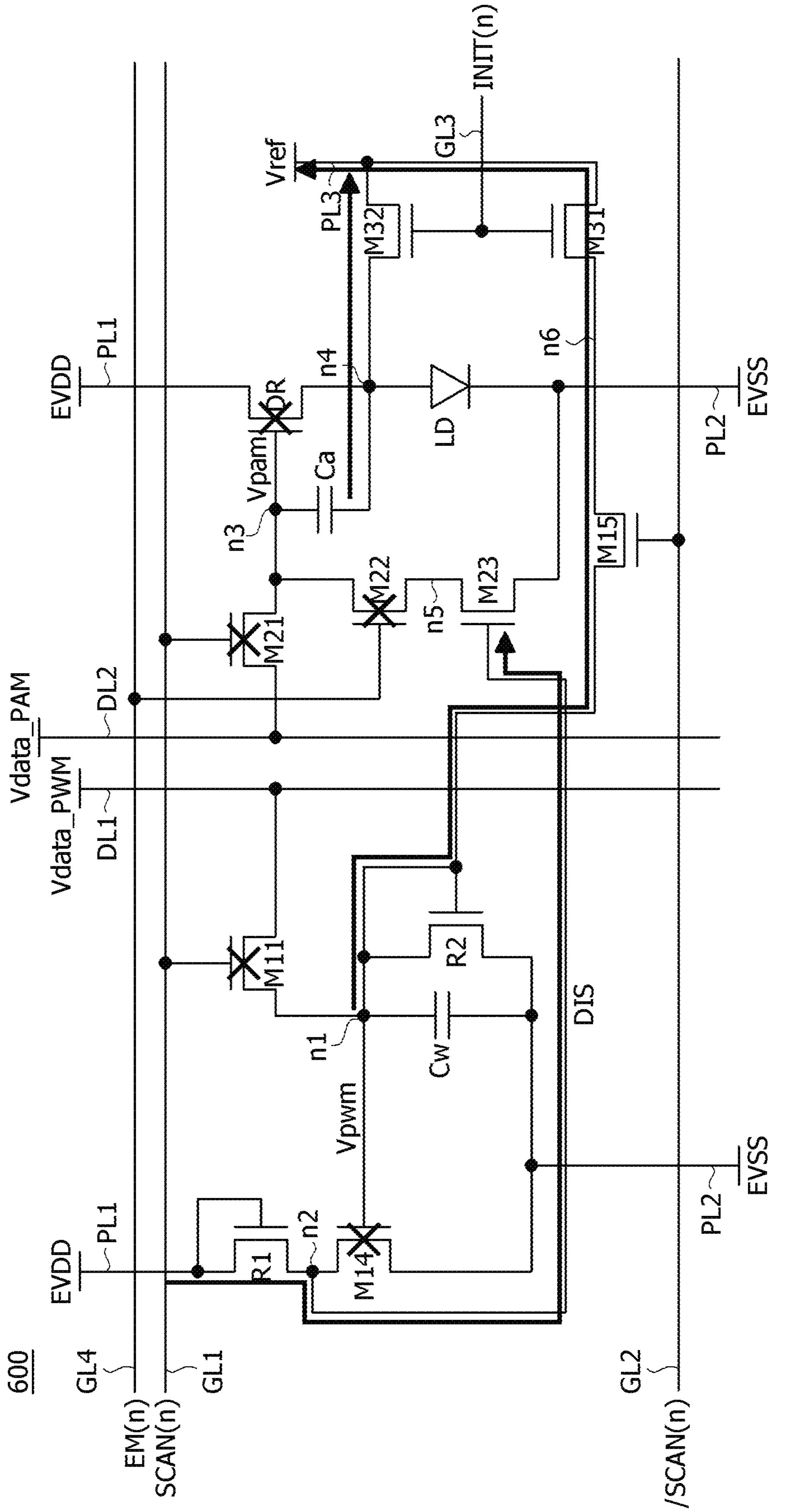
FIG. 23 is a circuit diagram illustrating the operation of the pixel circuit shown in FIG. 21 in an initialization step according to an embodiment of the present disclosure.

FIG. 23 is a circuit diagram illustrating the operation of the pixel circuit shown in FIG. 21 in the initialization step.

Referring to FIGS. 22 and 23, during the first period Ti, the voltage of the second and third gate signals/SCAN(n) and INIT(n) is the gate-on voltage VGH. During the first period Ti, the voltage of the first and fourth gate signals SCAN(n) and EM(n) is the gate-off voltage VGL. Accordingly, during the first period Ti, the fifth PWM transistor M15 and the initialization transistors M31 and M32 are turned on.

During the first period Ti, the pixel driving voltage EVDD is applied to a gate electrode of the third PAM transistor M23 through the third PWM transistor R1 and the second node n2, causing the third PAM transistor M23 to turn on. During the first period Ti, the first PWM transistor M11, the fourth PWM transistor M14, the first PAM transistor M21, and the second PAM transistor M22, among transistors serving as switch elements, are in the off-state.

During the first period Ti, the PWM data voltage Vdata_PWM, the PAM data voltage Vdata_PAM, and the reference voltage Vref can be 0V In this situation, the voltages of the first node n1 and the fourth node n4 are initialized to 0V in the first period Ti. During the first period Ti, the PWM data voltage Vdata_PWM and the PAM data voltage Vdata_PAM can be a data voltage written to the sub-pixels of a preceding pixel line, for example, an (n−1)th pixel line. The voltage of the second node n2 can be the pixel driving voltage EVDD, for example, 22V in the first period Ti. In the first period Ti, the voltage of the third node n3 can be the PAM data voltage Vdata_PAM that was charged in a previous frame period. In the first period Ti, the driving transistor DR can be turned on, but the current generated from the driving transistor DR flows to the third power line PL3 to which the reference voltage Vref is applied. Accordingly, during the first period Ti, the light-emitting element LD is in the off-state.

Figure 24:
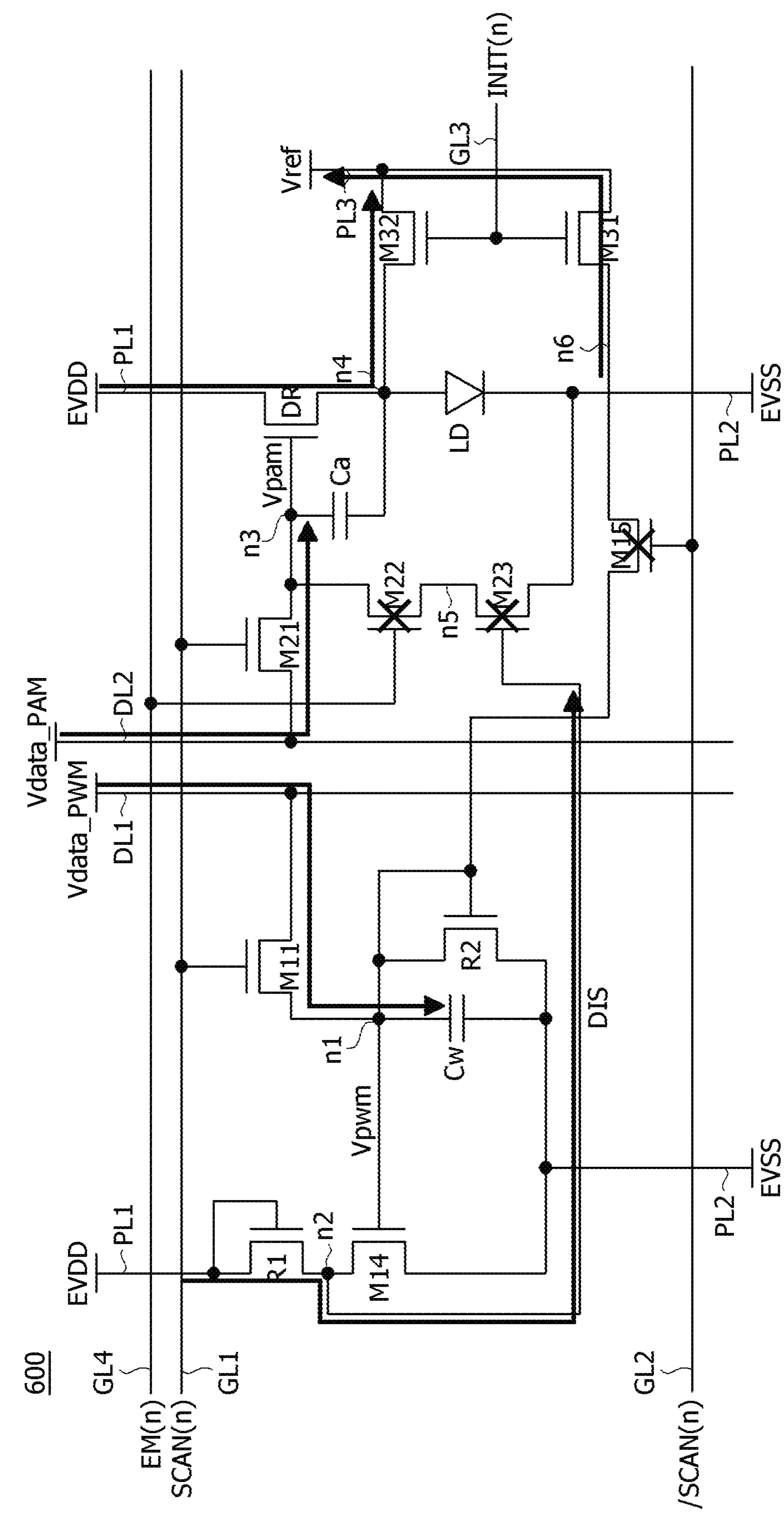
FIG. 24 is a circuit diagram illustrating the operation of the pixel circuit shown in FIG. 21 in a data writing step according to an embodiment of the present disclosure.

FIG. 24 is a circuit diagram illustrating the operation of the pixel circuit shown in FIG. 21 during the data writing step.

Referring to FIG. 22 and FIG. 24, during the second period Tw, the voltage of the first gate signal SCAN(n) and the third gate signal INIT(n) is the gate-on voltage VGH. During the second period Tw, the voltage of the second gate signal/SCAN(n) and the fourth gate signal EM(n) is the gate-off voltage VGL. Accordingly, during the second period Tw, the first PWM transistor M11, the first PAM transistor M21, and the initialization transistors M31 and M32 are turned on.

During the second period Tw, the PWM data voltage Vdata_PWM is charged in the first capacitor Cw through the first PWM transistor M11, and at the same time, the PAM data voltage Vdata_PAM is charged in the second capacitor Ca through the first PAM transistor M21. During the second period Tw, the voltage Vpwm of the first node n1 rises, causing the fourth PWM transistor M14 to turn on, and the voltage of the second node n2, e.g., the discharge control signal DIS, is output as an off-level voltage Voff.

During the second period Tw, the voltage Vpam of the third node n3 can rise, causing the drive transistor DR to turn on. During the second period Tw, the second PAM transistor M22, the third PAM transistor M23, and the fifth PWM transistor M15, among the transistors serving as switch elements, are in the off-state. During the second period Tw, the driving transistor DR can be turned on to generate a current according to the gate-source voltage Vgs, but this current flows to the third power line PL3 to which the reference voltage Vref is applied, resulting in the light emitting element LD being in the off state.

During the second period Tw, the PWM data voltage Vdata_PWM and the PAM data voltage Vdata_PAM are determined according to the grayscale value of the pixel data. For example, but not limited to, the PWM data voltage Vdata_PWM can be 5V and the PAM data voltage Vdata_PAM can be 7V In this situation, the voltage Vpwm of the first node n1 can be 5V and the voltage of the third node n3 can be 7V. During the second period Tw, the voltage of the fourth node n4 can be 0V.

Figure 25:
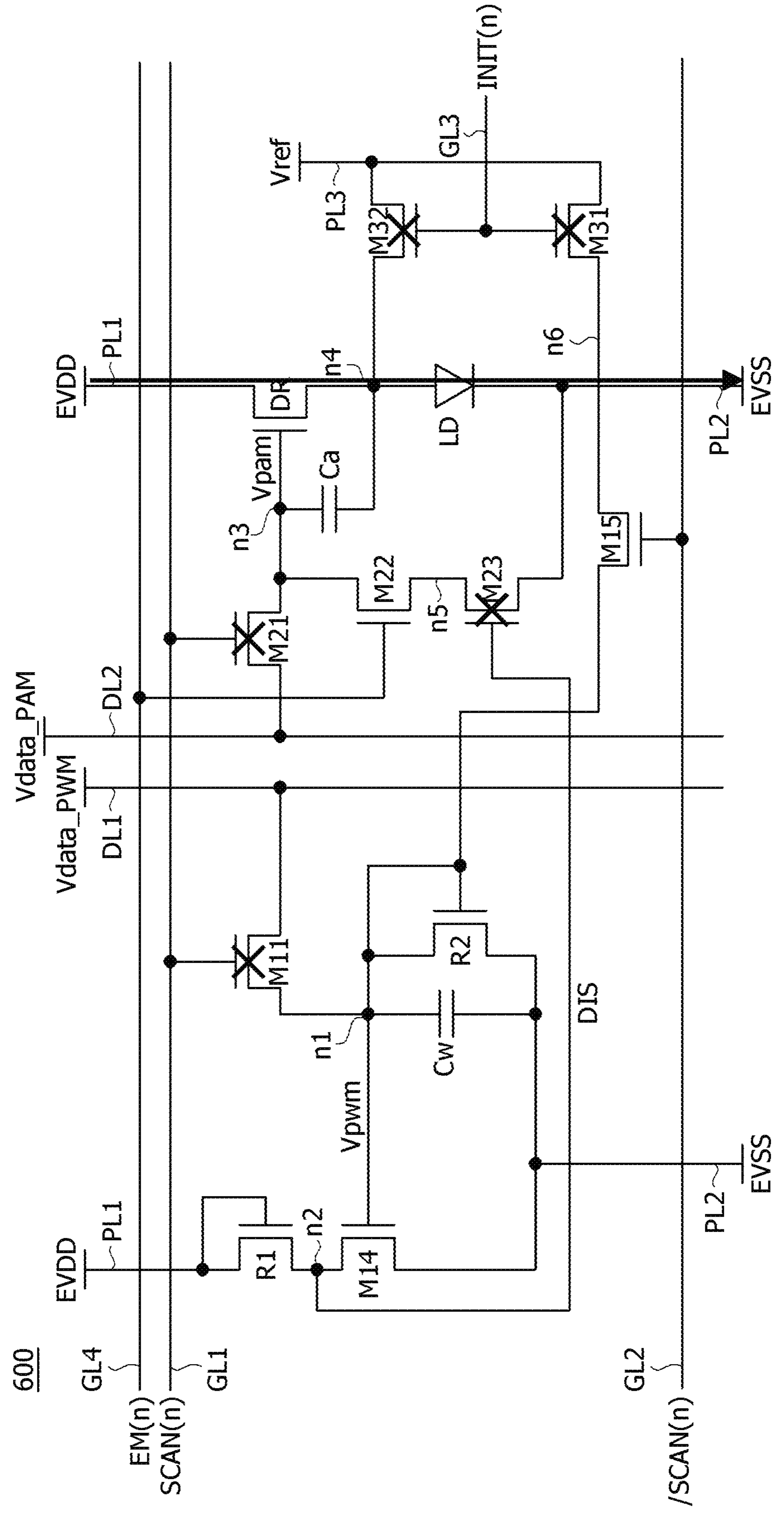
FIG. 25 is a circuit diagram illustrating the operation of the pixel circuit shown in FIG. 21 in a light-on step according to an embodiment of the present disclosure.

FIG. 25 is a circuit diagram illustrating the operation of the pixel circuit shown in FIG. 21 during the light-on step.

Referring to FIG. 22 and FIG. 25, during the light-on interval Ton, the voltage of the second and fourth gate signals/SCAN(n) and EM(n) is the gate-on voltage VGH, and the voltage of the first and third gate signals SCAN(n) and INIT(n) is the gate-off voltage VGL. Accordingly, the fifth PWM transistor M15 and the second PAM transistor M22 are turned on during the light-on interval Ton.

During the light-on interval Ton, the first PWM transistor M11, the first PAM transistor M21, the third PAM transistor M23, and the initialization transistors M31 and M32 are in the off-state.

During the light-on interval Ton, the PWM data voltage Vdata_PWM and the PAM data voltage Vdata_PAM can remain in their previous states, but it do not affect the PWM circuit 610 and the PAM circuit 620 because the first PWM transistor M11 and the first PAM transistor M21 are in the off-state during the light-on interval Ton.

During the light-on interval Ton, the light-emitting element LD can be emit light by the current generated according to the gate-source voltage Vgs of the driving transistor DR, which is determined by the PAM data voltage Vdata_PAM charged in the second capacitor Ca. During the light-on interval Ton, the voltage of the first capacitor Cw is discharged by means of the resistance of the second PWM transistor R2, which lowers the voltage Vpwm of the first node n1. When the voltage Vpwm of the first node n1 becomes lower than the threshold voltage Vth of the fourth PWM transistor M14, the sub-pixel enters the light-off step. The light-on interval Ton can be extended in proportion to the PWM data voltage Vdata_PWM.

When the voltage of the first capacitor Cw is discharged during the light-on interval Ton so that the voltage Vpwm of the first node n1 is lower than the threshold voltage Vth of the fourth PWM transistor M14, the fourth PWM transistor M14 is turned off so that the voltage of the second node n2 rises to the pixel driving voltage EVDD. At this time, the voltage of the discharge control signal DIS, which is determined by the voltage of the second node n2, is inverted to the on-level voltage Von to start the light-off step.

Figure 26:
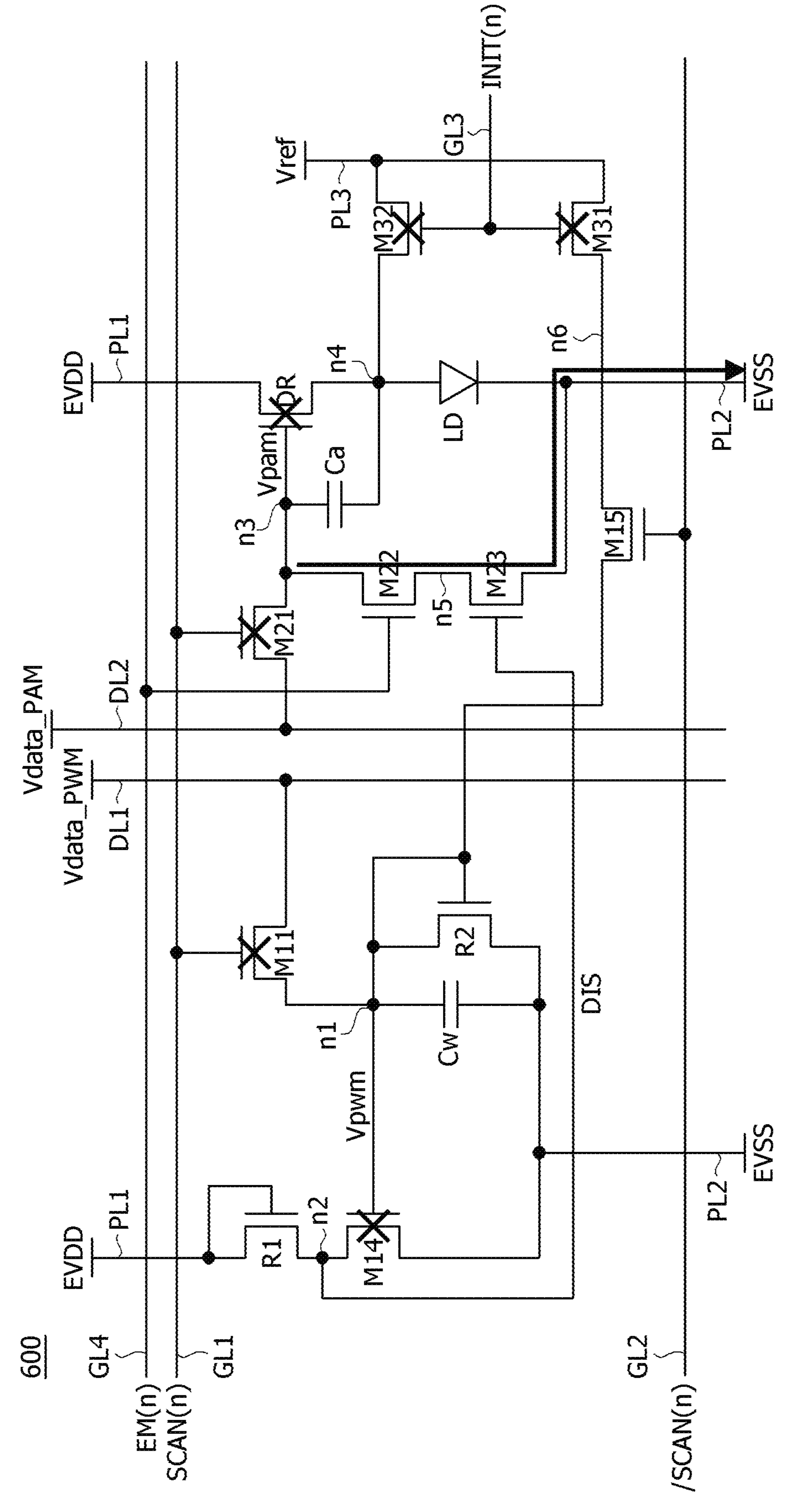
FIG. 26 is a circuit diagram illustrating the operation of the pixel circuit shown in FIG. 21 in a light-off step according to an embodiment of the present disclosure.

FIG. 26 is a circuit diagram illustrating the operation of the pixel circuit shown in FIG. 21 during the light-off step.

Referring to FIG. 22 and FIG. 26, during the light-off interval Toff, the voltage of the second and fourth gate signals/SCAN(n) and EM(n) is the gate-on voltage VGH and the voltage of the first and third gate signals SCAN(n) and INIT(n) is the gate-off voltage VGL. Accordingly, during the light-off interval Toff, the fifth PWM transistor M15 and the second PAM transistor M22 remain in the on-state.

When the discharge control signal DIS is inverted to the on-level voltage Von, the third PAM transistor M23 is turned on. In this situation, when the voltage of the second capacitor Ca is rapidly discharged through the second and third PAM transistors M22 and M23 and the voltage Vpam of the third node n3 becomes lower than the threshold voltage Vth of the driving transistor DR, the driving transistor DR is turned off and the light-emitting element LD is turned off. In other words, instead of discharging the second capacitor Ca through the light-emitting element LD to emit light, the light-emitting element LD can be bypassed by turning on both second and third PAM transistors M22 and M23 to quickly discharge the remaining amount of charge in second capacitor Ca to ground.

During the light-off interval Toff, the first PWM transistor M11, the fourth PWM transistor M14, the first PAM transistor M21, the initialization transistors M31 and M32, and the driving transistor DR are in the off-state. During the light-off interval Toff, the PWM data voltage Vdata_PWM and the PAM data voltage Vdata_PAM can remain in their previous states, but do not affect the PWM circuit 610 and the PAM circuit 620 because the first PWM transistor M11 and the first PAM transistor M21 are in the off-state during the light-off interval Toff.

Figure 27:
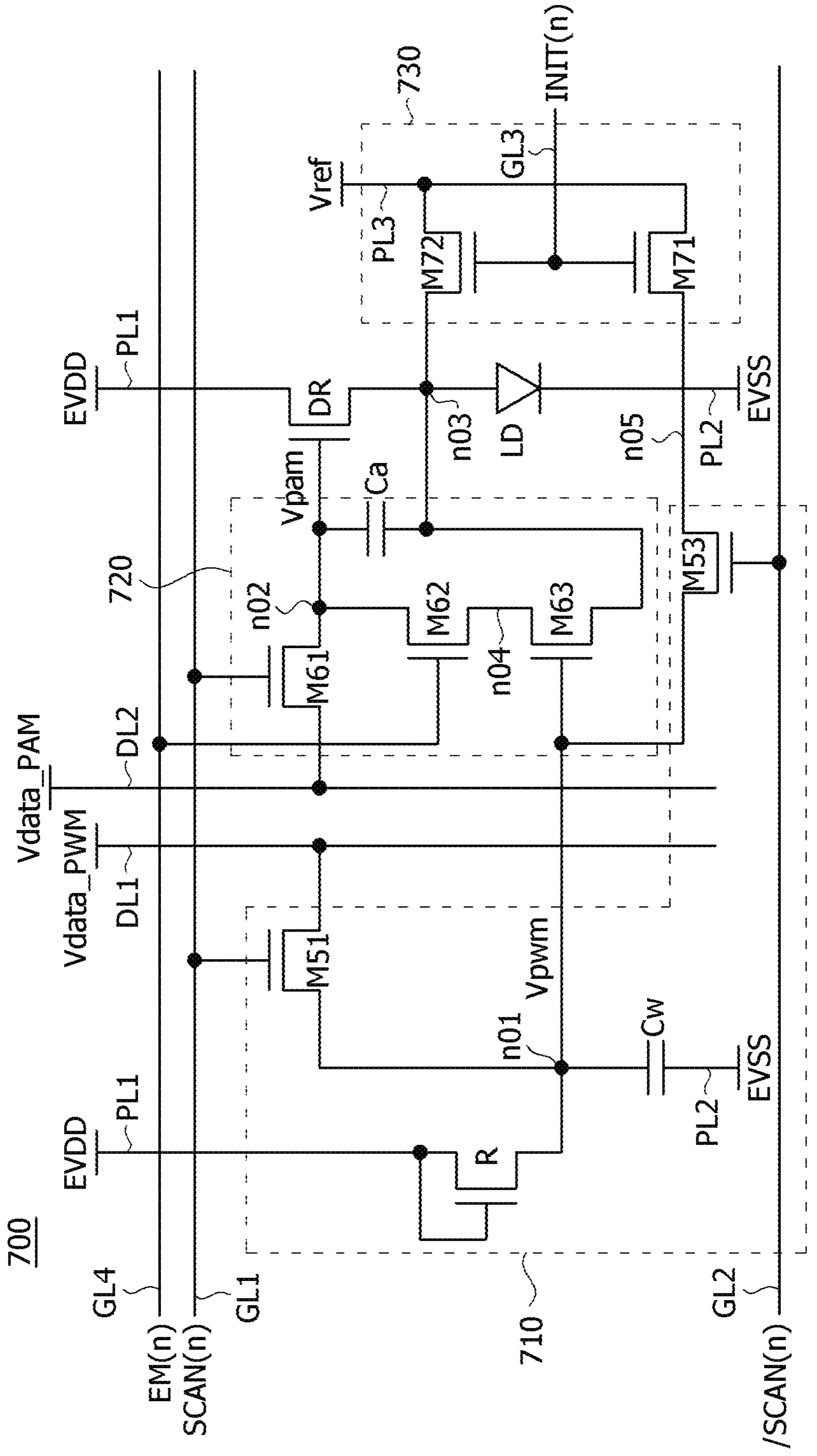
FIG. 27 is a circuit diagram illustrating a pixel circuit according to another embodiment of the present disclosure.

FIG. 27 is a circuit diagram illustrating a pixel circuit according to a third embodiment of the present disclosure. For example, the pixel circuit in FIG. 27 has a different configuration for the PWM circuit (e.g., see first node n01).

Referring to FIG. 27, the pixel circuit 700 includes a PWM circuit 710, a PAM circuit 720, an initialization circuit 730, a driving transistor DR, and a light-emitting element LD.

The pixel circuit 700 can be connected to a first data line DL1 to which the PWM data voltage Vdata_PWM is applied, a second data line DL2 to which the PAM data voltage Vdata_PAM is applied, a first gate line GL1 to which the first gate signal SCAN(n) is applied, a second gate line GL2 to which the second gate signal/SCAN(n) is applied, a third gate line GL3 to which the third gate signal INIT(n) is applied, a fourth gate line GL4 to which the fourth gate signal EM(n) is applied, a first power line PL1 to which the pixel driving voltage EVDD is applied, a second power line PL2 to which the ground voltage EVSS is applied, and a third power line PL3 to which the reference voltage Vref is applied. The power lines PL1, PL2, and PL3 can be commonly connected to the pixel circuits of all of the pixels.

The driving transistor DR can include a first electrode to which the pixel driving voltage EVDD is applied, a gate electrode connected to a second node n02, and a second electrode connected to a third node n03. The light-emitting element LD can include an anode electrode connected to the third node n03 and a cathode electrode to which the ground voltage EVSS is applied.

The PWM circuit 710 can include a first capacitor Cw, a first PWM transistor M51, a second PWM transistor R, and a third PWM transistor M53. The first capacitor Cw is connected between a first node n01 and the second power line PL2 to which the ground voltage EVSS is applied. The PWM circuit 710 outputs the discharge control signal DIS, which instructs a second capacitor Ca to discharge according to a voltage change in the first capacitor Cw. The discharge control signal can be a voltage Vpwm of the first node n01.

The first PWM transistor M51 is turned on in response to the gate-on voltage VGH of the first gate signal SCAN(n) to electrically connect the first data line DL1, to which the PWM data voltage Vdata_PWM is applied, to the first node n01. The first PWM transistor M51 includes a first electrode connected to the first node n01, a gate electrode to which the first gate signal SCAN(n) is applied, and a second electrode connected to the first data line DL1.

The second PWM transistor R serves as a resistance to charge the first capacitor Cw with the pixel driving voltage EVDD. The second PWM transistor R includes a first electrode and a gate electrode to which the pixel driving voltage EVDD is applied, and a second electrode connected to the first node n01.

The third PWM element M53 is turned on in response to the gate-on voltage VGH of the second gate signal/SCAN (n). When the third PWM transistor M53 is turned on, the first node n01 is electrically connected to a fifth node n05. The third PWM transistor M53 includes a first electrode connected to the first node n01, a gate electrode to which the second gate signal /SCAN(n) is applied, and a second electrode connected to the fifth node n05.

The PAM circuit 720 can include the second capacitor Ca, a first PAM transistor M61, a second PAM transistor M62, and a third PAM transistor M63. The second capacitor Ca is connected between the second node n02 and the third node n03.

The first PAM transistor M61 is turned on in response to the gate-on voltage VGH of the first gate signal SCAN(n) to electrically connect the second data line DL2, to which the PAM data voltage Vdata_PAM is applied, to the second node n02. The first PAM transistor M61 includes a first electrode connected to the second node n02, a gate electrode to which the first gate signal SCAN(n) is applied, and a second electrode connected to the second data line DL2.

The second PAM transistor M62 is connected between the second node n02 and a fourth node n04 and is turned on in response to the gate-on voltage VGH of the fourth gate signal EM(n). When the second PAM transistor M62 is turned on, the second node n02 is electrically connected to the fourth node n04. The second PAM transistor M62 includes a first electrode connected to the second node n02, a gate electrode to which the fourth gate signal EM(n) is applied, and a second electrode connected to the fourth node n04.

The third PAM transistor M63 is connected between the fourth node n04 and the third node n03 and is turned on when the voltage Vpwm of the first node n01, e.g., the voltage of the discharge control signal, is the on-level voltage to electrically connect the fourth node n04 to the third node n03. The on-level voltage of the first node n01 can be the threshold voltage of the third PAM transistor M63. The third PAM element M63 includes a first electrode connected to the fourth node n04, a gate electrode connected to the first node n01, and a second electrode connected to the third node n03. When the second PAM transistor M62 and the third PAM transistor M63 are turned on, the second capacitor Ca is discharged.

In another embodiment, the third PAM transistor M63 can be connected between the fourth node n04 and the second power line PL2 and can be turned on when the voltage Vpwm of the first node n01 is the on-level voltage to electrically connect the fourth node n04 to the second power line PL2.

The initialization circuit 730 can include a first initialization transistor M71 and a second initialization transistor M72. The first initialization transistor M71 includes a first electrode connected to the fifth node n05, a gate electrode to which the third gate signal INIT(n) is applied, and a second electrode to which the reference voltage Vref is applied. The second initialization transistor M72 includes a first electrode connected to the third node n03, a gate electrode to which the third gate signal INIT(n) is applied, and a second electrode to which the reference voltage Vref is applied.

Figure 28:
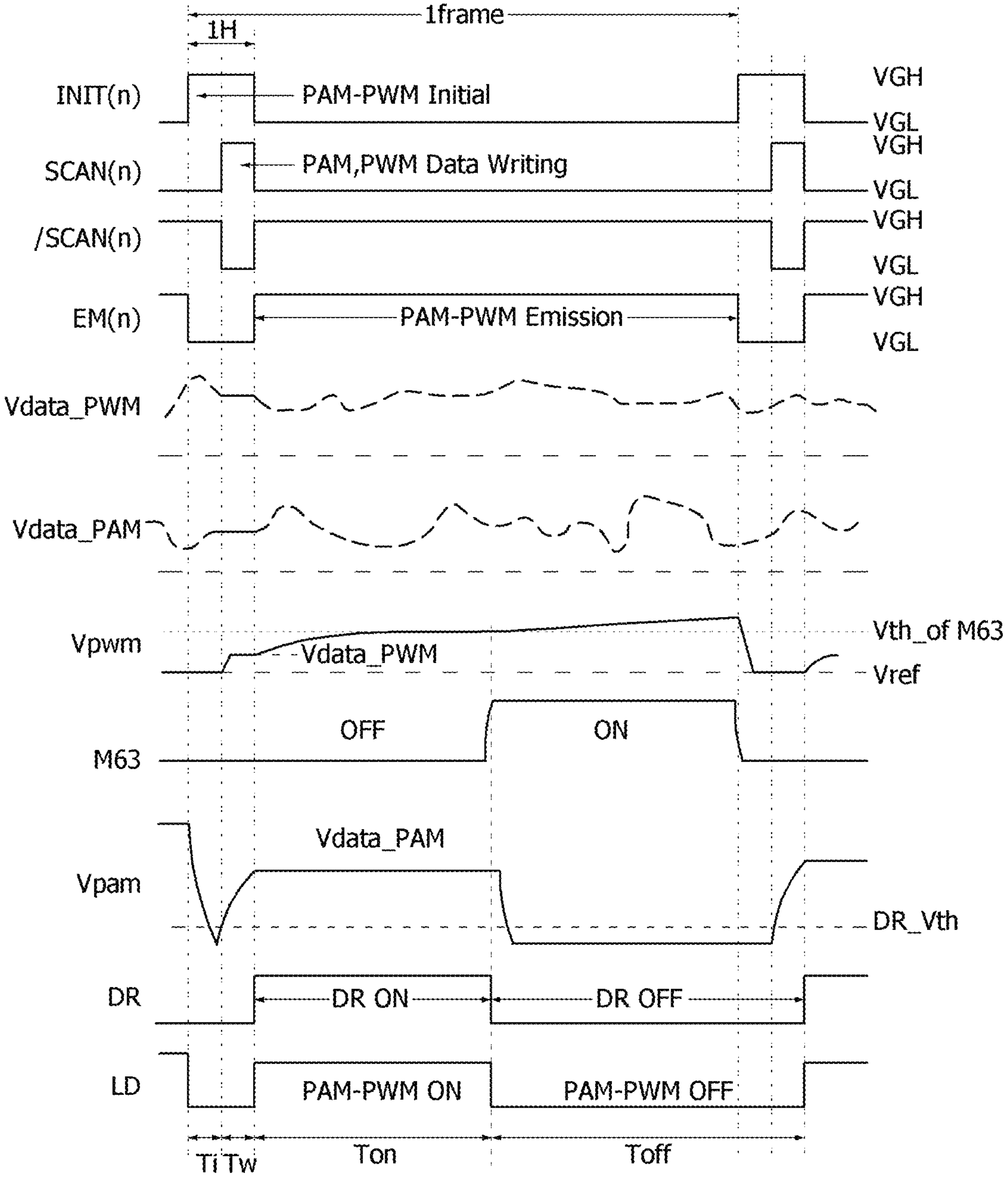
FIG. 28 is a waveform diagram illustrating signals applied to the pixel circuit shown in FIG. 27 and a light-on interval and a light-off interval of the light-emitting element according to an embodiment of the present disclosure.

FIG. 28 is a waveform diagram illustrating signals applied to the pixel circuit shown in FIG. 27 and the light-on interval and light-off interval of the light-emitting element. In FIG. 28, "DR_Vth" denotes the threshold voltage of the driving transistor DR, and "Vth_of M63" denotes the threshold voltage of the third PAM transistor M63. The dashed-line section of the data voltage Vdata represents the data voltage applied to a preceding pixel line and a following pixel line.

Referring to FIG. 28, a pixel circuit 700 can be driven in an initialization step, a data writing step, and a light-on step every frame period. In the intermediate grayscale and the low grayscale, the pixel circuit 700 can be driven in the light-off step after the light-on step.

The initialization step and the data writing step can be performed sequentially within one horizontal period (1H). The initialization step can be performed during a first period Ti. During the first period Ti, the PWM circuit 710, the PAM circuit 720, the light-emitting element LD, and the driving transistor DR in each of the sub-pixels are initialized. The data writing step can be performed during a second period Tw. During the second period Tw, the PWM data voltage Vdata_PWM can be charged in the first capacitor Cw of the PWM circuit 710, and at the same time, the PAM data voltage Vdata_PAM can be charged in the second capacitor Ca of the PAM circuit 720 (e.g., Vdata_PWM and Vdata_PAM can be written simultaneously).

The light-on step and the light-off step can be divided into two time periods determined by the PWM data voltage Vdata_PWM within the remaining time, which is one frame period minus one horizontal period 1H. The light-on step is performed during a light-on interval Ton of the light-emitting element LD that becomes longer as the PWM data voltage Vdata_PWM increases. The light-off step is performed during the light-off interval Toff, which starts from a time point when the voltage Vpwm of the first node n01 rises and reaches the threshold voltage of the third PAM transistor M63 to turn on the third PAM transistor M63.

Figure 29:
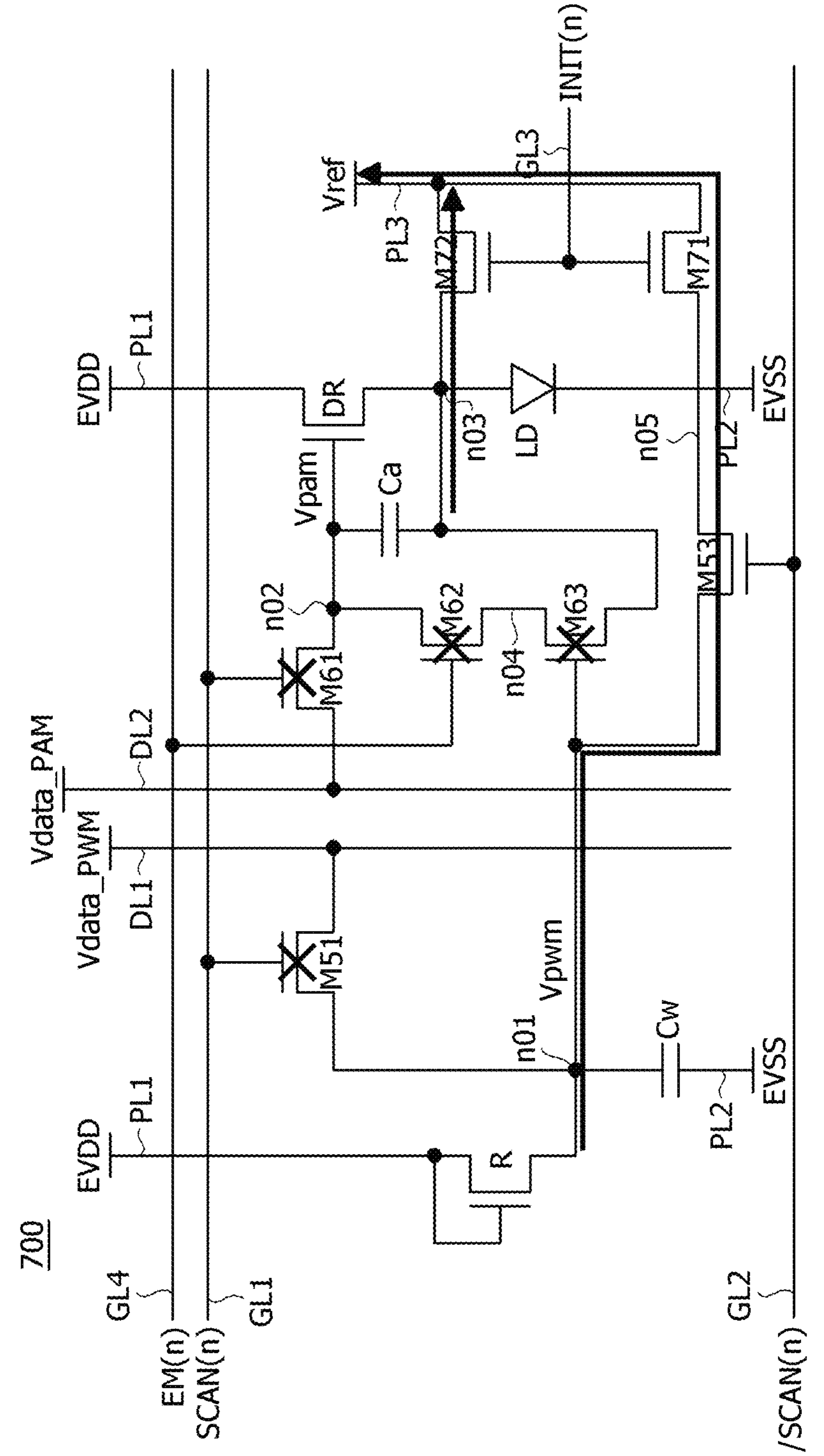
FIG. 29 is a circuit diagram illustrating the operation of the pixel circuit shown in FIG. 27 in an initialization step according to an embodiment of the present disclosure.

FIG. 29 is a circuit diagram illustrating the operation of the pixel circuit shown in FIG. 27 in the initialization step.

Referring to FIGS. 28 and 29, during a first period Ti, the voltage of the second and third gate signals/SCAN(n) and INIT(n) is the gate-on voltage VGH. During the first period Ti, the voltage of the first and fourth gate signals SCAN(n) and EM(n) is the gate-off voltage VGL. Accordingly, during the first period Ti, the third PWM transistor M53 and the initialization transistors M71 and M72 are turned on.

During the first period Ti, the first PWM transistor M51, the first PAM transistor M61, the second PAM transistor M62, and the third PAM transistor M63, among transistors serving as switch elements, are in the off-state.

During the first period Ti, the PWM data voltage Vdata_PWM, the PAM data voltage Vdata_PAM, and the reference voltage Vref can be 0V In this situation, the voltages of the first node n01 and the third node n03 are initialized to 0V in the first period Ti. During the first period Ti, the PWM data voltage Vdata_PWM and the PAM data voltage Vdata_PAM can be a data voltage written to the sub-pixels of a preceding pixel line, for example, an (n−1)th pixel line. The voltage Vpwm of the first node n01 can be the pixel driving voltage EVDD, for example, 22V, in the first period Ti. In the first period Ti, the voltage of the second node n02 can be the PAM data voltage Vdata_PAM that was charged in a previous frame period. In the first period Ti, the driving transistor DR can be turned on, but the current generated from the driving transistor DR flows to the third power line PL3 to which the reference voltage Vref is applied. Accordingly, during the first period Ti, the light-emitting element LD is in the off-state.

Figure 30:
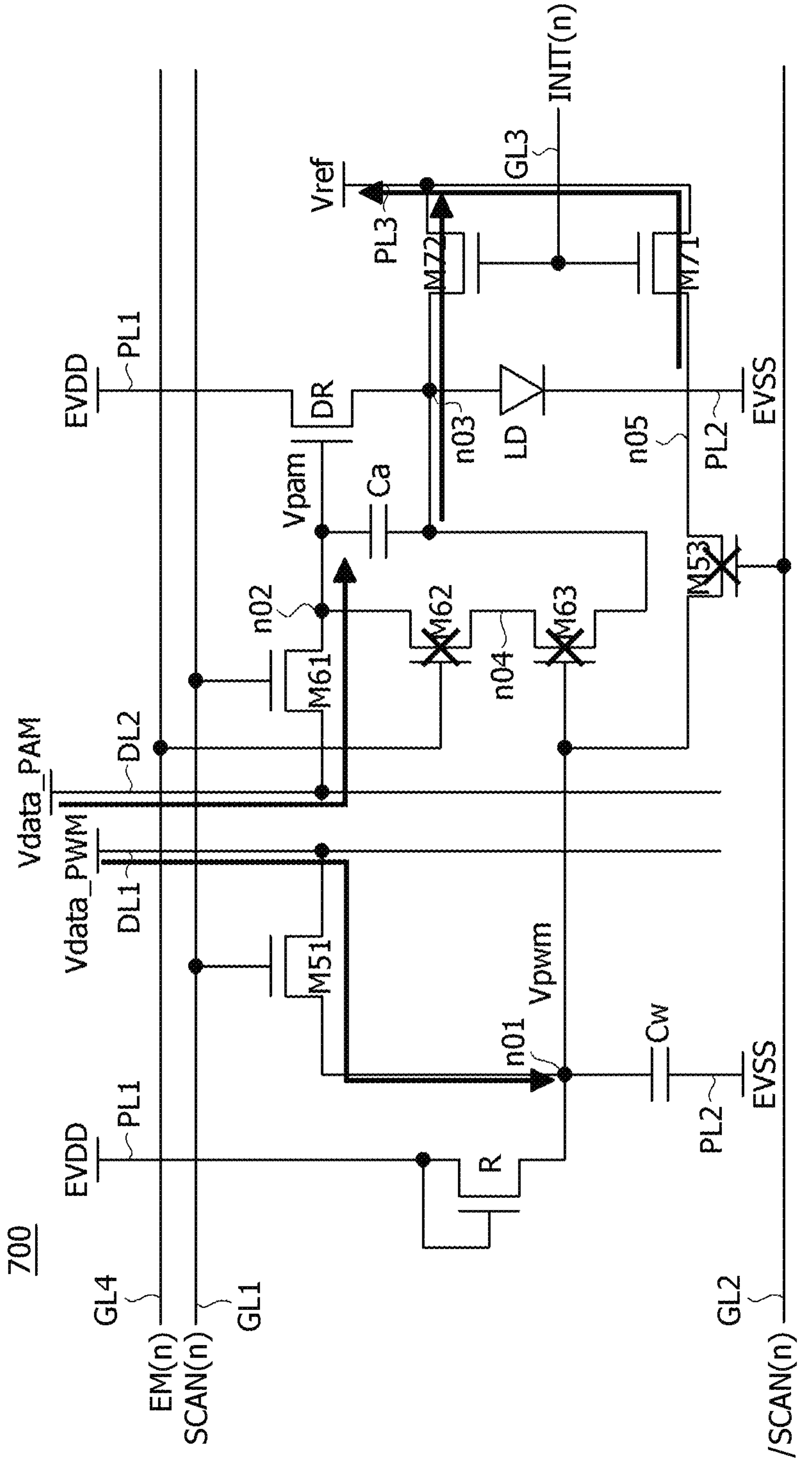
FIG. 30 is a circuit diagram illustrating the operation of the pixel circuit shown in FIG. 27 in a data writing step according to an embodiment of the present disclosure.

FIG. 30 is a circuit diagram illustrating the operation of the pixel circuit shown in FIG. 27 in the data writing step.

Referring to FIG. 28 and FIG. 30, the voltage of the first gate signal SCAN(n) and the third gate signal INIT(n) during a second period Tw is the gate-on voltage VGH. During the second period Tw, the voltage of the second gate signal/SCAN(n) and the fourth gate signal EM(n) is the gate-off voltage VGL. Accordingly, during the second period Tw, the first PWM transistor M51, the first PAM transistor M61, and the initialization transistors M71 and M72 are turned on.

During the second period Tw, the PWM data voltage Vdata_PWM is charged in the first capacitor Cw through the first PWM transistor M51, and at the same time, the PAM data voltage Vdata_PAM is charged in the second capacitor Ca through the first PAM transistor M61. During the second period Tw, the voltage of the first node n01 can be 0V.

During the second period Tw, the voltage Vpam of the second node n02 can rise, causing the drive transistor DR to turn on. During the second period Tw, the second PAM transistor M62, the third PAM transistor M63, and the third PWM transistor M53, among the transistors serving as switch elements, are in the off-state. During the second period Tw, the driving transistor DR can be turned on to generate a current according to the gate-source voltage Vgs, but this current flows to the third power line PL3 to which the reference voltage Vref is applied, resulting in the light emitting element LD being in the off state.

During the second period Tw, the PWM data voltage Vdata_PWM and the PAM data voltage Vdata_PAM are determined according to the grayscale value of the pixel data. For example, but not limited to, the PWM data voltage Vdata_PWM can be 5V and the PAM data voltage Vdata_PAM can be 7V. In this situation, the voltage Vpwm of the first node n01 can be 5V and the voltage of the second node n02 can be 7V During the second period Tw, the voltage of the third node n03 can be 0V.

Figure 31:
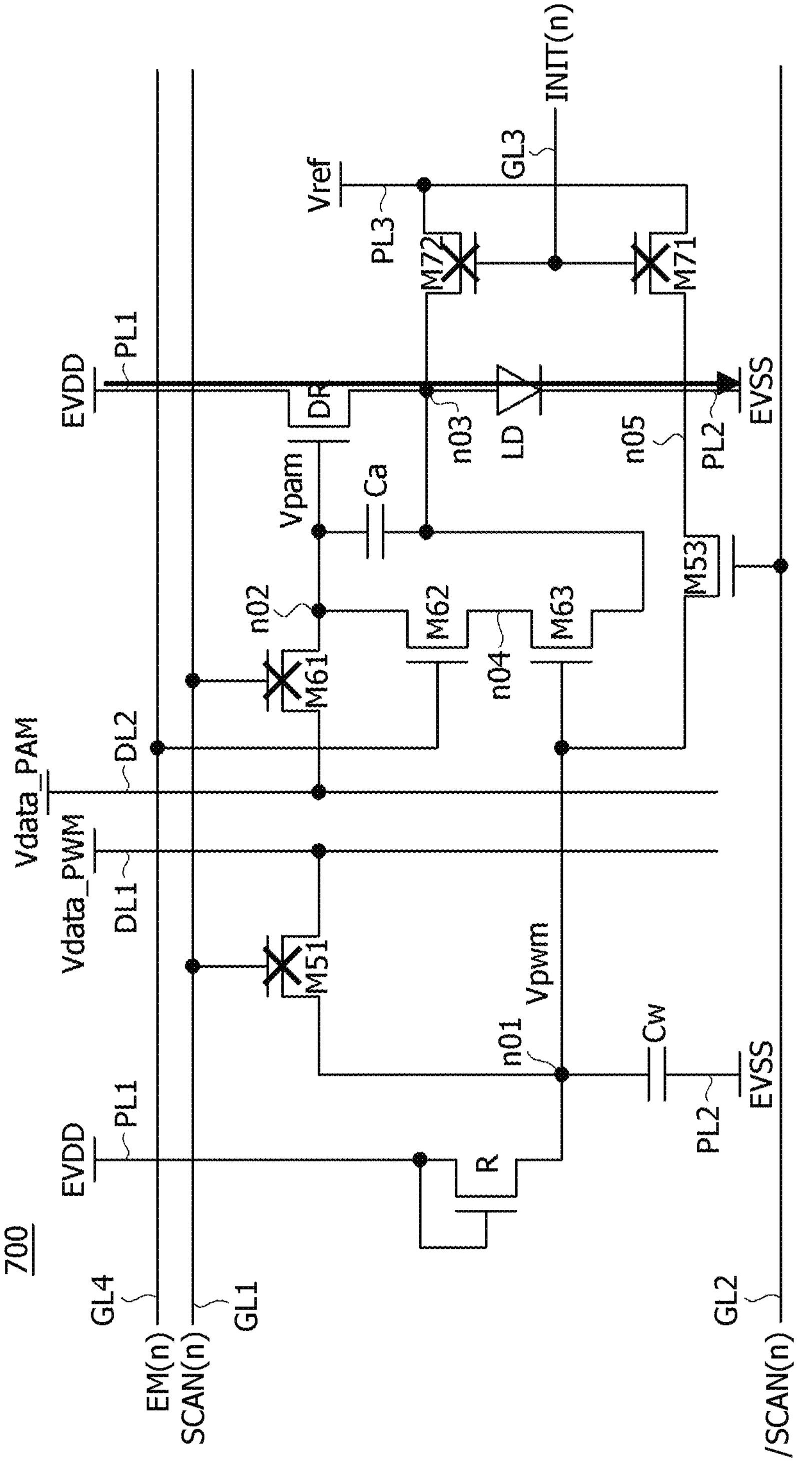
FIG. 31 is a circuit diagram illustrating the operation of the pixel circuit shown in FIG. 27 in a light-on step according to an embodiment of the present disclosure.

FIG. 31 is a circuit diagram illustrating the operation of the pixel circuit shown in FIG. 27 during the light-on step.

Referring to FIG. 28 and FIG. 31, during the light-on interval Ton, the voltage of the second and fourth gate signals/SCAN(n) and EM(n) is the gate-on voltage VGH, and the voltage of the first and third gate signals SCAN(n) and INIT(n) is the gate-off voltage VGL. Accordingly, the third PWM transistor M53 and the second PAM transistor M62 are turned on during the light-on interval Ton.

During the light-on interval Ton, the first PWM transistor M51, the first PAM transistor M61, and the initialization transistors M71 and M72 are in the off-state. During the light-on interval Ton, the PWM data voltage Vdata_PWM and the PAM data voltage Vdata_PAM can remain in their previous states, but do not affect the PWM circuit 710 and the PAM circuit 720 because the first PWM transistor M51 and the first PAM transistor M61 are in the off-state during the light-on interval Ton.

During the light-on interval Ton, the light-emitting element LD can emit light by the current generated according to the gate-source voltage Vgs of the driving transistor DR, which is determined by the PAM data voltage Vdata_PAM charged in the second capacitor Ca. During the light-on interval Ton, the voltage Vpwm of the first node n01 rises by the voltage of the first capacitor Cw, which is charged with the pixel driving voltage EVDD applied by means of the resistance of the second PWM transistor R.

When the third PAM transistor M63 reaches the threshold voltage Vth_of M63 at an interval in which the voltage Vpwm of the first node n01 rises so that it is turned on, the light-on interval Ton can be terminated and the light-off step Toff can be entered. During the interval in which the voltage Vpwm of the first node n01 rises, the third PAM transistor M63 is turned on, thereby discharging the second capacitor Ca.

Figure 32:
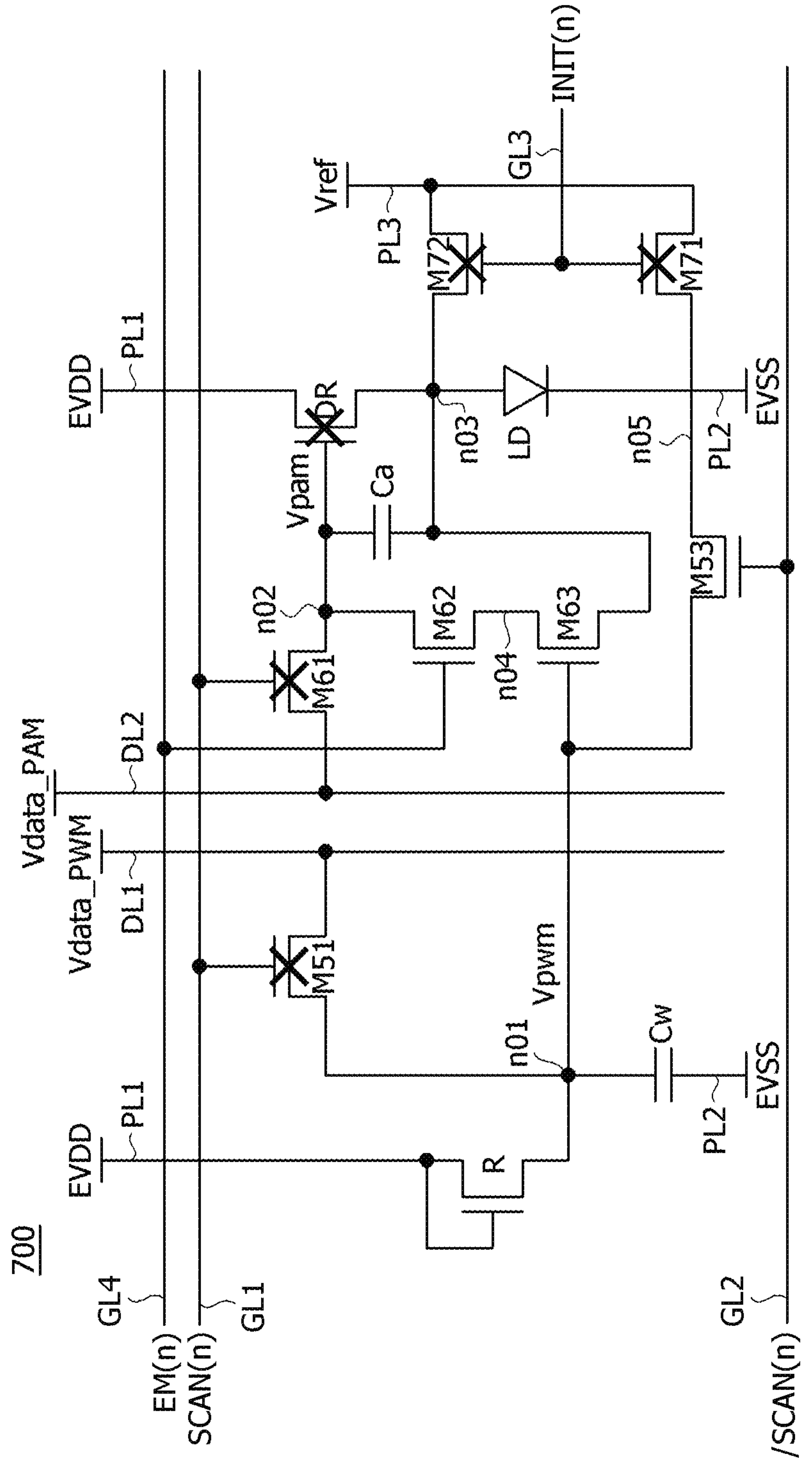
FIG. 32 is a circuit diagram illustrating the operation of the pixel circuit shown in FIG. 27 in a light-off step according to an embodiment of the present disclosure.

FIG. 32 is a circuit diagram illustrating the operation of the pixel circuit shown in FIG. 27 in the light-off step.

Referring to FIG. 28 and FIG. 32, during the light-off interval Toff, the voltage of the second and fourth gate signals/SCAN(n) and EM(n) is the gate-on voltage VGH and the voltage of the first and third gate signals SCAN(n) and INIT(n) is the gate-off voltage VGL. Accordingly, during the light-off interval Toff, the third PWM transistor M53 and the second PAM transistor M62 remain in the on-state. The third PAM transistor M63 is turned on when the light-off interval Toff is started and remains in the on-state during the light-off interval Toff.

When the light-off interval Toff is started, the voltage of the second capacitor Ca is rapidly discharged through the second and third PAM transistors M62 and M63. In this situation, the voltage Vpam of the second node n02 becomes lower than the threshold voltage DR_Vth of the driving transistor DR. As a result, the driving transistor DR is turned off at the start of the light-off interval Toff and remains in the off-state during the light-off interval Toff, causing the light-emitting element LD to turn off.

During the light-off interval Toff, the first PWM transistor M51, the first PAM transistor M61, the initialization transistors M71 and M72, and the driving transistor DR are in the off-state. During the light-off interval Toff, the PWM data voltage Vdata_PWM and the PAM data voltage Vdata_PAM can remain in their previous states, but do not affect the PWM circuit 710 and the PAM circuit 720 because the first PWM transistor M51 and the first PAM transistor M61 are in the off-state during the light-off interval Toff.

FIGS. 33 to 39 are diagrams illustrating a pixel circuit and a driving method thereof according to a fourth embodiment of the present disclosure. For example, the pixel circuit can have a different type of configuration that uses p-channel transistors.

Figure 33:
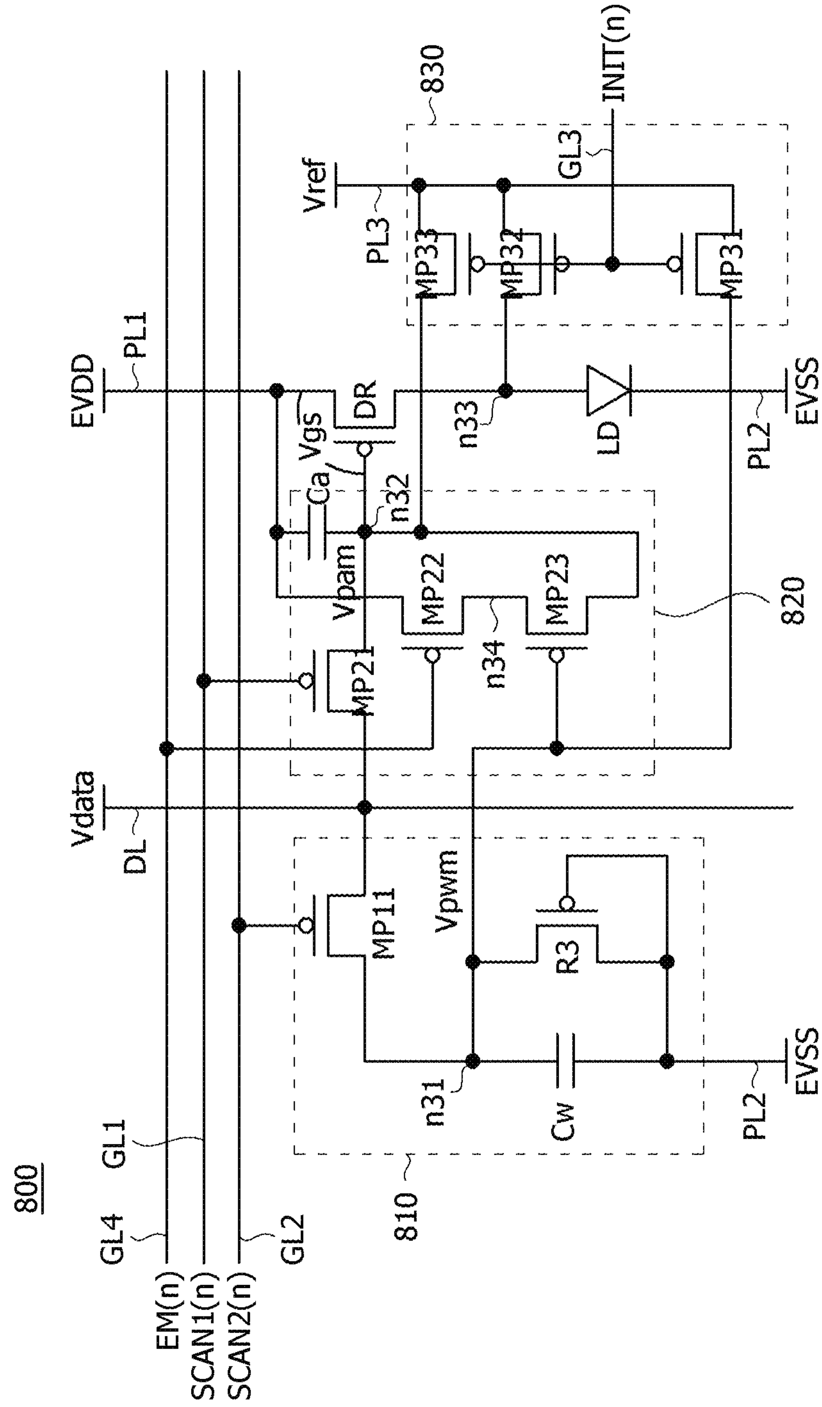
FIG. 33 is a circuit diagram illustrating a pixel circuit according to yet another embodiment of this disclosure.

Referring to FIG. 33, a pixel circuit 800 includes a PWM circuit 810, a PAM circuit 820, an initialization circuit 830, a driving transistor DR, and a light-emitting element LD. In this embodiment, the transistors in the PWM circuit 810 and PAM circuit 820 and the driving transistor DR are implemented as p-channel transistors. In this embodiment, the gate-low voltage VGL will be referred to as the gate-on voltage and the gate-high voltage VGH will be referred to as the gate-off voltage.

The pixel circuit 800 can be connected to a data line DL to which a data voltage Vdata is applied, a first gate line GL1 to which a first gate signal SCAN1(*n*) is applied, a second gate line GL2 to which a second gate signal SCAN2(*n*) is applied, a third gate line GL3 to which a third gate signal INIT(n) is applied, a fourth gate line GL4 to which a fourth gate signal EM(n) is applied, a first power line PL1 to which a pixel driving voltage EVDD is applied, a second power line PL2 to which a ground voltage EVSS is applied, and a third power line PL3 to which a reference voltage Vref is applied. The power lines PL1, PL2, and PL3 can be commonly connected to the pixel circuits of all of the pixels.

The data voltage Vdata can include a PAM data voltage and a PWM data voltage (or second data voltage) that are temporally separated. For example, the data driver 110 can supply the PWM data voltage to the data line DL after supplying the PAM data voltage to the data line DL. During one horizontal period (1H), the PAM data voltage and the PWM data voltage can be supplied sequentially to the data line DL. The data voltage Vdata can be generated as a dynamic range voltage between 0V and 8V, but is not limited thereto. The data voltage Vdata can be set as an independent voltage for each color, as shown in FIG. 2. The pixel driving voltage EVDD can be 22V, and the ground voltage EVSS can be 0V, but are not limited thereto. The reference voltage Vref can be, but is not limited to, 0.7V. The gate-off voltage VGH of the gate signals SCAN1(n), SCAN2(n), INIT(n), and EM(n) can be 13V, and the gate-on voltage VGL can be −13V, but are not limited thereto.

The driving transistor DR can include a first electrode to which the pixel driving voltage EVDD is applied, a gate electrode connected to a second node n32, and a second electrode connected to a third node n33. The light-emitting element LD can include an anode electrode connected to the third node n33 and a cathode electrode to which the ground voltage EVSS is applied.

The PWM circuit 810 can include a first capacitor Cw, a first PWM transistor MP11, and a second PWM transistor R3. The first capacitor Cw is connected between a first node n31 and the second power line PL2 to which the ground voltage EVSS is applied. The PWM circuit 810 outputs the discharge control signal DIS, which instructs a second capacitor Ca to discharge according to a voltage change of the first capacitor Cw. The discharge control signal can be a voltage Vpwm of a first node n31.

The first PWM transistor MP11 is turned on in response to the gate-on voltage VGL of the second gate signal SCAN2(n) to electrically connect the data line DL to which the data voltage Vdata is applied to the first node n31. The first PWM transistor MP11 includes a first electrode connected to the first node n31, a gate electrode to which the second gate signal SCAN2(n) is applied, and a second electrode connected to the data line DL.

The second PWM transistor R3 serves as a resistance to discharge a voltage of the first capacitor Cw, e.g., a voltage Vpwm of the first node n31, during the light-on interval of the light-emitting element LD, which is determined by the PWM data voltage. The second PWM transistor R3 includes a first electrode connected to the first node n31, and a gate electrode and a second electrode connected to the second power line PL2 to which the ground voltage EVSS is applied.

The PAM circuit 820 can include the second capacitor Ca, a first PAM transistor MP21, a second PAM transistor MP22, and a third PAM transistor MP23. The second capacitor Ca is connected between the first power line PL1, to which the pixel driving voltage EVDD is applied, and the second node n32.

The first PAM transistor MP21 is turned on in response to the gate-on voltage VGL of the first gate signal SCAN1(n) to electrically connect the data line DL, to which the data voltage Vdata is applied, to the second node n32. The first PAM transistor MP21 includes a first electrode connected to the second node n32, a gate electrode to which the first gate signal SCAN1(n) is applied, and a second electrode connected to the data line DL.

The second PAM transistor MP22 is turned on in response to the gate-on voltage VGL of the fourth gate signal EM(n). When the second PAM transistor MP22 is turned on, a one-side electrode of the second capacitor Ca to which the pixel driving voltage EVDD is applied can be electrically connected to a fourth node n34. The second PAM transistor MP22 includes a first electrode connected to the one-side electrode of the second capacitor Ca, a gate electrode to which the fourth gate signal EM(n) is applied, and a second electrode connected to the fourth node n34.

The third PAM transistor MP23 can be turned on in response to the voltage Vpwm of the first node n31, e.g., the on-level voltage of the discharge control signal. When the third PAM transistor MP23 is turned on, the fourth node n34 can be electrically connected to the second node n32. The third PAM transistor MP23 includes a first electrode connected to the fourth node n34, a gate electrode connected to the first node n31, and a second electrode connected to the second node n32. When both the second and third PAM transistors MP22 and MP23 are turned on, the voltage of the second capacitor Ca, which is charged with the PAM data voltage, can be discharged.

The initialization circuit 830 can include a first initialization transistor MP31, a second initialization transistor MP32, and a third initialization transistor MP33.

The first initialization transistor MP31 is turned on in response to the gate-on voltage VGL of the third gate signal INIT(n). When the first initialization transistor MP31 is turned on, the first capacitor Cw can be initialized. The first initialization transistor MP31 includes a first electrode connected to the first node n31, a gate electrode to which the third gate signal INIT(n) is applied, and a second electrode to which the reference voltage Vref is applied.

The second initialization transistor MP32 is turned on in response to the gate-on voltage VGL of the third gate signal INIT(n). When the second initialization transistor MP32 is turned on, the voltage of the third node n33, to which the driving transistor DR and the light-emitting element LD are connected, can be initialized. The second initialization transistor MP32 includes a first electrode connected to the third node n33, a gate electrode to which the third gate signal INIT(n) is applied, and a second electrode to which the reference voltage Vref is applied.

The third initialization transistor MP33 is turned on in response to the gate-on voltage VGL of the third gate signal INIT(n). When the third initialization transistor MP33 is turned on, the second capacitor Ca can be initialized. The third initialization transistor MP33 includes a first electrode connected to the second node n32, a gate electrode to which the third gate signal INIT(n) is applied, and a second electrode to which the reference voltage Vref is applied.

Figure 34:
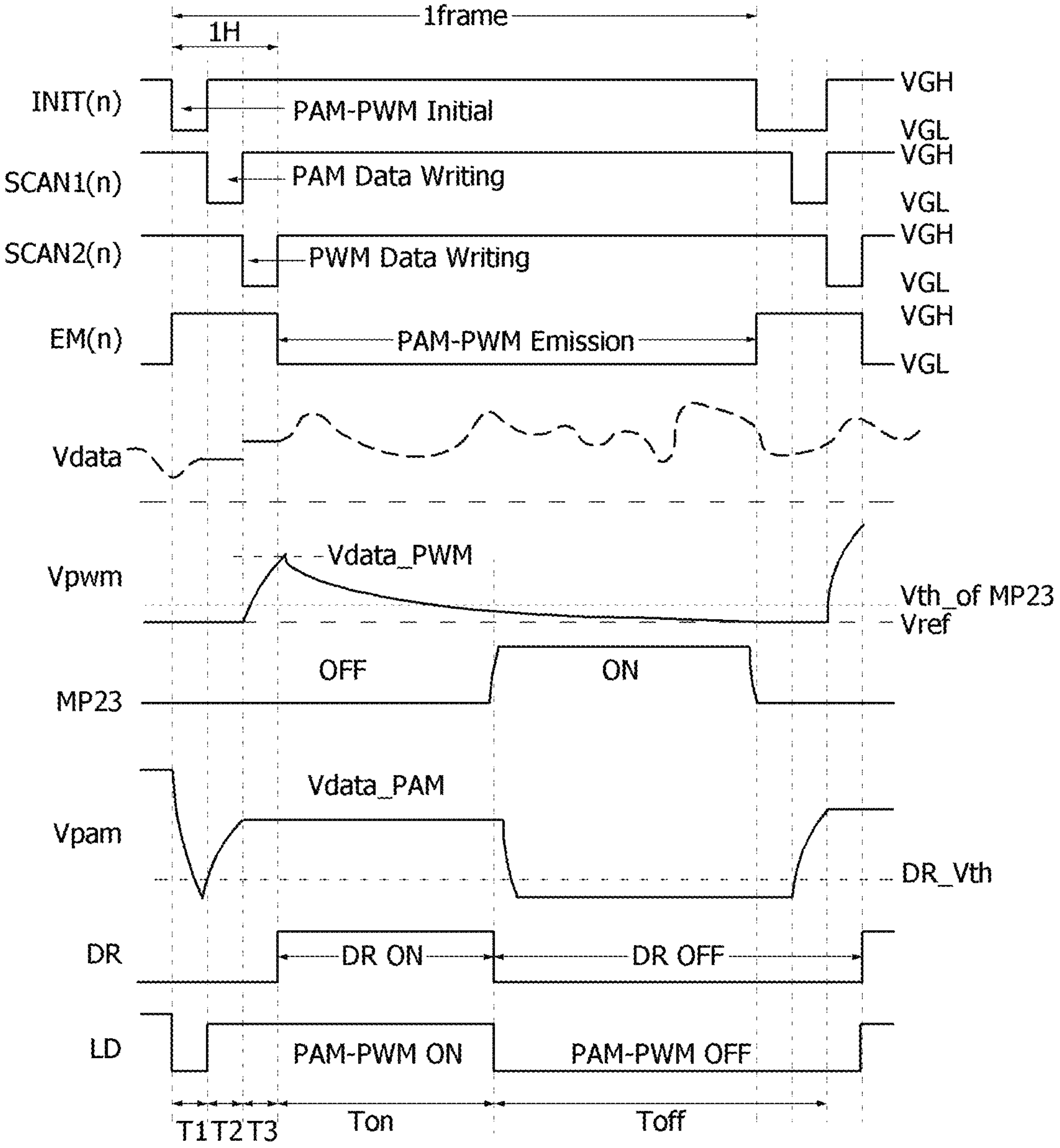
FIG. 34 is a waveform diagram illustrating signals applied to the pixel circuit shown in FIG. 33 and a light-on interval and a light-off interval of the light-emitting element according to an embodiment of the present disclosure.

FIG. 34 is a waveform diagram illustrating signals applied to the pixel circuit shown in FIG. 33 and the light-on interval and light-off interval of the light-emitting element. In FIG. 34, "DR_Vth" denotes the threshold voltage of the driving transistor DR, and "Vth_of MP23" denotes the threshold voltage of the third PAM transistor MP23. The dashed-line section of the data voltage Vdata represents the data voltage applied to a preceding pixel line and a following pixel line.

Referring to FIGS. 33 to 34, the pixel circuit 800 can be operated in an initialization step, a PAM data writing step, a PWM data writing step, and a light-on step every frame period. In the intermediate grayscale and the low grayscale, the pixel circuit 800 can be driven in the light-off step after the light-on step.

The initialization step, the PAM data writing step, and the PWM data writing step can be performed sequentially within one horizontal period (1H). The initialization step can be performed during a first period T1. During the first period T1, the PWM circuit 810, the PAM circuit 820, the light-emitting element LD, and the driving transistor DR in each of the sub-pixels are initialized. The PAM data writing step can be performed during a second period T2. During the second period T2, the second capacitor Ca of the PAM circuit 820 is charged with the PAM data voltage supplied through the data line DL, causing the PAM data to be written to the sub-pixels. The PWM data writing step can be performed during a third period T3. During the third period T3, the first capacitor Cw of the PWM circuit 810 is charged with the PWM data voltage, causing the PWM data to be written to the sub-pixels.

The light-on step and the light-off step can be divided into two time periods determined by the PWM data voltage Vdata_PWM within the remaining time, which is one frame period minus one horizontal period 1H. The light-on step is performed during a light-on interval Ton of the light-emitting element LD that becomes longer as the PWM data voltage Vdata_PWM increases. The light-off step is performed during a light-off interval Toff, which starts from when the voltage Vpwm of the first node n31 is discharged to a voltage lower than the threshold voltage of the third PAM transistor MP23. When the voltage Vpwm of the first node n31 is discharged to the voltage lower than the threshold voltage of the third PAM transistor MP23, the voltage of the second capacitor Ca is discharged to turn off the driving transistor DR, causing the light-emitting element LD to turn off.

Figure 35:
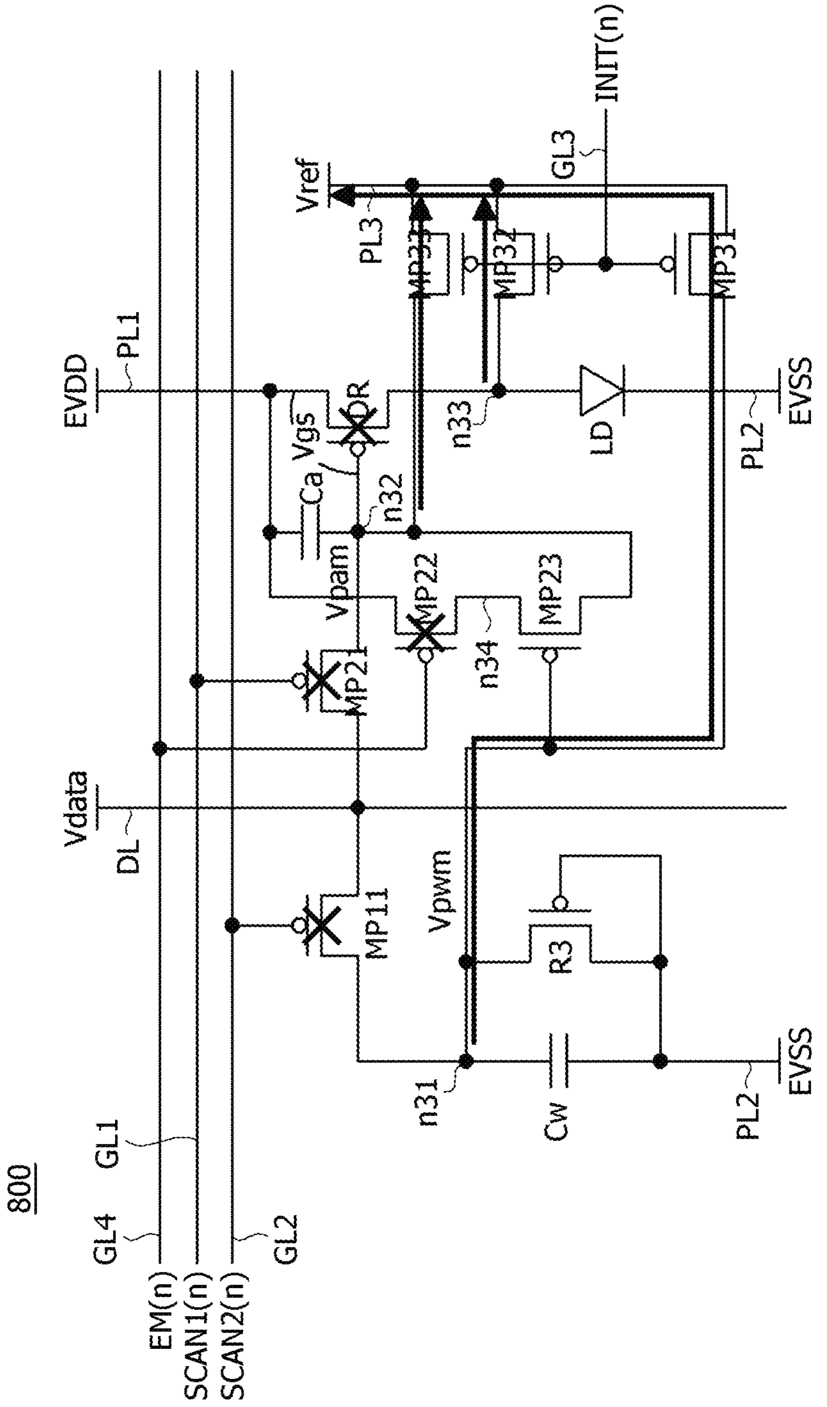
FIG. 35 is a circuit diagram illustrating the operation of the pixel circuit shown in FIG. 33 in an initialization step according to an embodiment of the present disclosure.

FIG. 35 is a circuit diagram illustrating the operation of the pixel circuit shown in FIG. 33 in the initialization step.

Referring to FIGS. 34 to 35, the voltage of the third gate signal INIT(n) during a first period T1 is the gate-on voltage VGL. During the first period T1, the voltage of the first gate signal SCAN1(*n*), the second gate signal SCAN2(*n*), and the fourth gate signal EM(n) is the gate-off voltage VGH. Accordingly, during the first period T1, the initialization transistors MP31, MP32 and MP33 are turned on.

During the first period Ti, the first PWM transistor MP11, the first PAM transistor MP21, and the second PAM transistor MP22, among transistors serving as switch elements, are in the off-state, and the driving transistor DR is in the off-state. During the first period T1, the light-emitting element LD is in the off-state.

In the first period T1, the data voltage Vdata and the reference voltage Vref can be 0V, or the data voltage of the preceding pixel line, for example, the (n−1)th pixel line. During the initialization period T1, the voltage of the first, second, and third nodes n31, n32, and n33 can be initialized to 0.7V.

Figure 36:
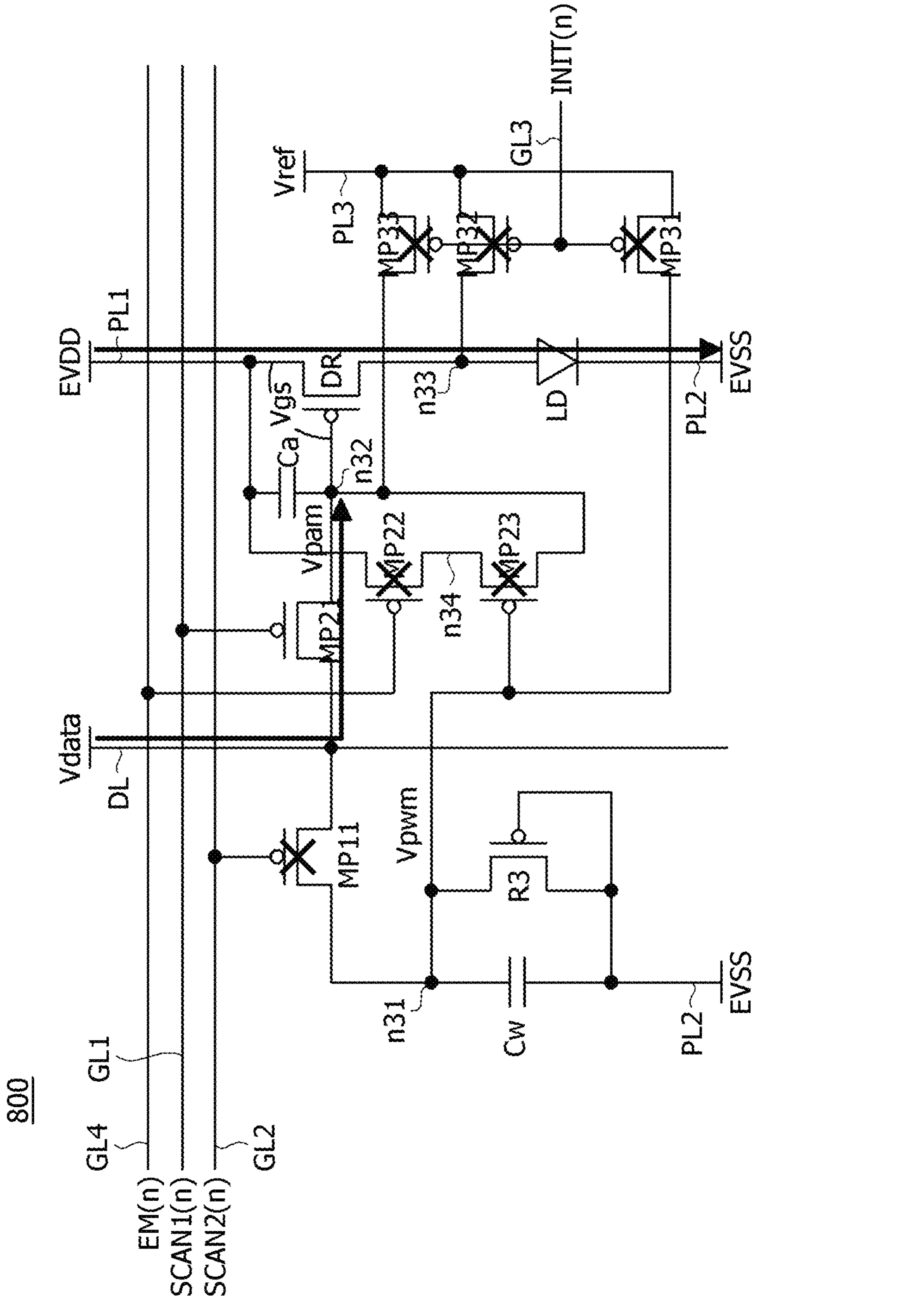
FIG. 36 is a circuit diagram illustrating the operation of the pixel circuit shown in FIG. 33 in a PAM data writing step according to an embodiment of the present disclosure.

FIG. 36 is a circuit diagram illustrating the operation of the pixel circuit shown in FIG. 33 during the PAM data writing step.

Referring to FIGS. 34 and 36, the voltage of the first gate signal SCAN1(*n*) is the gate-on voltage VGL during a second period T2. During the second period T2, the voltage of the second gate signal SCAN2(*n*), the third gate signal INIT(n), and the fourth gate signal EM(n) is the gate-off voltage VGH. Accordingly, during the second period T2, the first PAM transistor MP21 is turned on.

During the second period T2, the first PWM transistor MP11, the second PAM transistor MP22, the third PAM transistor MP23, and the initialization transistors MP31, MP32 and MP33, among transistors serving as switch elements, are in the off-state.

During the second period T2, the data voltage Vdata can be changed to the PAM data voltage Vdata_PAM, which can be charged in the second capacitor Ca. The PAM data voltage Vdata_PAM might be 7V. In this situation, the voltage of the second node n32 can be charged to 7V. During the second period T2, the voltage of the first node n31 can be maintained at 0.7V. During the second period T2, the driving transistor DR can be turned on so that current is generated by the gate-source voltage Vgs. The current generated from the driving transistor DR can cause the light-emitting element LD to emit light during the second period T2.

Figure 37:
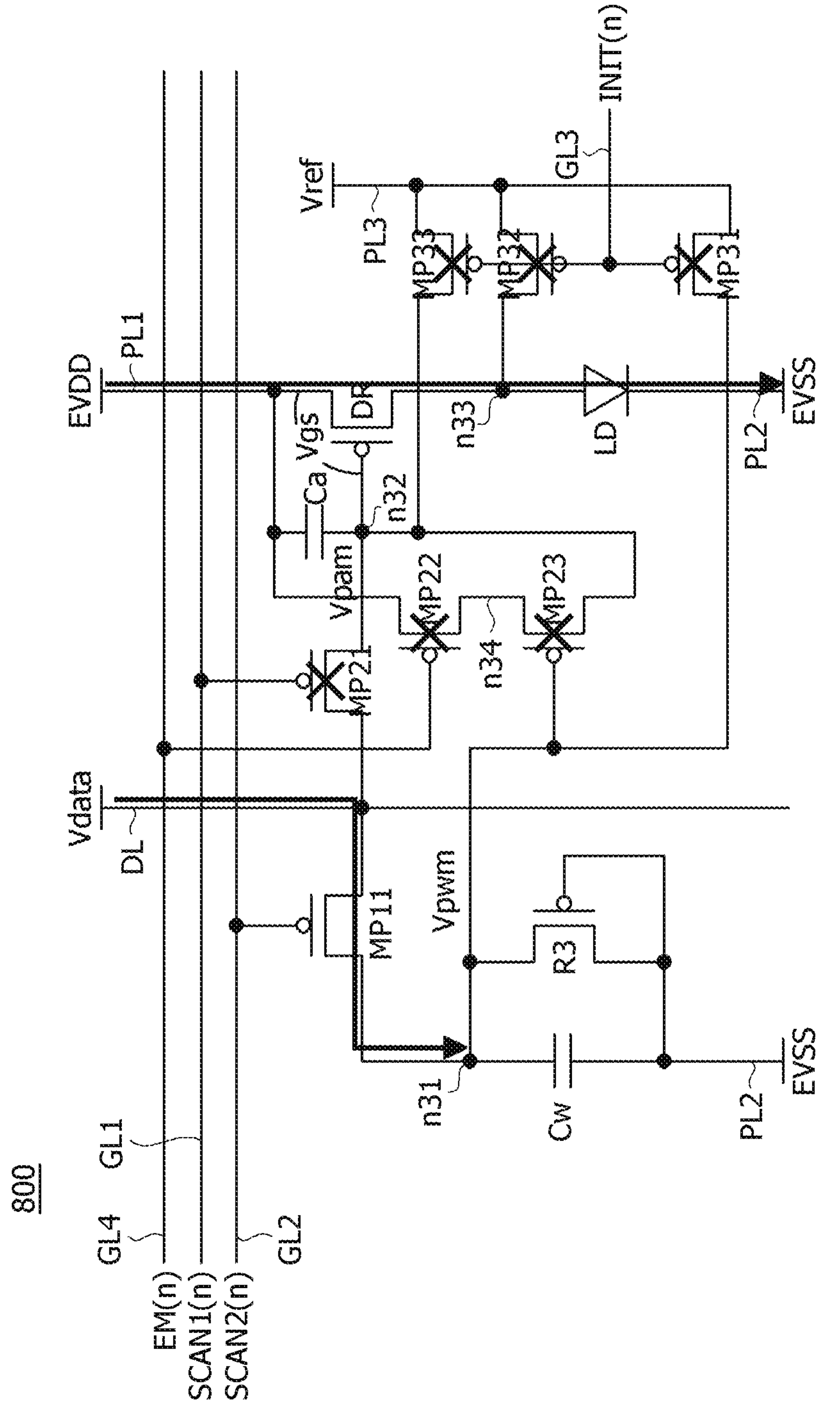
FIG. 37 is a circuit diagram illustrating the operation of the pixel circuit shown in FIG. 33 in a PWM data writing step according to an embodiment of the present disclosure.

FIG. 37 is a circuit diagram illustrating the operation of the pixel circuit shown in FIG. 33 during the PWM data writing step.

Referring to FIGS. 34 and 37, the voltage of the second gate signal SCAN2(*n*) is the gate-on voltage VGL during a third period T3. During the third period T3, the voltage of the first gate signal SCAN1(*n*), the third gate signal INIT(n), and the fourth gate signal EM(n) is the gate-off voltage VGH. Accordingly, during the third period T3, the first PWM transistor MP11 is turned on.

During the third period T3, the data voltage Vdata can be changed to the PWM data voltage Vdata_PWM, which can be charged in the first capacitor Cw. When the PWM data voltage Vdata_PWM is 8V, the first capacitor Cw can be charged, causing the voltage of the first node n31 to rise to 6V. During the third period T3, the second node n32 can be maintained at 7V because it is in a floating state. During the third period T3, the current generated according to the gate-source voltage Vgs of the driving transistor DR can flow to the light-emitting element LD, causing the light-emitting element LD to emit light.

During the third period T3, the first PAM transistor MP21, the second PAM transistor MP22, the third PAM transistor MP23, and the initialization transistors MP31, MP32 and MP33, among transistors serving as switch elements, are in the off-state.

Figure 38:
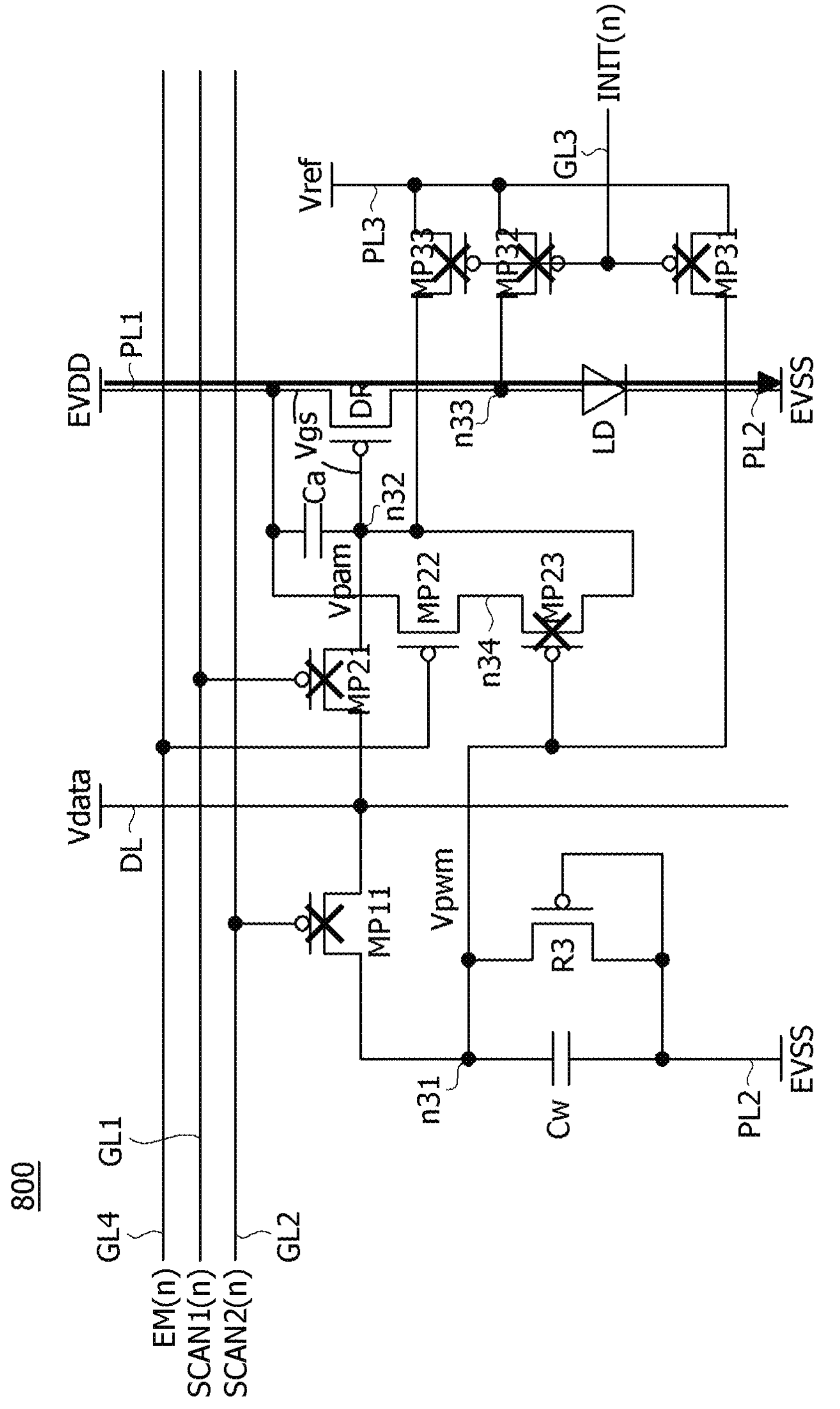
FIG. 38 is a circuit diagram illustrating the operation of the pixel circuit shown in FIG. 33 in a light-on step according to an embodiment of the present disclosure.

FIG. 38 is a circuit diagram illustrating the operation of the pixel circuit shown in FIG. 33 during the light-on step.

Referring to FIGS. 34 and 38, during the light-on interval Ton, the voltage of the fourth gate signal EM(n) is the gate-on voltage VGL, and the voltage of the first gate signal SCAN1(*n*), the second gate signal SCAN2(*n*), and the third gate signal INIT(n) is the gate-off voltage VGH. Accordingly, the second PAM transistor MP22 is turned on during the light-on interval Ton.

During the light-on interval Ton, the first PWM transistor MP11, the first PAM transistor MP21, the third PAM transistor MP23, and the initialization transistors MP31, MP32, and MP33 are in the off-state.

During the light-on interval Ton, the data voltage Vdata can be the PWM data voltage Vdata_PWM or the data voltage of a following pixel line, but do not affect the PWM circuit 810 and the PAM circuit 820 because the first PWM transistor MP11 and the first PAM transistor MP21 are in the off-state during the light-on interval Ton.

During the light-on interval Ton, the light-emitting element LD can be emit light by the current generated according to the gate-source voltage Vgs of the driving transistor DR, which is determined by the PAM data voltage Vdata_PAM charged in the second capacitor Ca. During the light-on interval Ton, the voltage of the first capacitor Cw is discharged by means of the resistance of the second PWM transistor R3, which lowers the voltage Vpwm of the first node n31. When the voltage Vpwm of the first node n31 becomes lower than the threshold voltage Vth_of MP23 of the third PAM transistor MP23, the sub-pixel enters the light-off step. The light-on interval Ton can be extended in proportion to the PWM data voltage Vdata_PWM.

Figure 39:
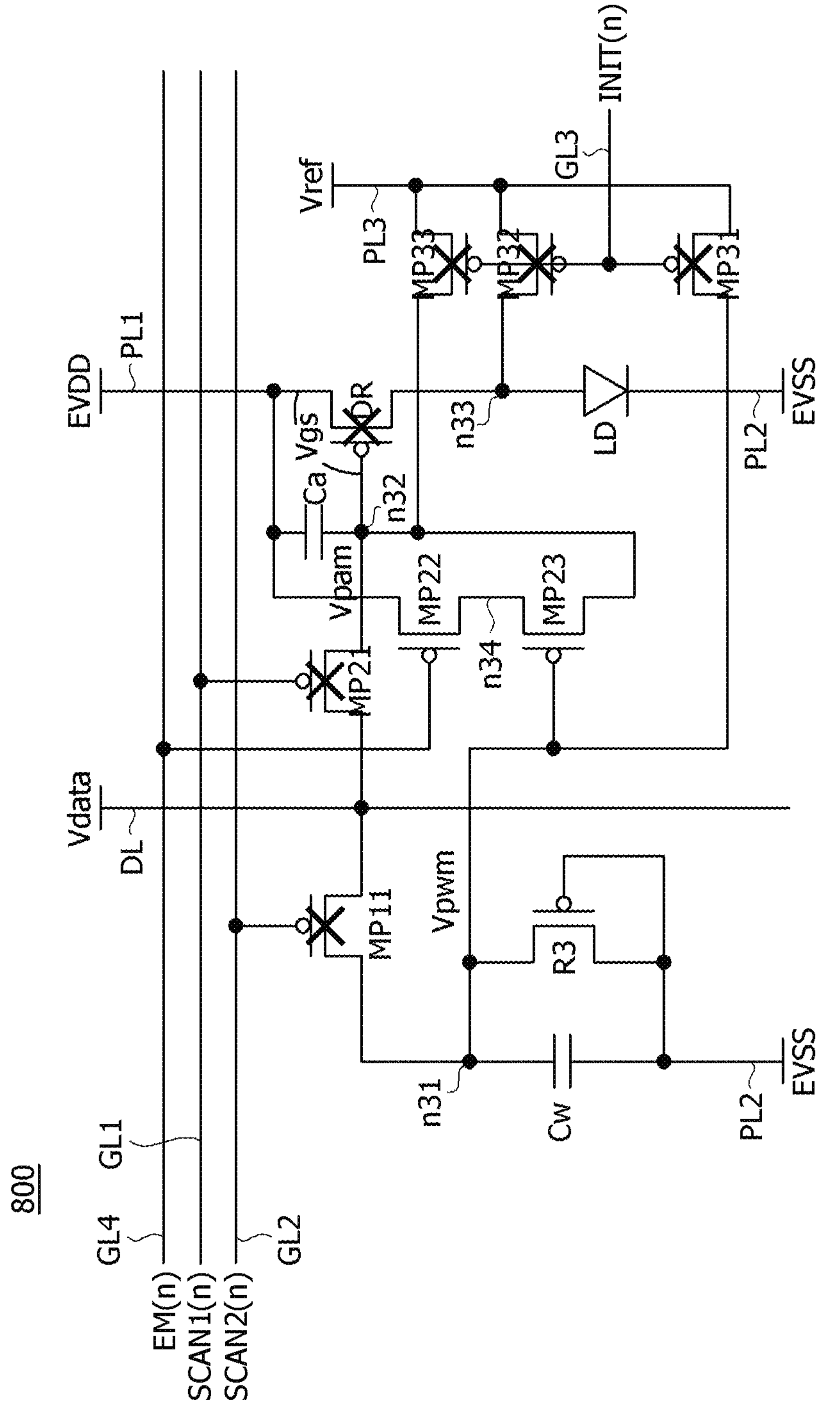
FIG. 39 is a circuit diagram illustrating the operation of the pixel circuit shown in FIG. 33 in a light-off step according to an embodiment of the present disclosure.

FIG. 39 is a circuit diagram illustrating the operation of the pixel circuit shown in FIG. 33 in the light-off step.

Referring to FIGS. 34 and 39, during the light-off interval Toff, the voltage of the fourth gate signal EM(n) is the gate-on voltage VGL, and the voltage of the first gate signal SCAN1(*n*), the second gate signal SCAN2(*n*), and the third gate signal INIT(n) is the gate-off voltage VGH. Accordingly, the second PAM transistor MP22 remains in the on-state during the light-off interval Toff.

The third PAM transistor MP23 is turned on when the voltage of the first node n31, which is discharged during the light-on interval Ton, becomes lower than the threshold voltage Vth_of MP23 of the third PAM transistor MP23. In this situation, when the voltage of the second capacitor Ca is rapidly discharged through the second and third PAM transistors M22 and M23, and the voltage Vpam of the second node n32 becomes lower than the threshold voltage Vth of the driving transistor DR, the driving transistor DR is turned off and the light-emitting element LD is turned off.

During the light-off interval Toff, the first PWM transistor MP11, the first PAM transistor MP21, the initialization transistors MP31, MP32 and MP33, and the driving transistor DR are in the off-state. During the light-off interval Toff, the data voltage Vdata can be the PWM data voltage Vdata_PWM or the data voltage of a following pixel line, but does not affect the PWM circuit 810 and PAM circuit 820 because the first PWM transistor MP11 and the first PAM transistor MP21 are in the off-state during the light-off interval Toff.

In the aforementioned embodiments, an internal compensation circuit or an external compensation circuit can be electrically connected to the pixel circuit. The internal compensation circuit can be connected to the driving transistor in each of the pixel circuits to sense the threshold voltage of the driving transistor so that the gate-source voltage Vgs of the driving transistor is compensated by the amount of the threshold voltage. The external compensation circuit can be connected to the driving transistor in each of the pixel circuits to sense the current or voltage of the driving transistors in real-time, so that the deviations (or changes) in the electrical characteristics of the driving transistor in each of the pixels is compensated in real-time by modulating the pixel data (digital data) of the input image by the amount of the change in the electrical characteristics of the driving transistor, such as a change in the threshold voltage or mobility. The internal compensation circuit or the external compensation circuit can be implemented as any known circuit.

According to one or more embodiments of the present disclosure, the display device can be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure can be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A pixel circuit comprising:
- a light-emitting element configured to emit light;
- a driving transistor configured to supply a current to the light-emitting element;
- a first circuit including a first capacitor charged with a first data voltage; and
- a second circuit including a second capacitor charged with a second data voltage and configured to adjust the current supplied by the driving transistor to the light-emitting element,
- wherein the first circuit is configured to output a discharge control signal that instructs the second capacitor to discharge in response to a voltage change in the first capacitor for turning the light-emitting element off, and
- wherein the first circuit further includes:
  - a first node connected to the first capacitor;
  - a second node from which the discharge control signal is output; and
  - an inverting circuit configured to receive a voltage of the first node and output the discharge control signal.

2. The pixel circuit of claim 1, wherein the first circuit further includes:
- a first charging circuit connected to a data line configured to sequentially receive the first data voltage and the second data voltage, the first charging circuit being configured to charge the first capacitor with the first data voltage supplied through the data line; and
- a first discharging circuit configured to discharge a voltage of the first capacitor.

3. The pixel circuit of claim 2, wherein the first capacitor is connected between the first node and a second power line configured to receive a ground voltage,
- wherein the first charging circuit includes a first pulse width modulation (PWM) transistor configured to electrically connect the first node to the data line in response to a gate-on voltage of a second gate signal,
- wherein the first discharging circuit includes a second PWM transistor including a gate electrode connected to the first node and a first electrode connected to the first node, and a second electrode connected to the second power line, and
- wherein the inverting circuit is configured to invert a voltage of the discharge control signal from an off-level to an on-level based on a decrease in a voltage of the first node.

4. The pixel circuit of claim 3, wherein the inverting circuit includes:
- a third PWM transistor including a first electrode and a gate electrode both configured to receive a pixel driving voltage, and a second electrode connected to the second node; and
- a fourth PWM transistor connected between the second node and the second power line, and configured to turn off when the voltage of the first node is lowered to an off-level.

5. The pixel circuit of claim 3, wherein the second circuit further includes:
- a second charging circuit configured to charge the second capacitor with the second data voltage supplied through the data line; and
- a second discharging circuit configured to discharge the second capacitor when the voltage of the discharge control signal is at an on-level.

6. The pixel circuit of claim 5, wherein the second capacitor is connected between a third node and a fourth node, wherein the second charging circuit includes a first pulse amplitude modulation (PAM) transistor configured to turn on in response to a gate-on voltage of a first gate signal to connect the data line to the third node, and wherein the second discharging circuit includes:

a second PAM transistor connected between the third node and a fifth node, and configured to turn on in response to a gate-on voltage of a fourth gate signal; and a third PAM transistor connected between the fifth node and the second power line, and configured to turn on in response to the on-level of the voltage of the discharge control signal.

7. The pixel circuit of claim 6, further comprising:

an initialization circuit configured to supply an initialization voltage to the first node and the fourth node, in response to a gate-on voltage of a third gate signal.

8. The pixel circuit of claim 7, wherein the initialization circuit includes:

a first initialization transistor configured to turn on in response to the gate-on voltage of the third gate signal to supply a reference voltage to the first node; and a second initialization transistor configured to turn on in response to the gate-on voltage of the third gate signal to supply the reference voltage to the fourth node.

9. The pixel circuit of claim 1, wherein the first circuit further includes:

a first charging circuit connected to a first data line configured to receive the first data voltage, and the first charging circuit being configured to charge the first capacitor with the first data voltage;

a first discharging circuit configured to discharge a voltage of the first capacitor; and an inverting circuit configured to output the discharge control signal based on the voltage change in the first capacitor, wherein the second circuit includes:

a second charging circuit connected to a second data line configured to receive the second data voltage, and the second charging circuit being configured to charge the second capacitor with the second data voltage at a same time while the first data voltage is being charged in the first capacitor by the first charging circuit; and a second discharging circuit configured to discharge the second capacitor when a voltage of the discharge control signal is at an on-level.

10. The pixel circuit of claim 9, wherein the first capacitor is connected between the first node and a second power line configured to receive a ground voltage, wherein the second capacitor is connected between a third node and a fourth node, wherein the first charging circuit includes a first pulse width modulation (PWM) transistor configured to electrically connect the first node to the first data line in response to a gate-on voltage of a first gate signal, wherein the first discharging circuit includes a second PWM transistor including a gate electrode connected to the first node, a first electrode connected to the first node, and a second electrode connected to the second power line, wherein the inverting circuit includes:

a third PWM transistor including a first electrode and a gate electrode both configured to receive a pixel driving voltage, and a second electrode connected to the second node; and a fourth PWM transistor connected between the second node and the second power line, and configured to turn off when a voltage of the first node is lowered to an off-level, and wherein the voltage of the discharge control signal is inverted from an off-level to the on-level when the fourth PWM transistor is turned off.

11. The pixel circuit of claim 10, wherein the second charging circuit includes a first pulse amplitude modulation (PAM) transistor configured to turn on in response to the gate-on voltage of the first gate signal to electrically connect the second data line to the third node, and wherein the second discharging circuit includes:

a second PAM transistor connected between the third node and a fifth node, and configured to turn on in response to a gate-on voltage of a fourth gate signal; and a third PAM transistor connected between the fifth node and the second power line, and configured to turn on in response to the on-level of the voltage of the discharge control signal.

12. The pixel circuit of claim 11, further comprising:

a fifth PWM transistor configured to electrically connect the first node to a sixth node in response to a gate-on voltage of a second gate signal;

a first initialization transistor configured to turn on in response to a gate-on voltage of a third gate signal to electrically connect a third power line to the sixth node, the third power line being configured to receive a reference voltage; and a second initialization transistor configured to turn on in response to the gate-on voltage of the third gate signal to supply the reference voltage to the fourth node.

13. The pixel circuit of claim 12, wherein the second gate signal has an opposite phase to the first gate signal.

14. A pixel circuit comprising:

a light-emitting element configured to emit light;

a driving transistor configured to supply a current to the light-emitting element;

a first circuit including a first capacitor charged with a first data voltage; and a second circuit including a second capacitor charged with a second data voltage and configured to adjust the current supplied by the driving transistor to the light-emitting element, wherein the first circuit is configured to output a discharge control signal that instructs the second capacitor to discharge in response to a voltage change in the first capacitor for turning the light-emitting element off, wherein the first capacitor is connected between a first node and a second power line configured to receive a ground voltage, wherein the second capacitor is connected between a second node and a third node, wherein the first circuit includes:

a first pulse width modulation (PWM) transistor configured to electrically connect the first node to a first data line configured to receive the first data voltage, in response to a gate-on voltage of a first gate signal; and a second PWM transistor including a first electrode and a gate electrode both connected to a first power line configured to receive a pixel driving voltage, and a second electrode connected to the first node, and wherein the first node is configured to output the discharge control signal to the second circuit.

15. The pixel circuit of claim 14, further comprising:

a fifth PWM transistor configured to electrically connect the first node to a fifth node, in response to a gate-on voltage of a second gate signal;

a first initialization transistor configured to turn on, in response to a gate-on voltage of a third gate signal, to electrically connect a third power line to the fifth node, the third power line being configured to receive a reference voltage; and a second initialization transistor configured to turn on, in response to the gate-on voltage of the third gate signal, to supply the reference voltage to a fourth node.

16. The pixel circuit of claim 15, wherein the second gate signal has an opposite phase to the first gate signal.

17. A pixel circuit comprising:

a light-emitting element configured to emit light;

a driving transistor configured to supply a current to the light-emitting element;

a first circuit including a first capacitor charged with a first data voltage; and a second circuit including a second capacitor charged with a second data voltage and configured to adjust the current supplied by the driving transistor to the light-emitting element, wherein the first circuit is configured to output a discharge control signal that instructs the second capacitor to discharge in response to a voltage change in the first capacitor for turning the light-emitting element off, wherein the first circuit and the second circuit are connected to a data line that is configured to sequentially receive the second data voltage followed by the first data voltage, wherein the first capacitor is connected between a first node and a second power line configured to receive a ground voltage, wherein the second capacitor is connected between a first power line configured to receive a pixel driving voltage and a second node, wherein the first circuit includes:

a first pulse width modulation (PWM) transistor configured to electrically connect the first node to the data line, in response to a gate-on voltage of a second gate signal; and a second PWM transistor including a first electrode connected to the first node, a gate electrode and a second electrode both connected to the second power line, and wherein the first node is configured to output the discharge control signal to the second circuit.

18. The pixel circuit of claim 14, wherein the second circuit includes:

a first pulse amplitude modulation (PAM) transistor configured to turn on in response to the gate-on voltage of the first gate signal to connect a second data line to the third node, the second data line being configured to receive the second data voltage;

a second PAM transistor connected between the second node and a fourth node, and configured to turn on in response to a gate-on voltage of a fourth gate signal; and a third PAM transistor connected between the fourth node and the third node, and configured to turn on when a voltage of the discharge control signal output by the first node is an on-level voltage, wherein the second capacitor is configured to discharge when the second PAM transistor and the third PAM transistor are turned on.

19. The pixel circuit of claim 17, wherein the second circuit includes:

a first pulse amplitude modulation (PAM) transistor configured to turn on, in response to a gate-on voltage of a first gate signal, to electrically connect the data line to the second node;

a second PAM transistor connected between the first power line and a fourth node, and configured to turn on, in response to a gate-on voltage of a fourth gate signal; and a third PAM transistor connected between the fourth node and the second power line and configured to turn on when the voltage of the first node is an on-level voltage, wherein the second capacitor is configured to discharge when the second PAM transistor and the third PAM transistor are turned on.

* * * * *